(12) United States Patent
Notani et al.

(10) Patent No.: US 8,352,300 B2
(45) Date of Patent: Jan. 8, 2013

(54) SYSTEM, COMPUTER PROGRAM AND METHOD FOR IMPLEMENTING AND MANAGING A VALUE CHAIN NETWORK

(75) Inventors: Ranjit Notani, Southlake, TX (US); Greg Brady, Dallas, TX (US); Sivakoumar Arumugam, Denton, TX (US)

(73) Assignee: One Network Enterprises, Inc., Dallas, TX (US)

( * ) Notice: Subject to any disclaimer, the term of this patent is extended or adjusted under 35 U.S.C. 154(b) by 8 days.

(21) Appl. No.: 13/165,789

(22) Filed: Jun. 22, 2011

(65) Prior Publication Data
US 2011/0264485 A1    Oct. 27, 2011

Related U.S. Application Data

(63) Continuation-in-part of application No. 10/887,468, filed on Jul. 8, 2004, and a continuation-in-part of application No. 12/511,313, filed on Jul. 29, 2009, now Pat. No. 8,086,588, and a continuation-in-part of application No. 12/730,805, filed on Mar. 24, 2010.

(51) Int. Cl.
*G06Q 40/00* (2012.01)
(52) U.S. Cl. .................................. 705/7.11; 705/7.42
(58) Field of Classification Search .............. 705/7.11, 705/7.42
See application file for complete search history.

(56) References Cited

U.S. PATENT DOCUMENTS 5,615,109 A * 3/1997 Eder ............................. 705/7.12
5,953,707 A 9/1999 Huang et al.
(Continued)

FOREIGN PATENT DOCUMENTS

WO    WO 0227614    4/2002
(Continued)

OTHER PUBLICATIONS

Freeman, Eva, "Supply chain: modeling makes the difference," Datamation, v43, n10 p. 64 (5), Oct. 1997.
(Continued)

*Primary Examiner* — Thomas Dixon
*Assistant Examiner* — Benjamin S Fields
(74) *Attorney, Agent, or Firm* — Karl L. Larson

(57) ABSTRACT

A system, computer program product and method for implementing and managing a value chain network. The computer program product includes allowing a first company having one or more clusters of retail stores and a second company in a value chain network to access to a shared database, having first and second plurality of fields in the shared database are uniquely associated with each respective first and second company, on a service provider computer over a network; linking the first company with one or more of the second plurality of fields; linking the second company with one or more of the first plurality of fields; periodically receiving sales information and events, including a demand event and a supply event, on the value network within at least one of the one or more clusters of retail stores; and updating one or more of the first plurality of fields that are linked to the second company upon receipt of at least one selected from the group consisting of the sales information, the demand event and the supply event. The first and second company are linked and provided limited access to the one or more of the respective second and first plurality of fields without creating a copy. The one or more updated first plurality of fields are immediately accessible to the first and second company.

20 Claims, 35 Drawing Sheets

U.S. PATENT DOCUMENTS

| | | | |
|---|---|---|---|
| 6,157,915 | A | 12/2000 | Bhaskaran et al. |
| 6,304,867 | B1 | 10/2001 | Schmidt |
| 6,574,631 | B1 | 6/2003 | Subrramanian |
| 6,578,005 | B1 | 6/2003 | Lesaint et al. |
| 6,609,101 | B1 * | 8/2003 | Landvater .................. 705/7.25 |
| 6,801,229 | B1 | 10/2004 | Tinkler |
| 6,804,657 | B1 * | 10/2004 | Sultan ........................ 705/7.31 |
| 7,103,565 | B1 | 9/2006 | Vaid |
| 7,130,807 | B1 * | 10/2006 | Mikurak ..................... 705/7.25 |
| 7,130,885 | B2 | 10/2006 | Chandra |
| 7,212,976 | B2 | 5/2007 | Scheer |
| 7,523,142 | B2 | 4/2009 | Driesen |
| 7,716,189 | B1 | 5/2010 | Panchbudhe |
| 7,739,121 | B2 | 6/2010 | Jain et al. |
| 7,797,182 | B2 * | 9/2010 | Lindquist et al. ........... 705/7.31 |
| 7,809,659 | B1 | 10/2010 | Paiz |
| 8,103,538 | B2 * | 1/2012 | Bamberg et al. ............ 705/7.31 |
| 2002/0087438 | A1 | 7/2002 | Kunieda et al. |
| 2002/0095457 | A1 | 7/2002 | Sharma et al. |
| 2002/0138316 | A1 * | 9/2002 | Katz et al. ........................ 705/7 |
| 2002/0161664 | A1 | 10/2002 | Shaya et al. |
| 2003/0018546 | A1 | 1/2003 | Ayala et al. |
| 2003/0050819 | A1 | 3/2003 | Koenigbauer et al. |
| 2003/0078846 | A1 | 4/2003 | Burk |
| 2003/0233264 | A1 | 12/2003 | Jones et al. |
| 2004/0030428 | A1 | 2/2004 | Crampton et al. |
| 2004/0088239 | A1 * | 5/2004 | Eder ............................... 705/36 |
| 2004/0098296 | A1 * | 5/2004 | Bamberg et al. ............... 705/10 |
| 2004/0117048 | A1 * | 6/2004 | Wei ............................... 700/100 |
| 2004/0128261 | A1 * | 7/2004 | Olavson et al. .............. 705/400 |
| 2004/0172319 | A1 * | 9/2004 | Eder ................................. 705/7 |
| 2004/0181378 | A1 * | 9/2004 | Gilmore ........................... 703/6 |
| 2005/0131755 | A1 * | 6/2005 | Chen et al. ...................... 705/10 |
| 2005/0209732 | A1 | 9/2005 | Audimoolan et al. |
| 2006/0271390 | A1 | 11/2006 | Rich |
| 2007/0225949 | A1 * | 9/2007 | Sundararajan et al. ........... 703/2 |
| 2008/0027830 | A1 | 1/2008 | Johnson et al. |
| 2008/0052149 | A1 * | 2/2008 | Fischer et al. ................. 705/10 |
| 2010/0217712 | A1 * | 8/2010 | Fillmore ........................ 705/80 |
| 2010/0223284 | A1 | 9/2010 | Brooks |
| 2010/0325173 | A1 | 12/2010 | Haley |
| 2011/0060621 | A1 | 3/2011 | Weller et al. |
| 2011/0238461 | A1 * | 9/2011 | Mulukutla et al. ........... 705/7.31 |
| 2011/0264485 | A1 * | 10/2011 | Notani et al. ................. 705/7.31 |

FOREIGN PATENT DOCUMENTS

| | | |
|---|---|---|
| WO | WO 0235393 | 5/2002 |
| WO | WO 0235438 | 5/2002 |
| WO | WO 0250633 | 6/2002 |

OTHER PUBLICATIONS

Mason-Jones, R., Towill, D.R., "Information enrichments: designing the supply chain for competitive advantage," Supply Chain Management, v2n4, p. 137, 1997.

Chandrashekar, Ashok, Schary, Philip, B, "Toward the virtual supply chain: The convergence of IT and organization," International Journal of Logistics Management, v10n2, pp. 2.

Desmond, John P., "Chain Reaction," Software Magazine, Sep. 1999.

Neofora.com, Inc. to Acquire U.S. Lifeline, Inc., Leader in Supply Chain Content to Extend Neoforma.com's Service Offering, Business Wire, Mar. 9, 2000.

Motwani, Jaideep, Madan, Manu, Gunasekaran, A., "Information technology in managing global supply chains," Logistics Information Management, v.13n5, pp. 320-327, 2000.

Prasad, Sameer, Tata, Jasmine, "Information Investment in supply chain management," Logistics Information Management, v.13n1, pp. 33-38, 2000.

Smith, Mark, "Business-Critical Prism: A Strategic Assessment Guide for BI Products," Intelligent Enterprise, 4, 15, 29, Oct. 4, 2001.

Yan, Shangyao, Tu, Yu-Ping, "Multifleet routing and multistop flight scheduling for schedule perturbation," European Journal of Operational Research, 1997, vol. 103 pp. 155-169.

Notani et al., U.S. Appl. No. 10/887,468, entitled "Non-Stale Incremental Planning," Dec. 26, 2008 (Pending).

Notani et al., U.S. Appl. No. 10/887,218, entitled "Real-Time Planning and Execution with Minimum Perturbation," Jul. 8, 2004 (Abandoned).

Notani et al., U.S. Appl. No. 12/730,805, entitled "Computer Program Product and Method for Sales Forecasting and Adjusting a Sales Forecast," Mar. 24, 2010 (Pending).

Notani et al., U.S. Appl. No. 12/511,313, entitled "Computer Program Product and Method for Sharing Information Between Multiple Computer . . . ," Jul. 29, 2009 (Pending).

* cited by examiner

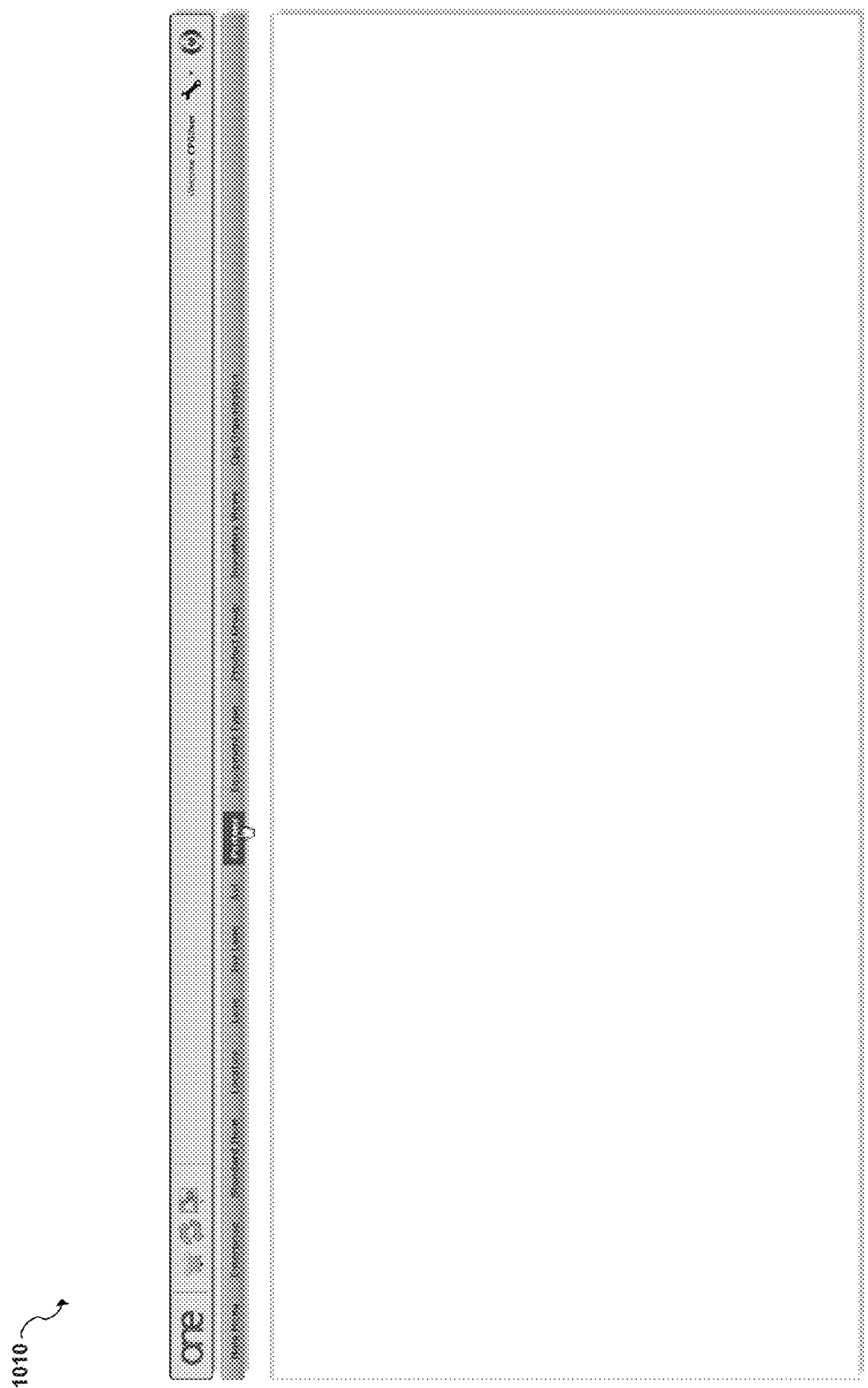

Figure 9C

SYSTEM, COMPUTER PROGRAM AND METHOD FOR IMPLEMENTING AND MANAGING A VALUE CHAIN NETWORK

CROSS REFERENCE TO RELATED APPLICATIONS

The present application is a continuation-in-part of and claims priority to U.S. patent application Ser. No. 10/887,468, entitled "Non-stale Incremental Planning," filed in the U.S. Patent and Trademark Office on Jul. 8, 2004, having at least one common inventor as the present document and hereby incorporated by reference. The present application is also a continuation-in-part of and claims priority to U.S. patent application Ser. No. 12/511,313, entitled "Computer Program Product and Method for Sharing Information Between Multiple Computer Applications Using a Grafted Model Network," filed in the U.S. Patent and Trademark Office on Jul. 29, 2009, having at least one common inventor as the present document and hereby incorporated by reference. The present application is also a continuation-in-part of and claims priority to U.S. patent application Ser. No. 12/730,805, entitled "Computer Program Product and Method for Sales Forecasting and Adjusting a Sales Forecast," filed in the U.S. Patent and Trademark Office on Mar. 24, 2010, having at least one common inventor as the present document and hereby incorporated by reference.

BACKGROUND OF THE INVENTION

1. Field of the Invention

The present invention is generally related to enterprise value chains, and more particularly to a system, computer program and method for implementing and managing a value chain network.

2. Discussion of the Background

In an increasingly global economy, there is a need for computer networks to share information between computer applications and to better adapt to meet the needs of the business enterprise(s) and computer applications using such networks. Business enterprises of all types are faced with the challenge of managing and optimizing ever more complex supply chains. These supply chains, often called "value chains," are characterized by a high degree of collaboration, cooperation, and interdependency between the enterprise and other entities or partners in the chain (e.g., raw materials producers, component manufacturers, distributors, and the like). The business goal of managing and optimizing a value chain is to minimize the costs incurred by all participants in the chain while maintaining a high level of customer service and maximizing profits. In order to achieve this goal, the enterprise strives to reduce the quantity of stored goods in the value chain; white minimizing opportunity loss by maintaining a sufficient inventory level to satisfy customer demand.

To meet customer demand, an enterprise forecasts the demand of the future and creates a plan of the movement and placement of the inventory to meet the customer demand. This plan typically includes a plurality of actions that need to be taken to maintain the inventory at a certain level white maximizing customer service level. An important aspect of managing the value chain is the execution of this plan. However since the value chain can be complex and may involve multiple partners, unexpected events and contingencies often occur that adversely impact the inventory levels and the ability of the enterprise to meet demands. For example, a delivery truck may break down causing an interruption in supply, or a storm may cause a large unexpected rise in demand for construction materials. These unexpected events hereinafter referred to as "exceptions," cause the state of the value chain to deviate from the existing plan. The deviation may be an increase or decrease in inventory at various locations for various items and/or an inability to meet customer demand.

Value chains and/or supply chains typically span multiple companies and/or entities and sometimes include hundreds or even thousands of companies and/or entities. In the prior art, each company and/or entity maintained its own value chain system. In particular, each company and/or entity maintained its own value chain network locally on its own computer systems, databases and computer programs associated with the value chain network. Even with so-called multi-tier or multi-echelon systems known in the prior art, each company and/or entity maintained its own multi-tier or multi-echelon system. There was no single version of the truth with respect to the data associated with the value chain network, and due to the size and complexity of most value chains, schedule-driven and batch processing value chain management systems of the prior art often result in stale or out of date data being used.

Thus, there currently exist deficiencies associated with enterprise value chain logistics planning, and, in particular, with implementing and managing a value chain network.

SUMMARY OF THE INVENTION

Accordingly, one aspect of the present invention is to provide a computer program product embodied on a non-transitory computer readable medium for implementing and managing a value chain network. The computer program is implemented by one or more processors executing processor instructions. The computer program product includes (i) a first computer code for allowing a first and second company in a value chain network to access to a shared database on a service provider computer over a network. A first plurality of fields in the shared database are uniquely associated with the first company, and a second plurality of fields in the shared database are uniquely associated with the second company. The first company includes one or more clusters of retail stores. The computer program product also includes (ii) a second computer code for linking the first company with one or more of the second plurality of fields, (iii) a third computer code for linking the second company with one or more of the first plurality of fields, (iv) a fourth computer code for periodically receiving sales information and events, including a demand event and a supply event, on the value network within at least one of the one or more clusters of retail stores, and (v) a fifth computer code for updating one or more of the first plurality of fields that are linked to the second company upon receipt of at least one selected from the group consisting of the sales information, the demand event and the supply event. The first company is linked and provided limited access to the one or more of the second plurality of fields without creating a copy of the one or more of the second plurality of fields. The second company is linked and provided limited access to the one or more of the first plurality of fields without creating a copy of the one or more of the first plurality of fields. The one or more updated first plurality of fields are immediately accessible to the first and second company.

Another aspect of the present invention is to provide a system for implementing and managing a value chain network. The system includes a plurality of remote computers, a central server, a network interface in communication with the central server and the plurality of remote computers over a network, and a shared database in communication with the central server. The network interface is configured to receive sales information and events on the value network. The events include a demand event and a supply event. The central server is configured to (i) allow a first and second company in a value chain network to access to the shared database over the network. A first plurality of fields in the shared database are uniquely associated with the first company, and a second plurality of fields in the shared database are uniquely associated with the second company. The first company includes one or more clusters of retail stores. The central server is also configured to (ii) link the first company with one or more of the second plurality of fields, (iii) link the second company with one or more of the first plurality of fields, (iv) periodically receive the sales information and the events within at least one of the one or more clusters of retail stores, and (v) update one or more of the first plurality of fields that are linked to the second company upon receipt of at least one selected from the group consisting of the sales information, the demand event and the supply event. The first company is linked and provided limited access to the one or more of the second plurality of fields without creating a copy of the one or more of the second plurality of fields. The second company is linked and provided limited access to the one or more of the first plurality of fields without creating a copy of the one or more of the first plurality of fields. The one or more updated first plurality of fields are immediately accessible to the first and second company.

Yet another aspect of the present invention is to provide a method for implementing and managing a value chain network. The method is implemented by one or more processors executing processor instructions stored on a computer readable medium. The method includes the processor implemented steps of (i) allowing a first and second company in a value chain network to access to a shared database on a service provider computer over a network. A first plurality of fields in the shared database are uniquely associated with the first company, and a second plurality of fields in the shared database are uniquely associated with the second company. The first company includes one or more clusters of retail stores. The method also includes the processor implemented steps of (ii) linking the first company with one or more of the second plurality of fields, (iii) linking the second company with one or more of the first plurality of fields, (iv) periodically receiving sates information and events, including a demand event and a supply event, on the value network within at least one of the one or more clusters of retail stores, and (v) updating one or more of the first plurality of fields that are linked to the second company upon receipt of at least one selected from the group consisting of the sales information, the demand event and the supply event. The first company is linked and provided limited access to the one or more of the second plurality of fields without creating a copy of the one or more of the second plurality of fields. The second company is linked and provided limited access to the one or more of the first plurality of fields without creating a copy of the one or more of the first plurality of fields. The one or more updated first plurality of fields are immediately accessible to the first and second company.

Another aspect of the present invention is to provide a computer program product embodied on a non-transitory computer readable medium for implementing and managing a value chain network. The computer program is implemented by one or more processors executing processor instructions. The computer program product includes (i) a first computer code for allowing a first and second company in a value chain network to access to a shared database on a service provider computer over a network. A first plurality of fields in the shared database are uniquely associated with the first company and include first sales information, first inventory information and first supply information. A second plurality of fields in the shared database are uniquely associated with the second company and include second sales information, second inventory information and second supply information. The first company includes one or more clusters of retail stores. The computer program product also includes (ii) a second computer code for linking the first company with one or more of the second plurality of fields, (iii) a third computer code for linking the second company with one or more of the first plurality of fields, (iv) a fourth computer code for receiving sales information, inventory information, supply information and events on the value network, (v) a fifth computer code for updating one or more of the first plurality fields that are linked to the second company upon receipt of at least one selected from the group consisting of the received sales information, the received inventory information, the received supply information, the received one or more demand events and the received one or more supply events, and (vi) a sixth computer code for updating one or more of the second plurality of fields that are linked to the first company upon receipt of at least one selected from the group consisting of the received sales information, the received inventory information, the received supply information, the received one or more demand events and the received one or more supply events. The first company is linked and provided limited access to the one or more of the second plurality of fields without creating a copy of the one or more of the second plurality of fields. The second company is linked and provided limited access to the one or more of the first plurality of fields without creating a copy of the one or more of the first plurality of fields. The received sales information includes information from at least one of the one or more clusters of retail stores, and the received events include one or more demand events and one or more supply events. The one or more updated first plurality of fields are immediately accessible to the first and second company. The one or more updated second plurality of fields are immediately accessible to the first and second company.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein:

Figure 8A:
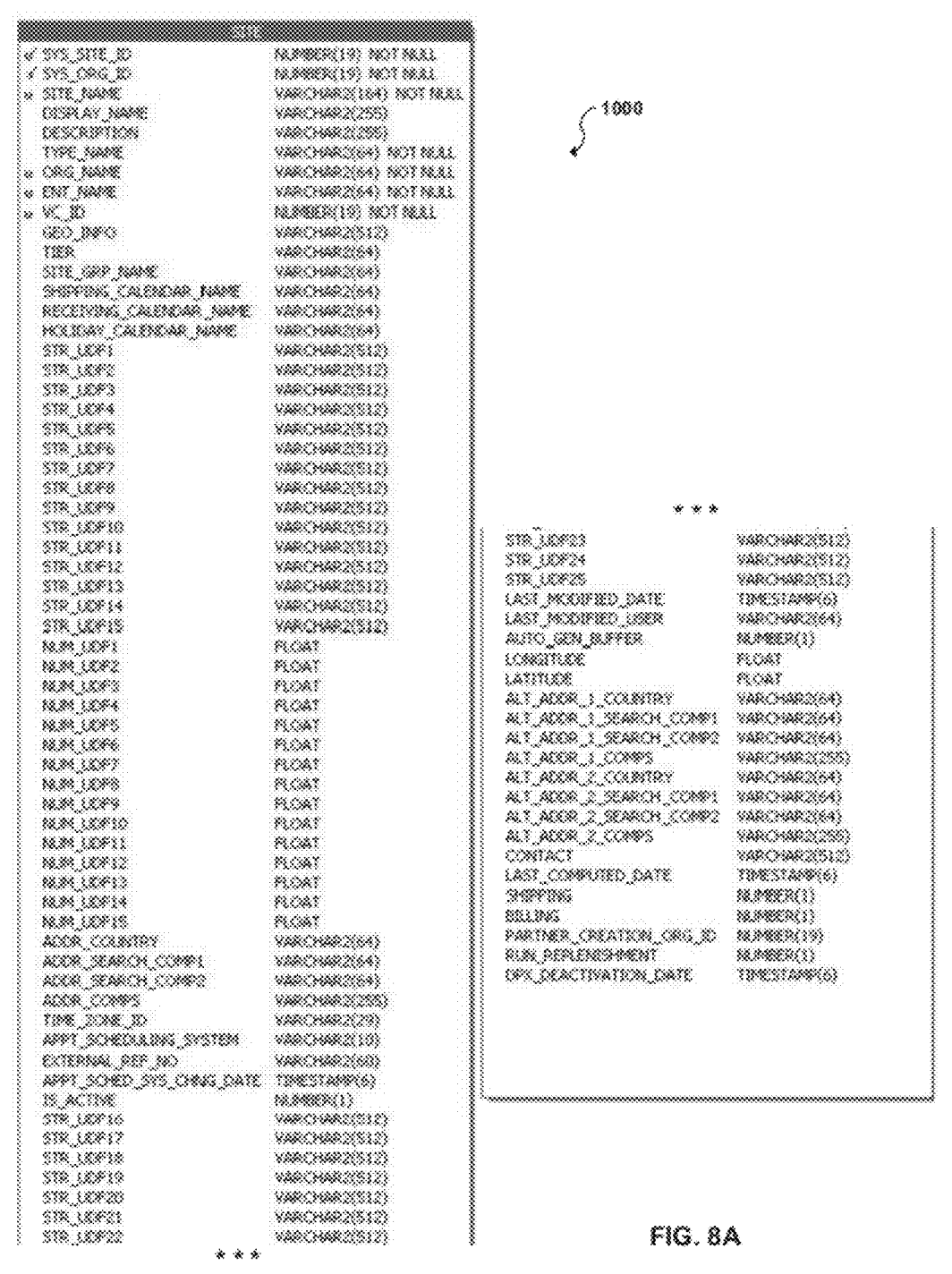
Figure 8B:
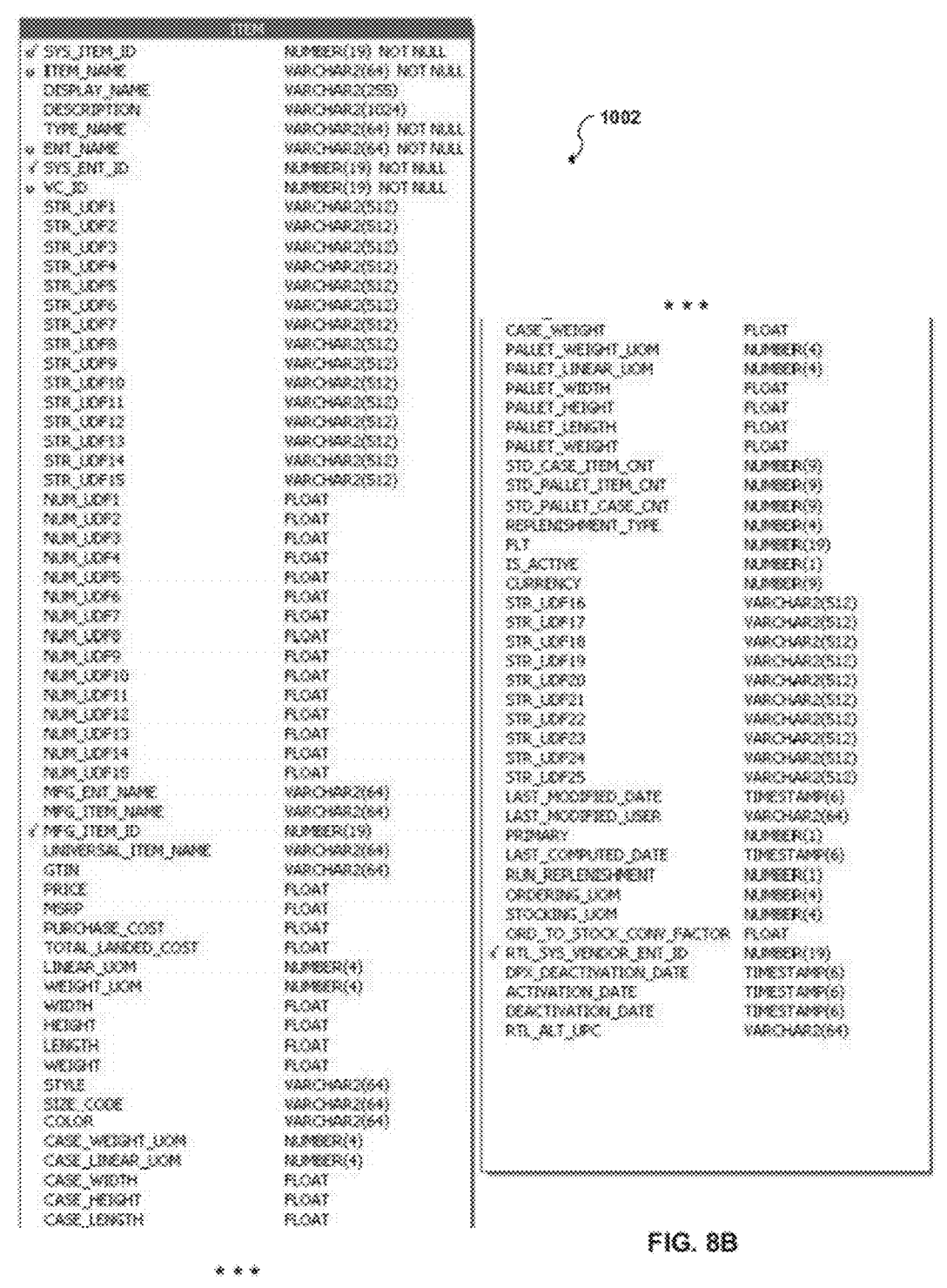
Figure 8C:
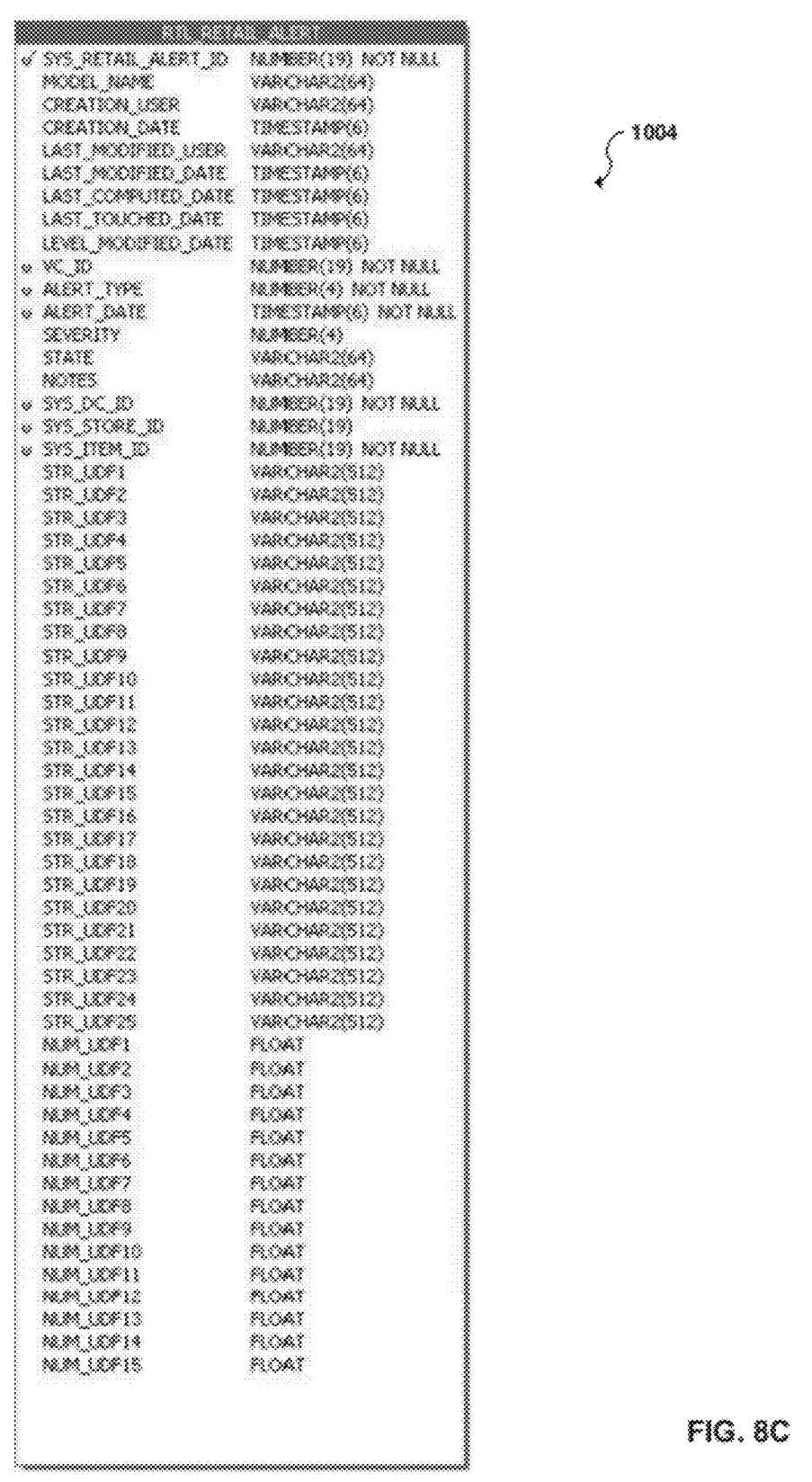
Figure 8D:
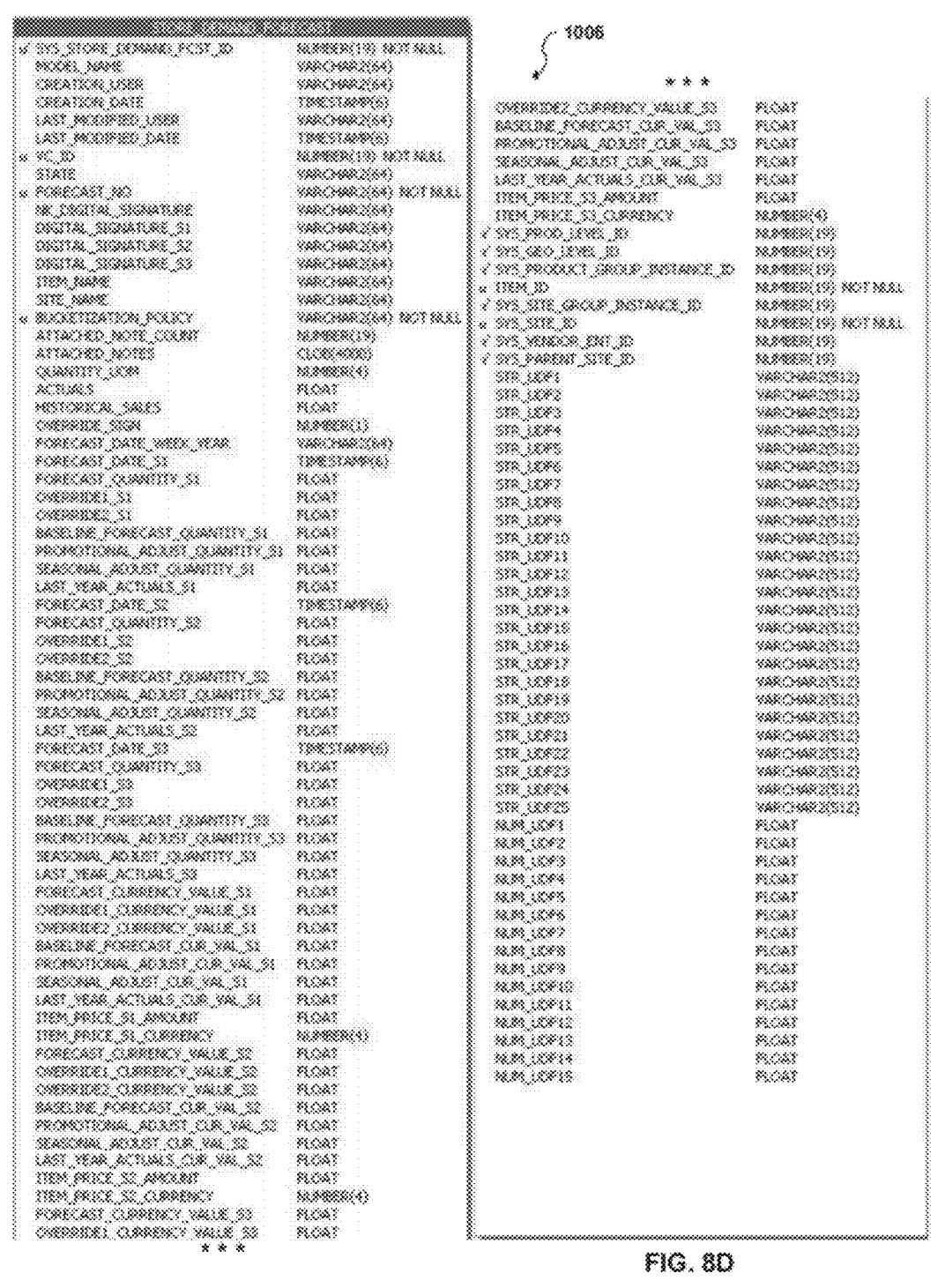
Figure 8E:
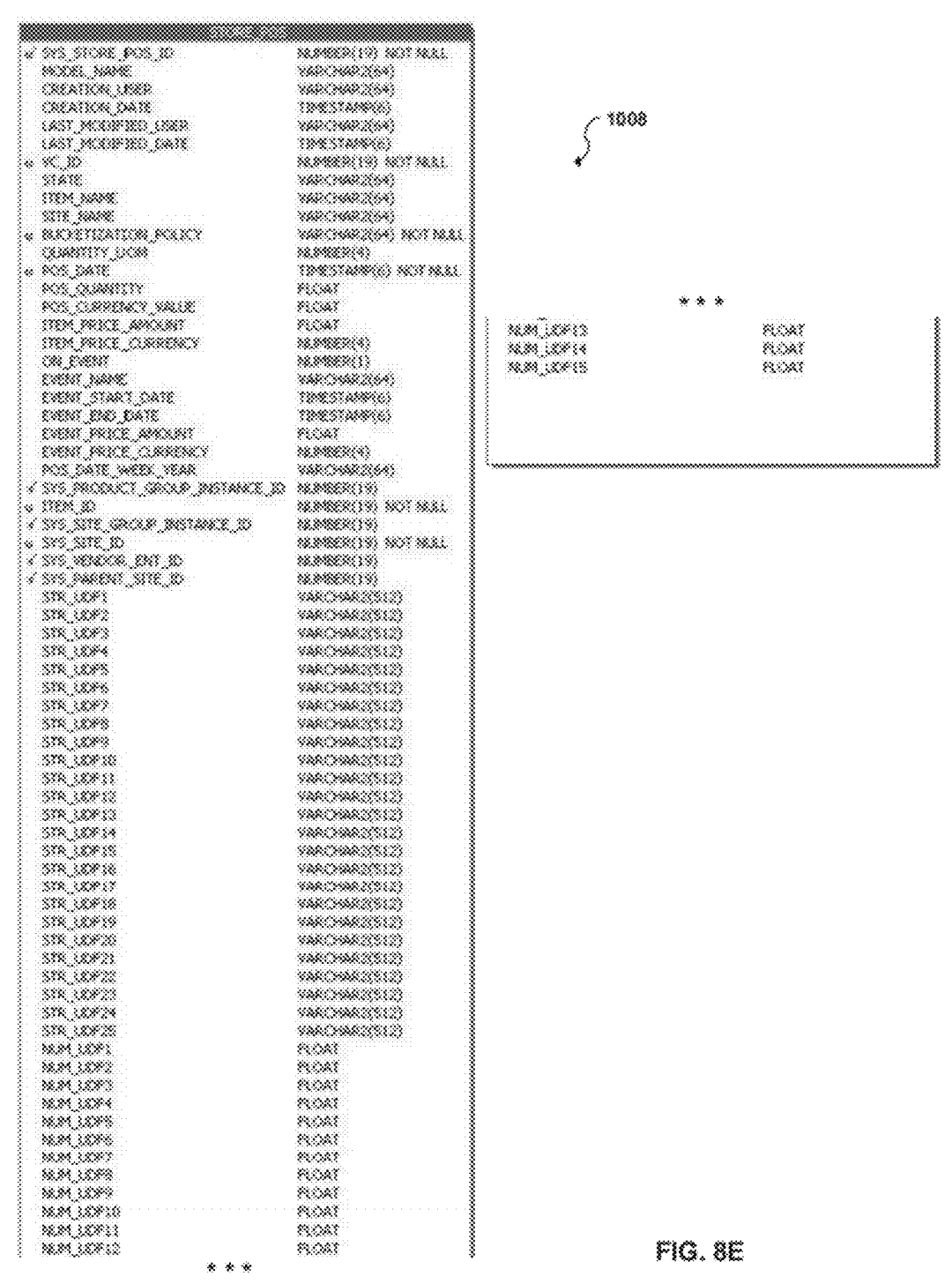
Figure 8F:
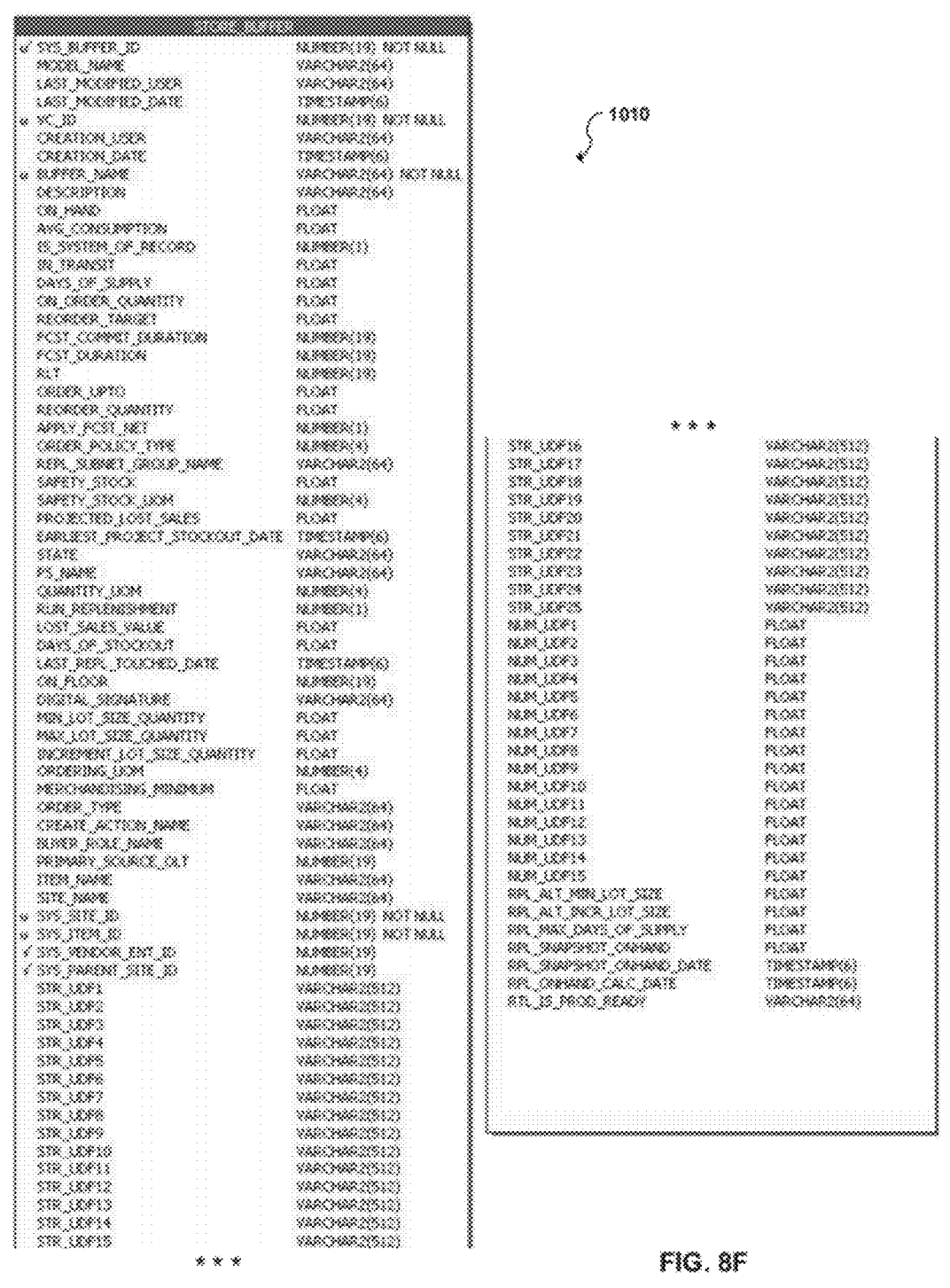

FIGS. 8A-8F illustrate exemplary database tables used by continuous forecasting in accordance with an embodiment of the present invention;

FIGS. 9A-9C illustrate portions of a computer-based system for implementing and managing a value chain network in accordance with an embodiment of the present invention.

DETAILED DESCRIPTION OF THE PREFERRED EMBODIMENTS

Figure 1:
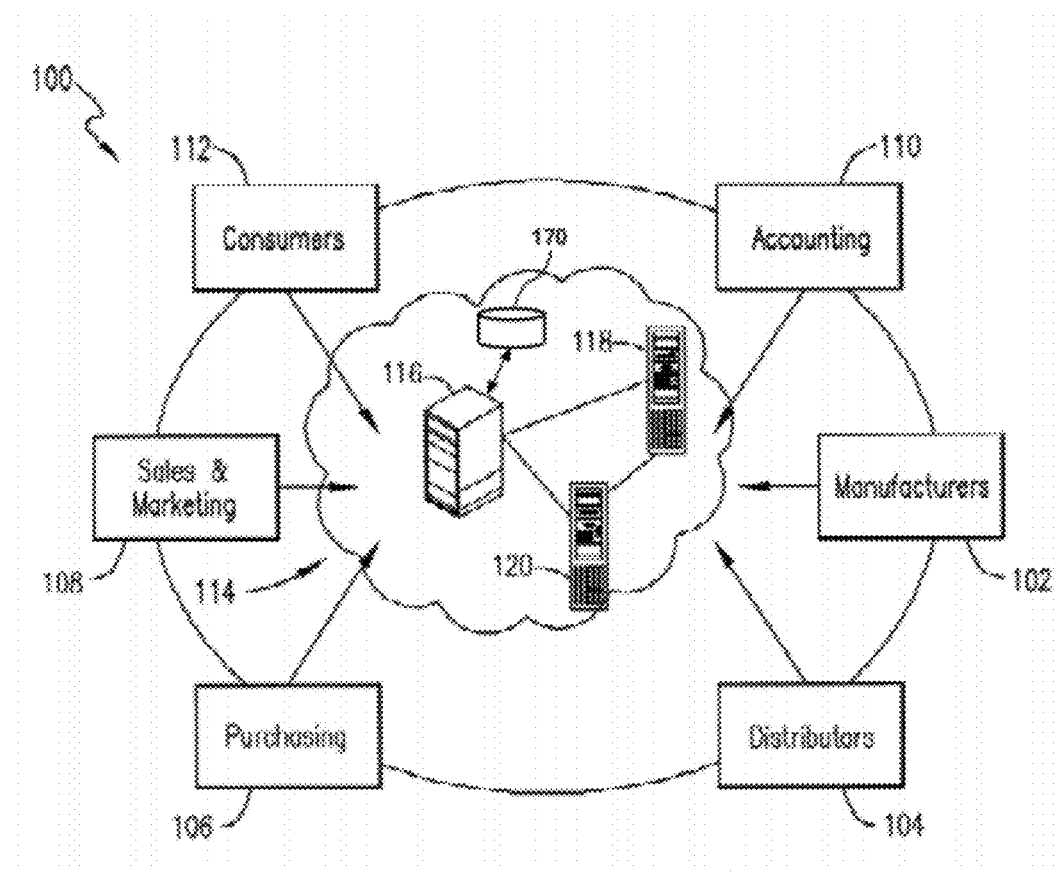
FIG. 1 is a block diagram illustrating an exemplary value chain network (or portion thereof) for an exemplary enterprise in accordance with an embodiment of the present invention.

Referring now to the drawings, wherein like reference numerals designate identical or corresponding parts throughout the several views, preferred embodiments of the present invention are described.

Figure 6A:
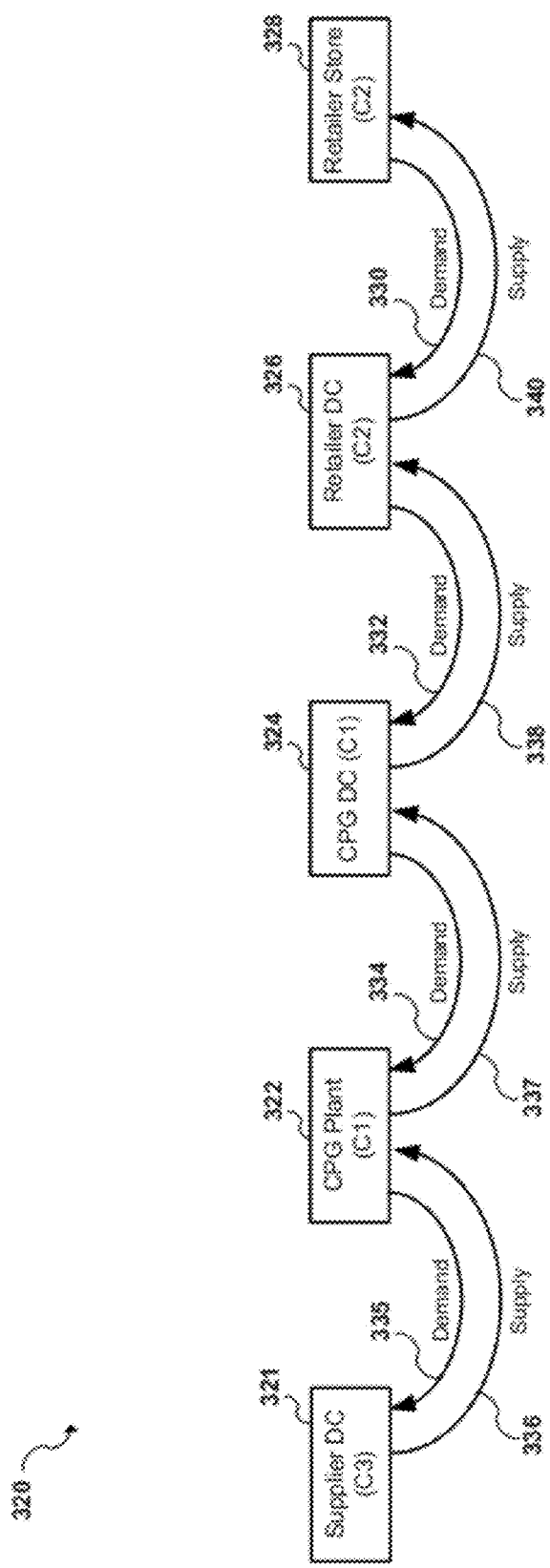
FIG. 6A is a block diagram illustrating demand propagation and supply replenishment over two exemplary companies and/or entities in a supply chain network in accordance with an embodiment of the present invention.

The present invention provides a computer program and method for implementing and managing a value chain network. A value chain network is without limitation a network of organizations, people, technology, activities, information and resources involved in moving a product or service from supplier to customer. Value chain network activities transform natural resources, raw materials and components into a finished product that is delivered to the end customer. For instance, a block diagram illustrating demand propagation and supply replenishment over two exemplary companies and/or entities in a supply chain network is shown in FIG. 6A. According to this non-limiting example, a CPG company (C1), a retailer (C2), and a supplier (C3) are represented. Blocks 321 represent C3's supplier distribution center (DC). Blocks 322 and 324 respectively represent C1's plant and distribution center (DC). Blocks 322 and 324 respectively represent C1's plant and distribution center (DC). Blocks 326 and 324 respectively represent C2's distribution center (DC) and retail store. As items are purchased by consumers at C2's store 328, demand for such items propagates to C2's distribution center (DC) 326, then to C1's distribution center (DC) 324, then to C1's plant 322, and finally to C3's distribution center (DC) 321, as indicated by demand path 330, 332, 334 and 335. In return, the item is replenished from C3's distribution center (DC) 321 to C1's plant 322, then to C1's distribution center (DC) 324, then to C2's distribution center (DC) 326 and finally to C2's store, as indicated by supply path 336, 337, 338 and 340. The inventory and information relating to a supply chain network is often highly dynamic and the database fields and tables are frequently updated.

An exemplary value chain network (or portion thereof) for an exemplary enterprise is shown in FIG. 1. The exemplary value chain 100 includes both external companies and/or entities, such as manufacturers 102 and distributors 104, as well as companies and/or entities that are internal to the enterprise, such as purchasing 106, sales and marketing 108, and accounting 110. The companies and/or entities may also include, without limitation, retailers, raw material suppliers or other suppliers, customers, and the like. These internal and external companies and/or entities collaborate and share information with one another to provide value to each other and to the enterprise in various ways that are well-known and need not be described here. In some cases, consumers 112 may also be viewed as part of the value chain 100.

The internal and external entities of the value chain 100 are linked together by a value chain management system 114. Through the value chain management system 114, the enterprise and the entities may share data and information, schedule deliveries, and generally work together to achieve the business goal of minimizing inventory for each entity. The value chain management system 114 may include, without limitation, one or more computers/servers 116, 118 and 120 in communication with one or more databases 170. The one or more computers/servers 116, 118 and 120, and the one or more databases 170, typically reside, without limitation, at the enterprise, but may be connected to the external entities over a network (not expressly shown). The computer servers 116-120 store (e.g., on a computer readable medium and/or one or more databases 170) and execute a value chain management program that includes various application tools for inventory control, purchasing, accounting, and the like. Data, engines, tables and the like associated with the value chain management program may be stored and retrieved, without limitation, in and from, the one or more databases 170.

In one non-limiting embodiment, the companies and/or entities are linked via a network, such as without limitation the Internet, an Intranet or other communication network. The system includes one or more computers computers/servers 116, 118, and 120) with one or more processors and one or more computer readable storage mediums, such as without limitation a computer hard-drive, removable drive or memory. One or more computer programs (or engines) having executable instructions may be stored on the computer readable storage medium. For instance, the value chain management program allows the various entities of the value chain 100 to collaborate with one another and with the enterprise.

Cloud Arrangement

Figure 4:
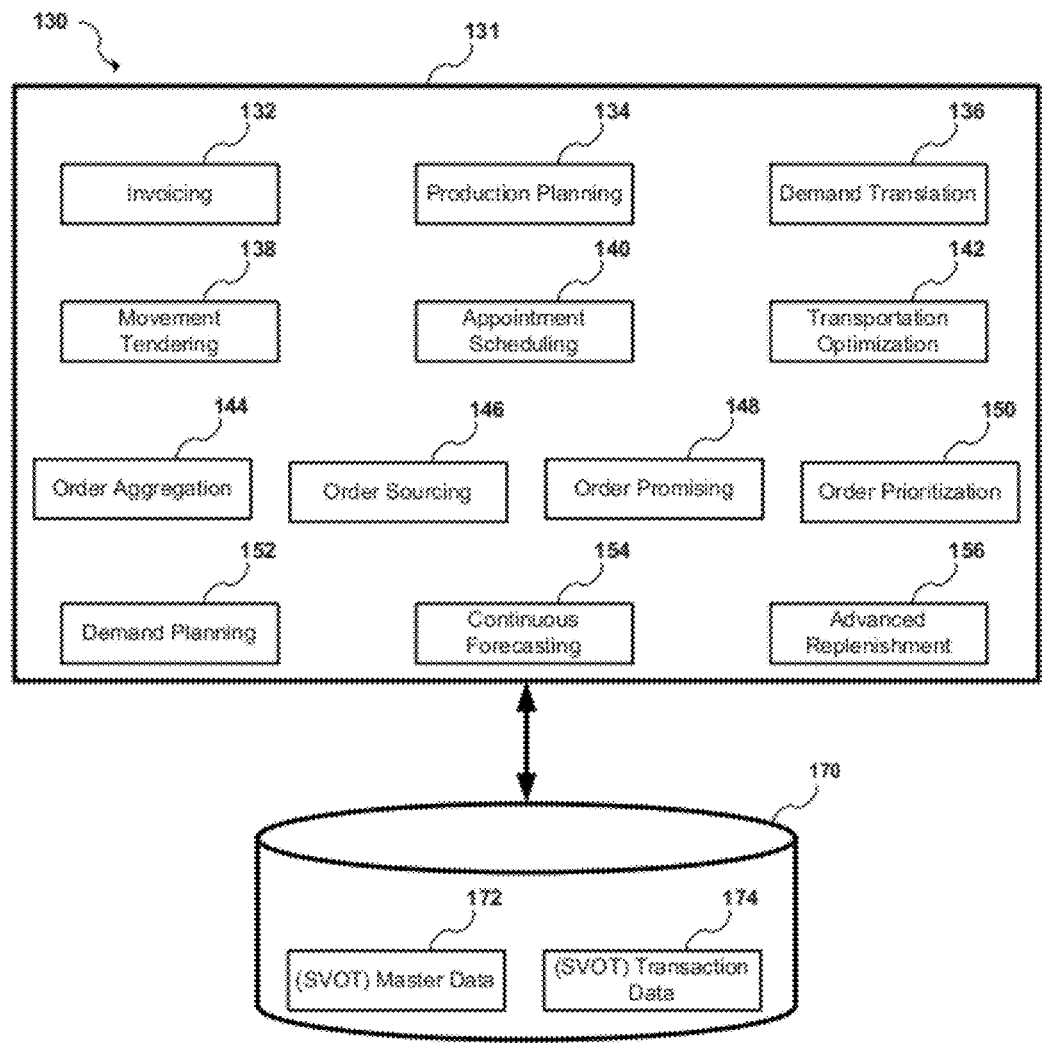
FIG. 4 is a block diagram illustrating a database arrangement for implementing and managing a value chain network in accordance with an embodiment of the present invention.

According to at least one embodiment as shown in FIG. 4, the one or more databases 170 include, without limitation, master data 172 and transaction data 174. The databases 170 are maintained by a service provider, such as One Network, for multiple companies and/or entities typically on a single server or several tightly coupled interconnected servers all under the control of the service provider. The companies and/or entities access the computational resources of the service provider, including without limitation databases 170, via a computer network, such as the Internet. This type of arrangement is often referred to as "cloud computing" in that substantially all of the computational resources and databases associated with the value chain network 100 is maintained by the service provider which is represented in FIG. 1 as value chain management system 114. Each company's and/or entity's computer may contain very little software or data (perhaps a minimal operating system and web browser only), serving as a basic display terminal connected to the Internet to access the service provider. Using the "cloud computing" arrangement of the present invention, each company and/or entity share a single version of truth (SVOT) with respect to the value chain and the master data 172 and transaction data 174 because they are both maintained in the "cloud" by the service provider. This is significant because a single version of truth was not possible in the prior art because each company and/or entity traditionally maintained its own value chain network locally on its own computer system, and, as such, duplicated the data associated with the value chain resulting in multiple versions of the truth which is often not up to date.

Single Version of the Truth

Figure 6B:
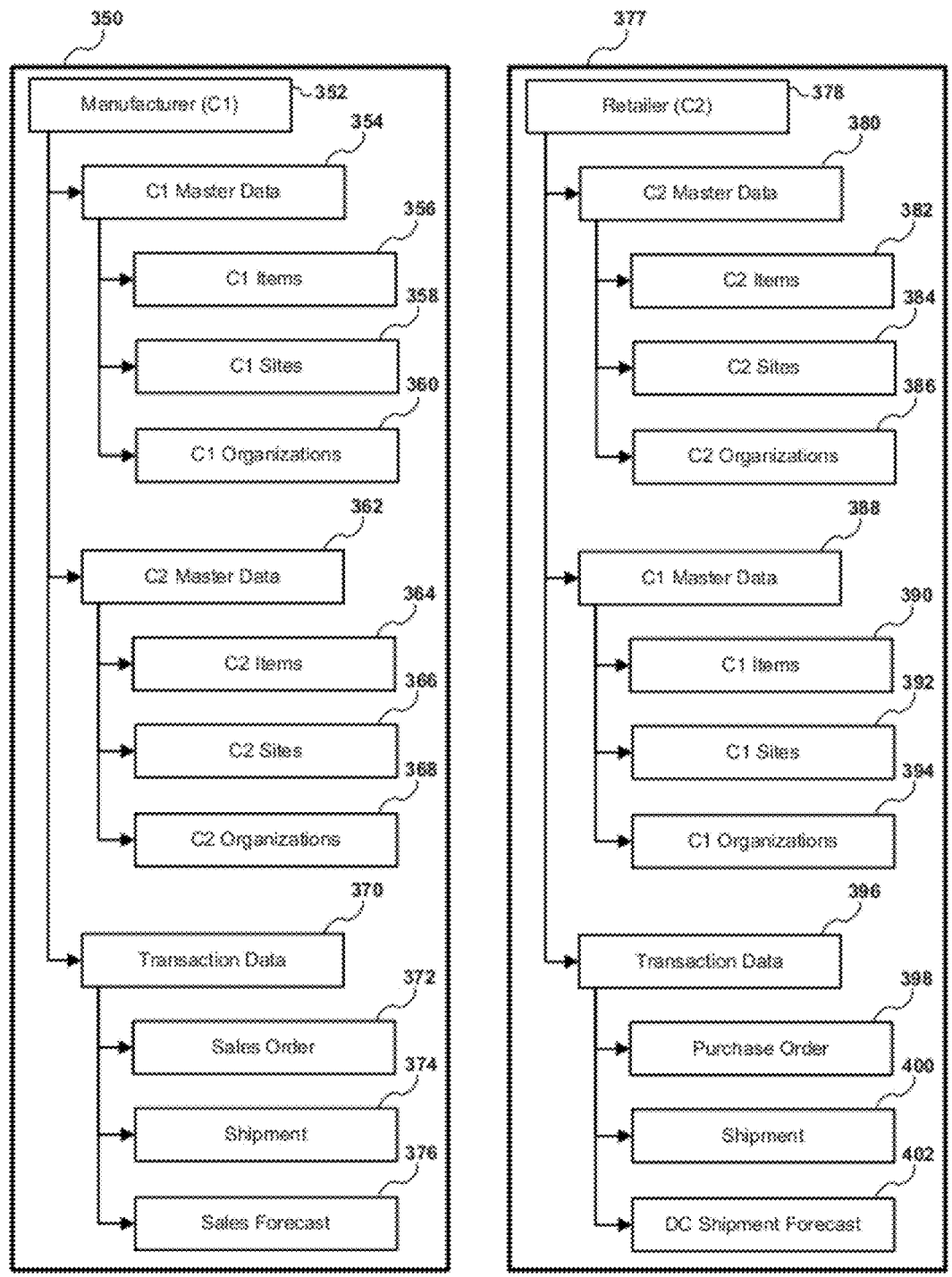
FIG. 6B is a block diagram illustrating a portion of a database arrangement for two exemplary companies and/or entities in a supply chain network in accordance with the prior art.
Figure 6C:
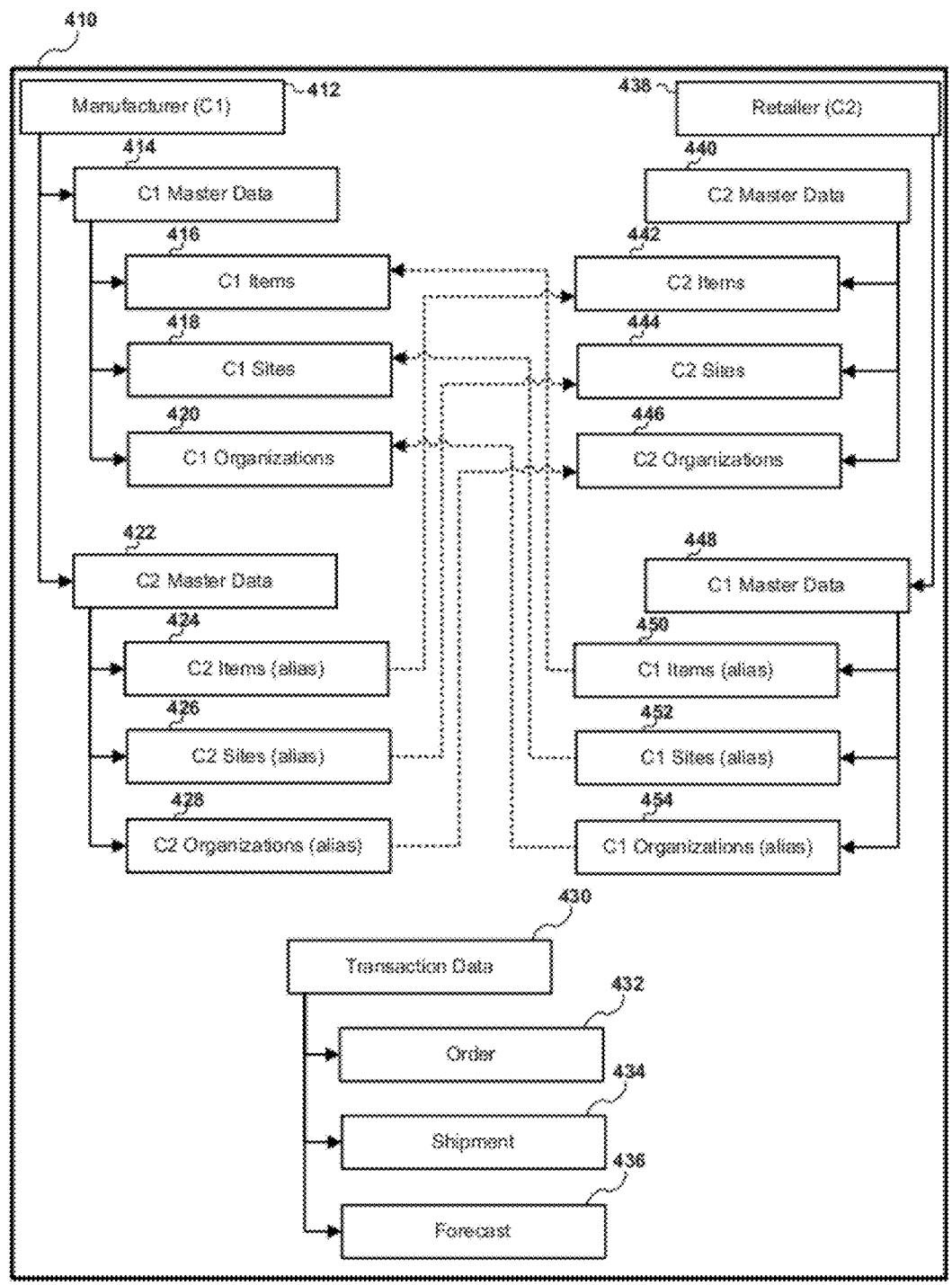
FIG. 6C is a block diagram illustrating a portion of a database arrangement for two exemplary companies and/or entities in a supply chain network in accordance with an embodiment of the present invention.

The reason that single version of truth was not possible in the prior art is best illustrated in FIGS. 6B and 6C. A block diagram illustrating a portion of a database arrangement for two exemplary companies and/or entities in a supply chain network in accordance with the prior art is shown in FIG. 6B. According to this example, manufacturing company (C1) and retailer (C2) each maintain their own separate computer systems, databases and computer programs which handle the processing for the respective company in the value chain network. Manufacturing company C1's computer systems, databases and computer programs are represented by 350. Retailer company C2's computer systems, databases and computer programs are represented by 377. As such, manufacturing company C1 includes its own master data 354 (such as item 356, site 358, and organization 360) and transaction data 370 (such as sales order 372, shipment 374, sales forecast 376), and replicates at least portions of retail company C2's master data (such as item 364, site 366, and organization 368). Likewise, retail company C2 includes its own master data 380 (such as item 382, site 384, and organization 386) and transaction data 396 (such as purchase order 398, shipment 400, DC shipment forecast 402), and replicates at least portions of manufacturing company C1's master data (such as item 390, site 392, and organization 394). Further, the sales order 372 of manufacturing company C1 and purchase order 398 of retail company C2 includes related information. Also, the sales forecast 376 of manufacturing company C1 and DC shipment forecast 402 of retail company C2 includes related information. Thus, because each company and/or entity maintained its own value chain network locally on its own computer system, the data associated with the value chain is duplicated, resulting in multiple versions of the truth which is often not up to date.

A block diagram illustrating a portion of a database arrangement for two exemplary companies and/or entities in a supply chain network in accordance with an embodiment of the present invention is shown in FIG. 6C. According to this non-limiting example, computer systems, databases and computer programs associated with the value chain network for the manufacturing company (C1) and retailer (C2) are maintained by a service provider, such as One Network. The computer systems, databases and computer programs of the service provider are represented by 410. Manufacturing company C1 includes its own master data 354 (such as item 416, site 418, and organization 420) which is shared via a soft-link, alias, foreign key or the like with retail company C2. As shown, item 424, site 426, and organization 428 are linked to C2 master data 440. Likewise, retail company C2 includes its own master data 440 (such as item 442, site 444, and organization 446) which is shared via a soft-link, alias, foreign key or the like with manufacturing company C1. As shown, item 450, site 452, and organization 454 are linked to C1 master data 414. Further, the transaction data 430 (such as order 432, shipment 434 and forecast 436) is shared as different views between manufacturing company C1 and retail company C2. Thereby, a single version of the truth is maintained.

Figure 7A:
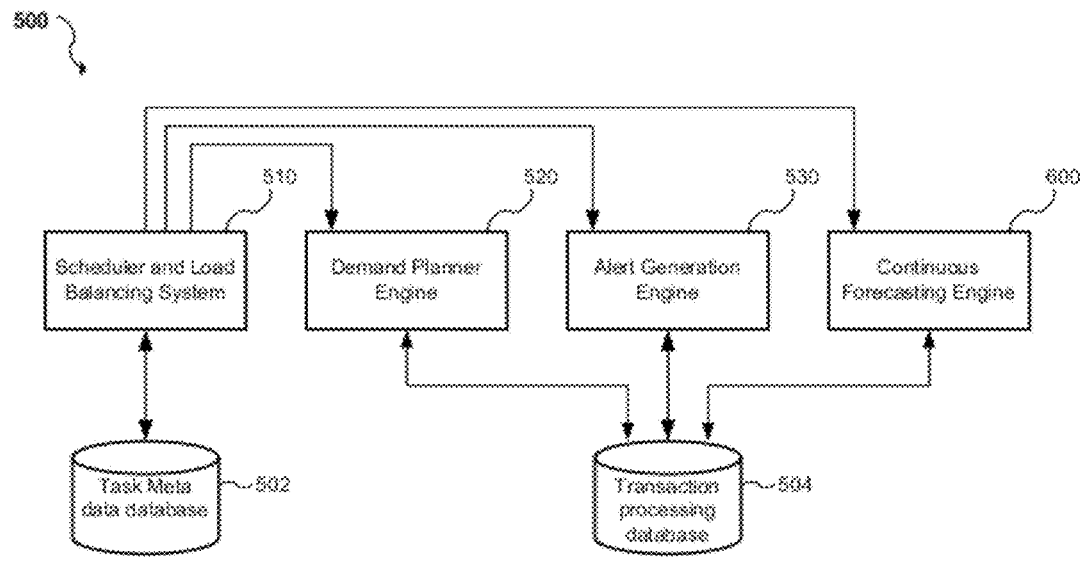
FIGS. 7A-7F are flow charts illustrating a method for continuous forecasting in accordance with an embodiment of the present invention.
Figure 7B:
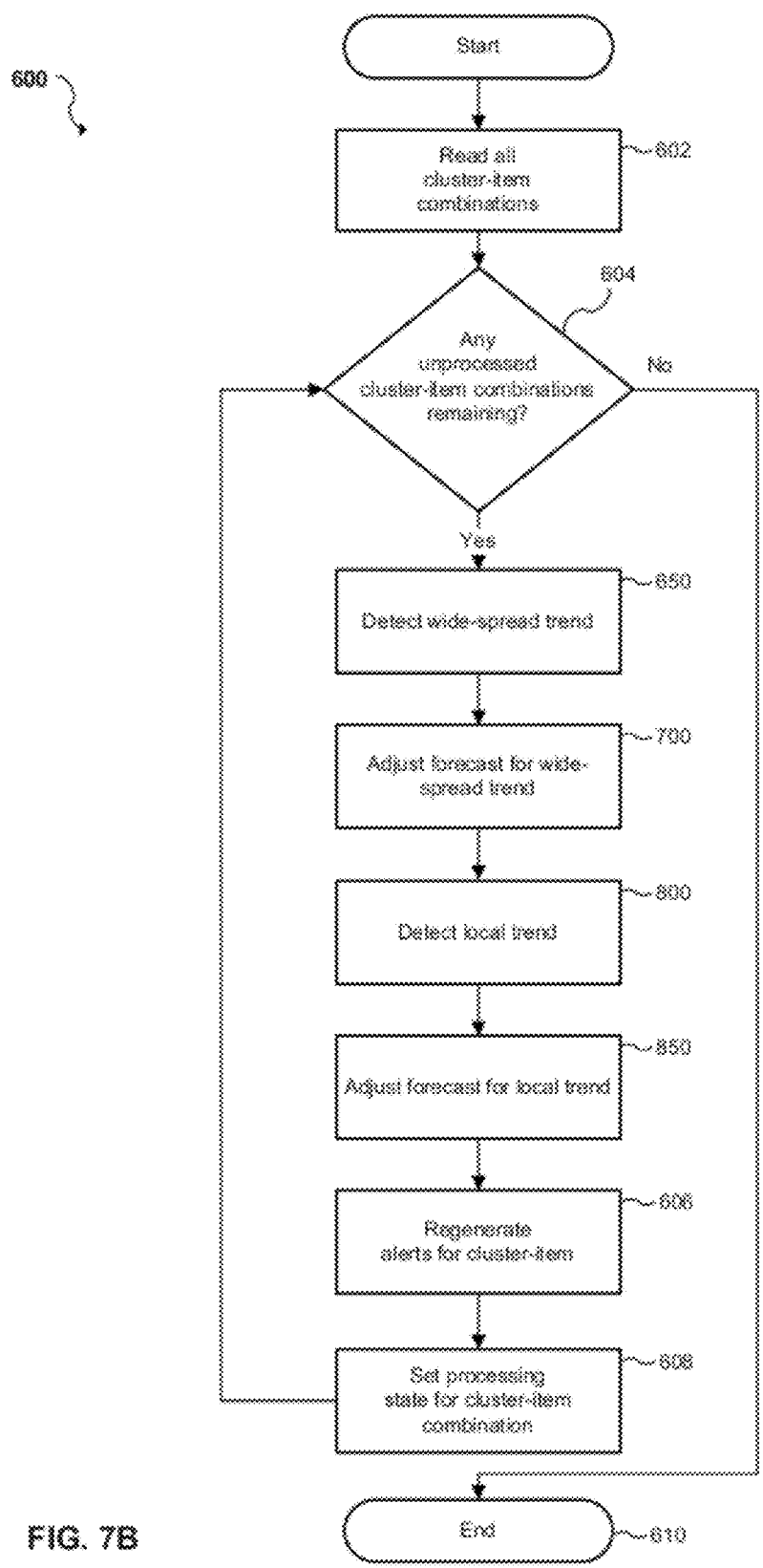

According to the present invention, each company and/or entity logs-in either directly or indirectly with computers/servers 116, 118 and/or 120 or otherwise is in communication with such. For instance, according to one possible non-limiting implementation each company and/or entity logs-in using the graphical user interface shown in FIG. 7A. After such log-in or other communication with computers/servers 116, 118 and/or 120, each company and/or entity thereby is provided access to master data 172 and transaction data 174. The master data 172 and transaction data 174 are represented once and shared with other companies and/or entities such that although each company and/or entity may have different views of the master data 172, as noted above, they share a single version of truth (SVOT) with respect to the value chain and the master data 172 and transaction data 174. Each company and/or entity is restricted to the value chain and the master data 172 and transaction data 174 by the company's and/or entity's allowed permissibility which may be predefined and/or configurable. The master and transaction data models represent the single version of truth (SVOT) for value chain and manage the business process. All the planning and execution engines will read the same data models and write to the same data models thereby eliminating data redundancy and the need for synchronizing data across multiple disconnected systems.

Referring to FIGS. 2A-2E, block diagrams illustrating exemplary arrangements of companies and/or entities in a supply chain network in accordance with an embodiment of the present invention are shown. In these figures, each row of blocks (12, 14, 16 and 18) represents a different tier or echelon of companies and/or entities in the value chain. For example, without limitation, tier 12 may represent different retailers, tier 14 may represent different distributors, tier 16 may represent different manufacturers, and tier 18 may represent different raw material suppliers.

As shown in FIG. 1, multiple companies and/or entities, such as suppliers, customers, carriers, channel partners, third-party logistic companies (3PLs) and the like, are represented as elements 12a-12d, 14a-14d, 16a-16d and 18a-18d. The interconnections between the companies and/or entities (20a-20r) represent supply chain relationships. C1, C2 and C3 represent different companies and/or entities for exemplary purposes.

Figure 2A:
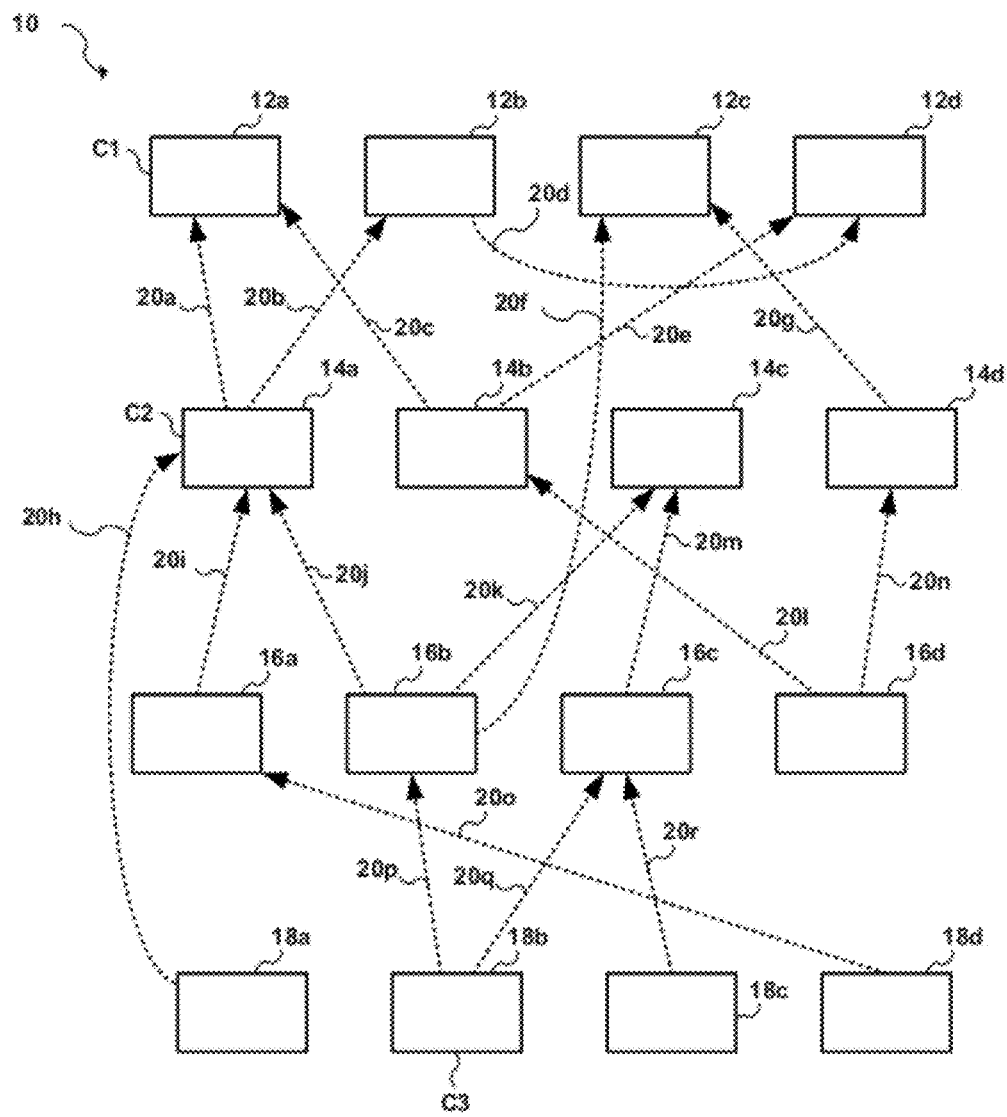
FIGS. 2A-2E are block diagrams illustrating exemplary arrangements of companies and/or entities in a supply chain network in accordance with an embodiment of the present invention.
Figure 2B:
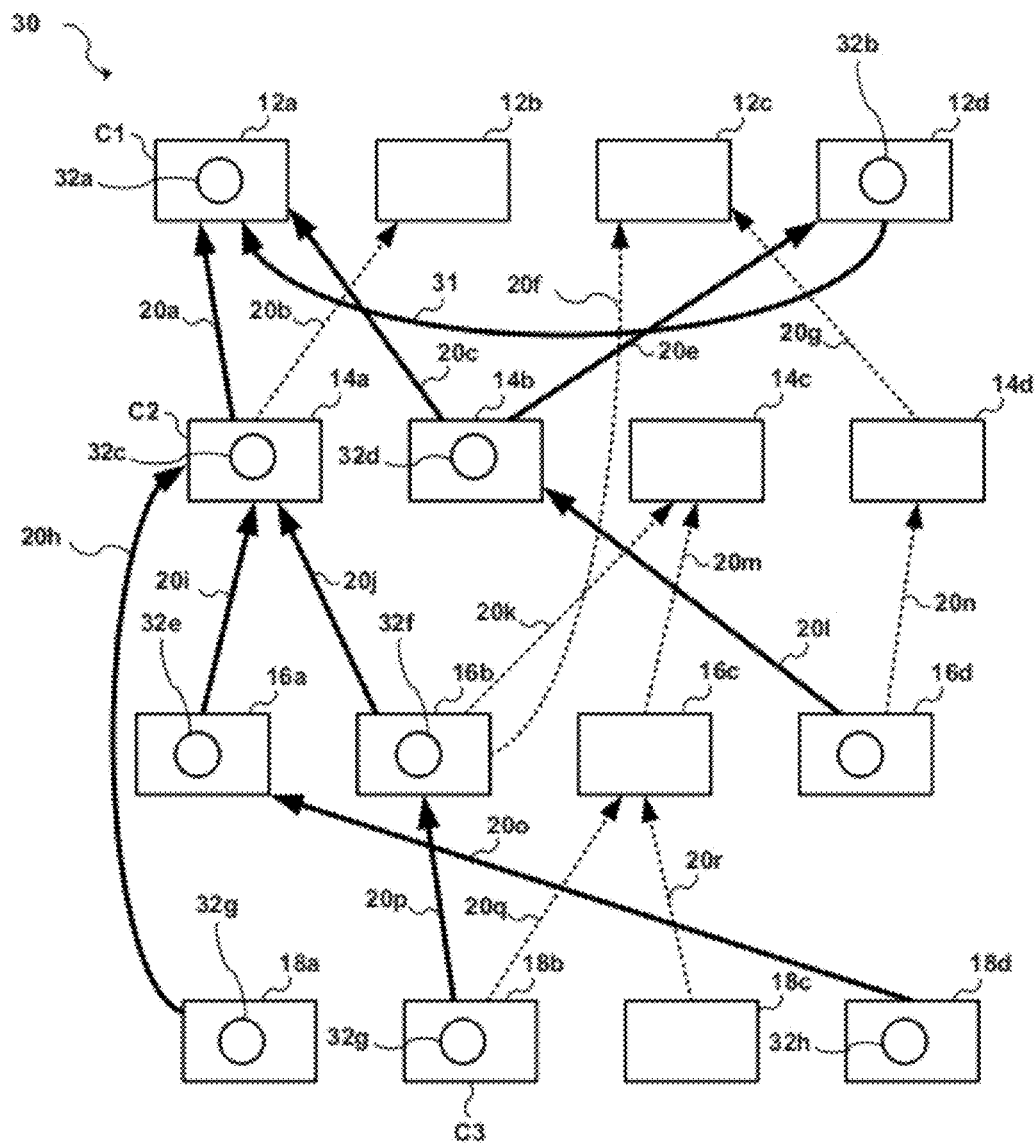
Figure 2C:
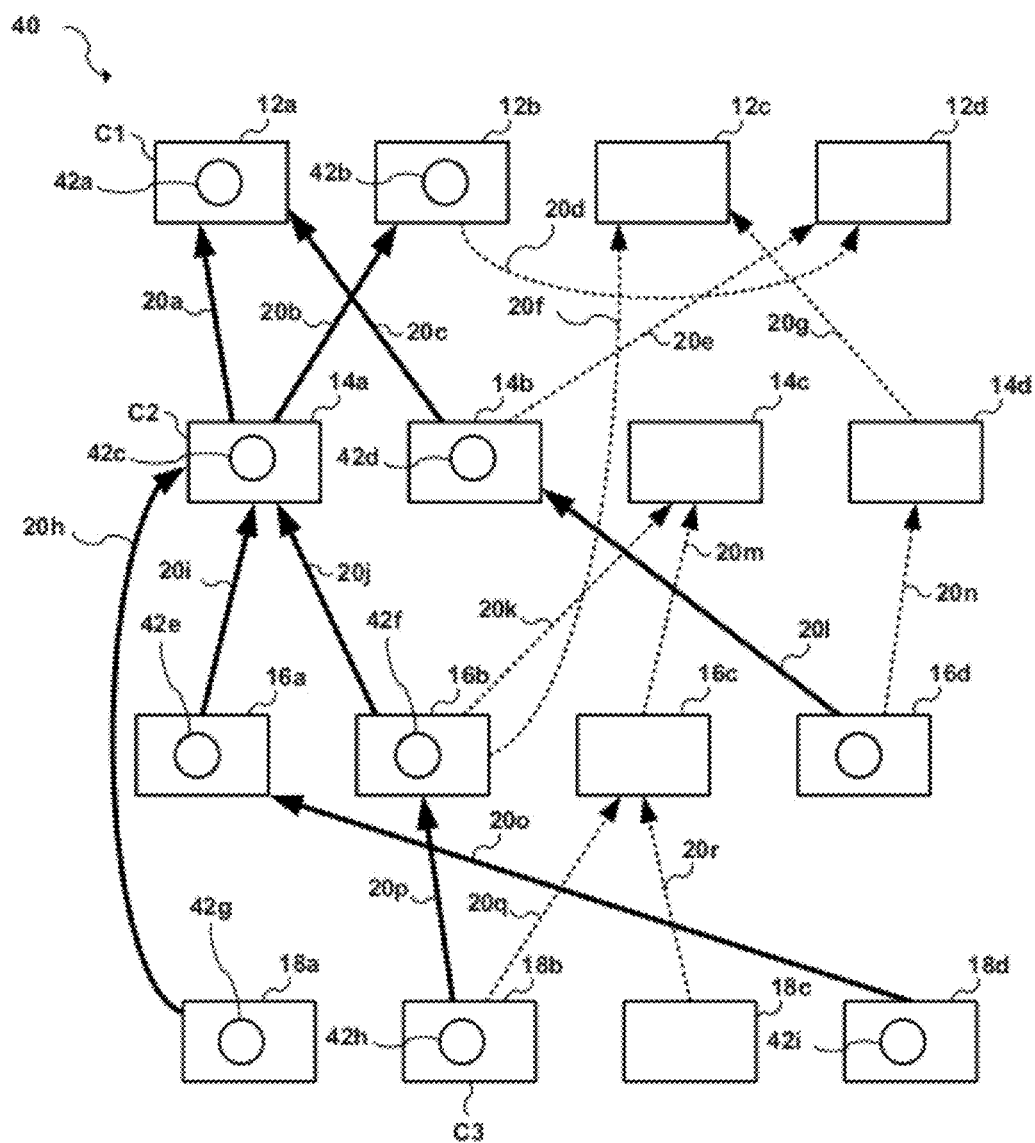
Figure 2D:
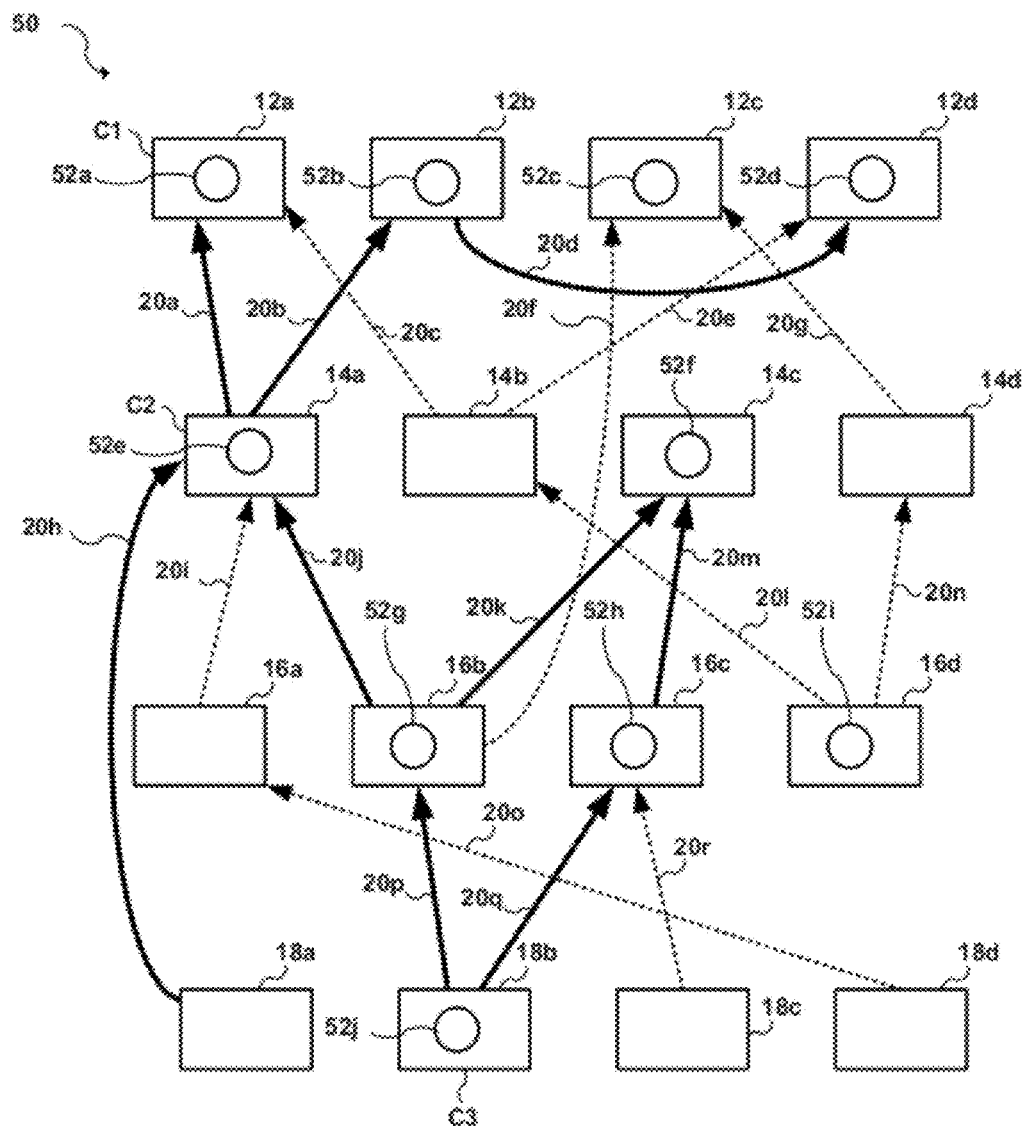
Figure 2E:
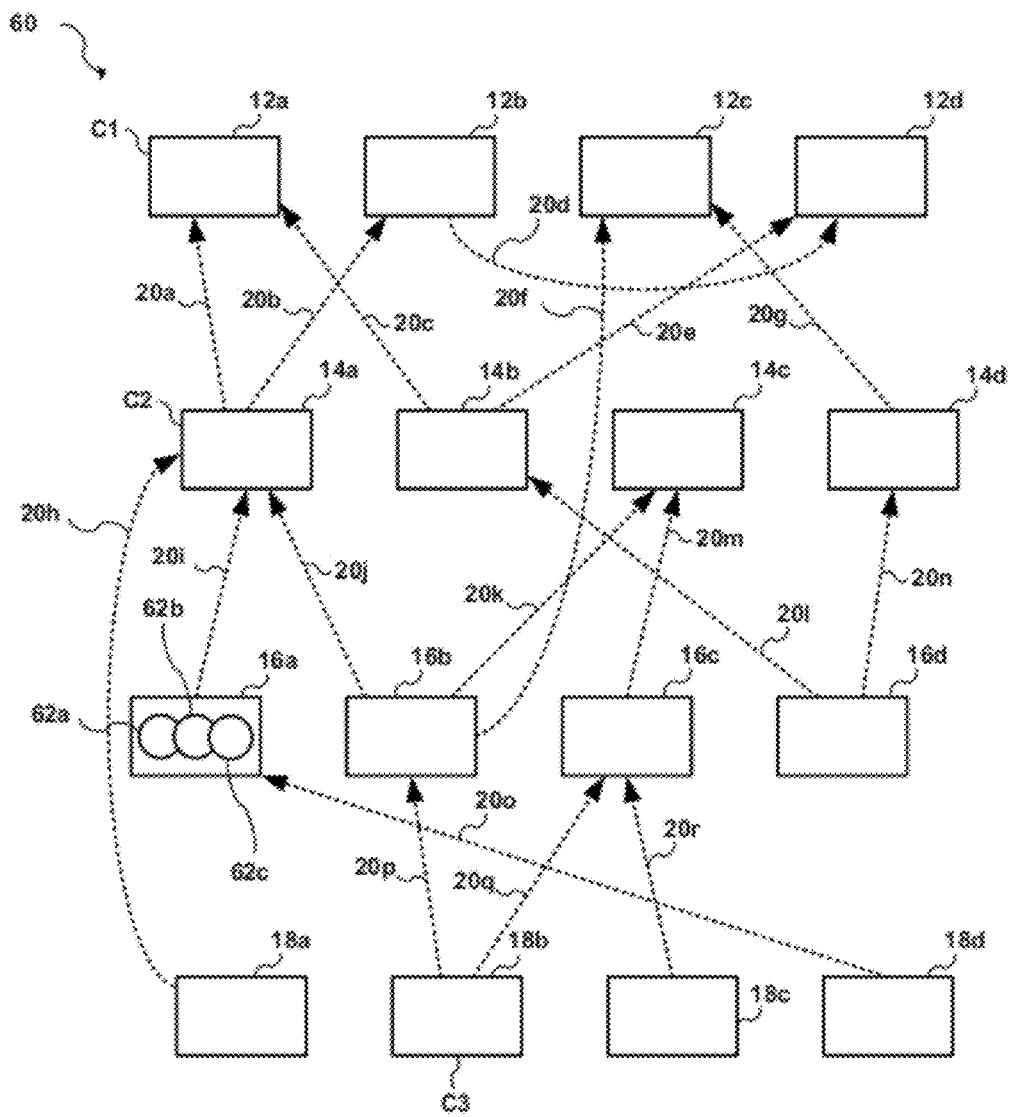

FIG. 2B illustrates an exemplary multi-echelon supply chain as implemented by C1. FIG. 2C illustrates an exemplary multi-echelon supply chain as implemented by C2. FIG. 2D illustrates an exemplary multi-echelon supply chain as implemented by C3. FIG. 2E illustrates an exemplary multi-echelon supply chain as implemented by C2. According to the example shown in FIGS. 2A-2E, all of C2's relationships are represented multiple times. C2 is represented in C1's multi-echelon supply chain. C2 is also represented in its own multi-echelon supply chain and it is represented in C3's multi-echelon supply chain. Such an arrangement could result in major negative consequences since there are multiple versions of the truth depending on whose multi-echelon supply chain is being referred to. The present invention overcomes this problem by executing multiple multi-echelon supply chains in a single many-to-many network.

According to at least one embodiment, the following multi-echelon supply chain process is run on a many-to-many network. Each company and/or entity is represented just once such that there is a single version of the truth. Any company and/or entity can be directly connected to any other company and/or entity. Instead of duplicating the information in that company and/or entity, the information in that company and/ or entity is referred to. Each company and/or entity in the many-to-many network can set permissions regarding which sub-entities within it should be visible to which other entities.

Figure 3:
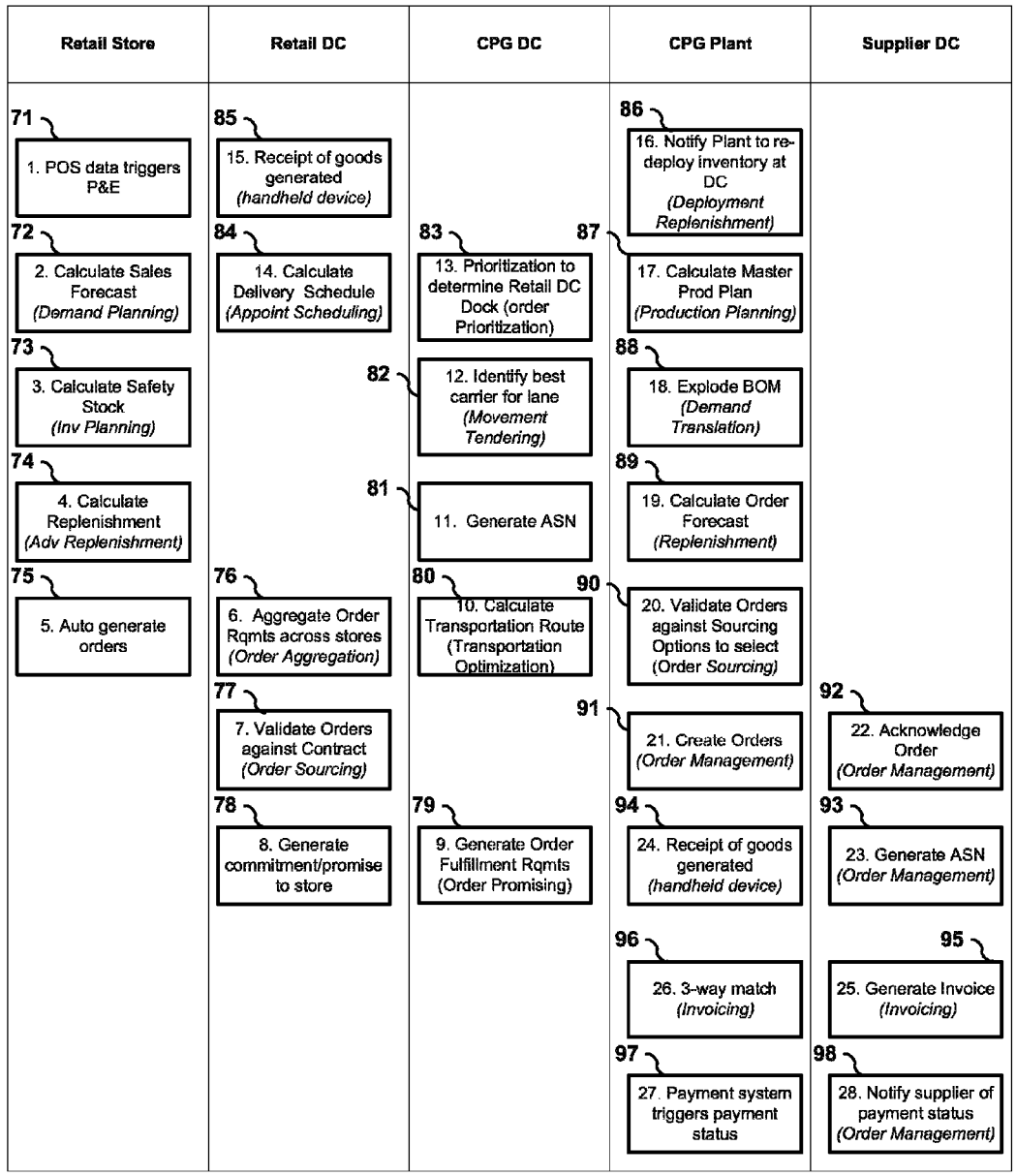
FIG. 3 is a block diagram illustrating a method for implementing and managing a value chain network in accordance with an embodiment of the present invention.

A flow chart illustrating a non-limiting method for implementing and managing a value chain network in accordance with an embodiment of the present invention is shown in FIG. 3. According to this non-limiting embodiment, logic blocks 71-75 are performed at the retail store level; logic blocks 76-78, 84 and 85 are performed at the retail distribution center (DC) level; logic blocks 71-75 are performed at the retail store level; logic blocks 79-83 are performed at the manufacturing DC level; logic blocks 86-91, 94, 96 and 98 are performed at the manufacturing plant level; and logic blocks 92, 93, 95 and 98 are performed at the supplier level.

Referring to FIG. 4, a database arrangement for implementing and managing a value chain network in accordance with an embodiment of the present invention is shown. One or more databases include one or more tables and/or data including, without limitation, Invoicing 132, Production Planning 134, Demand Translation 136, Movement Tendering 138, Appointment Scheduling 140, Transportation Optimization 142, Order Aggregation 144, Order Sourcing 146, Order Promising 148, Order Prioritization 150, Demand Planning 152, Continuous Forecasting 154 and Advanced Replenishment 156. These tables and/or data are further described in related U.S. patent application Ser. Nos. 10/887,468; 12/511,313 and 12/730,805. For instance, Demand Planning 152 and Continuous Forecasting 154 are generally disclosed in U.S. patent application Ser. No. 12/730,805, entitled "Computer Program Product and Method for Sales Forecasting and Adjusting a Sales Forecast."

The Value Chain Planning and Execution engines run on a single instance of the database, thereby enabling an end-to-end multi-echelon solution for multiple business entities coexisting in a many-to-many community network.

Figure 5A:
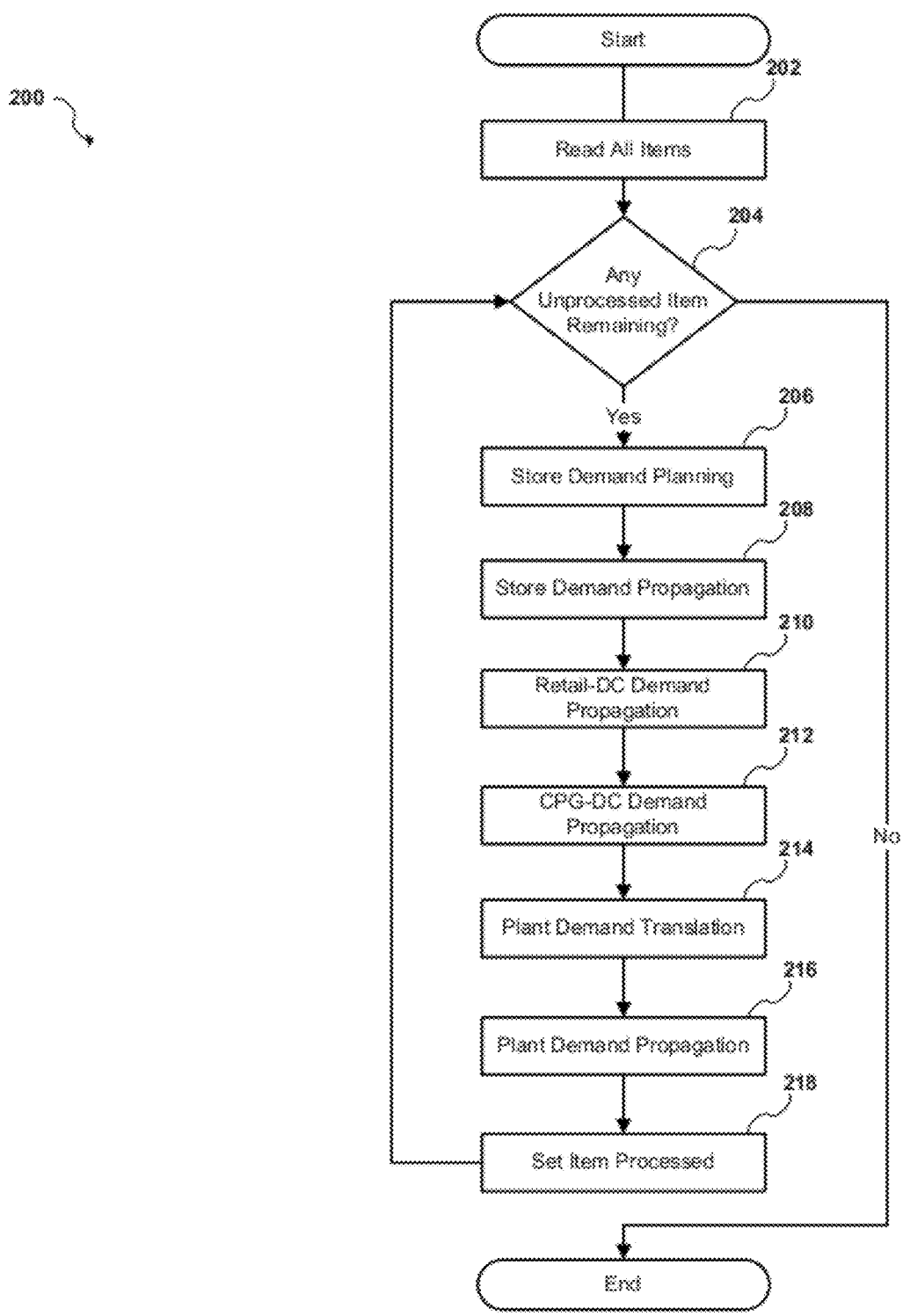
FIGS. 5A-5C are flow charts illustrating a method for implementing and managing a value chain network in accordance with an embodiment of the present invention.
Figure 5B:
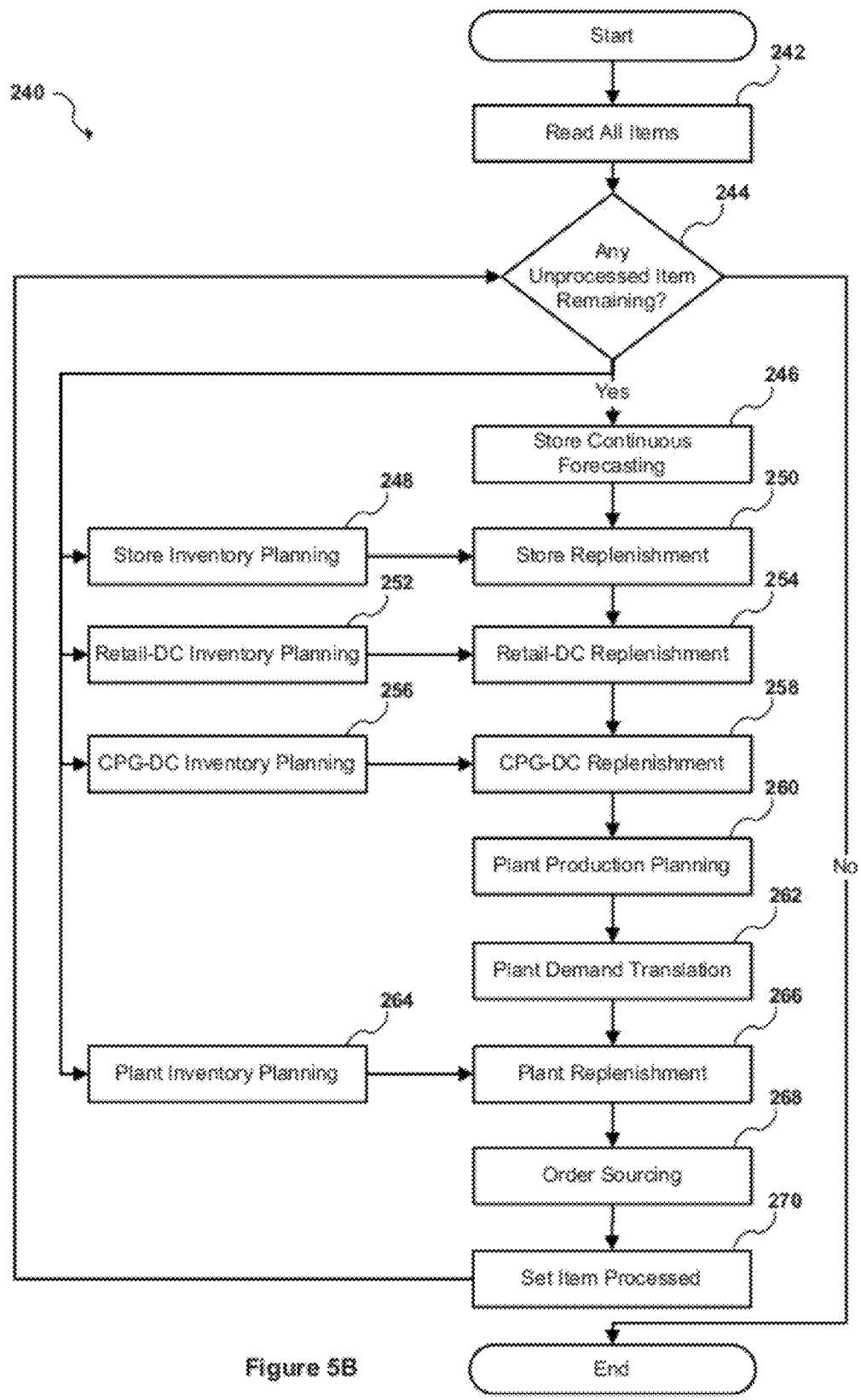
Figure 5C:
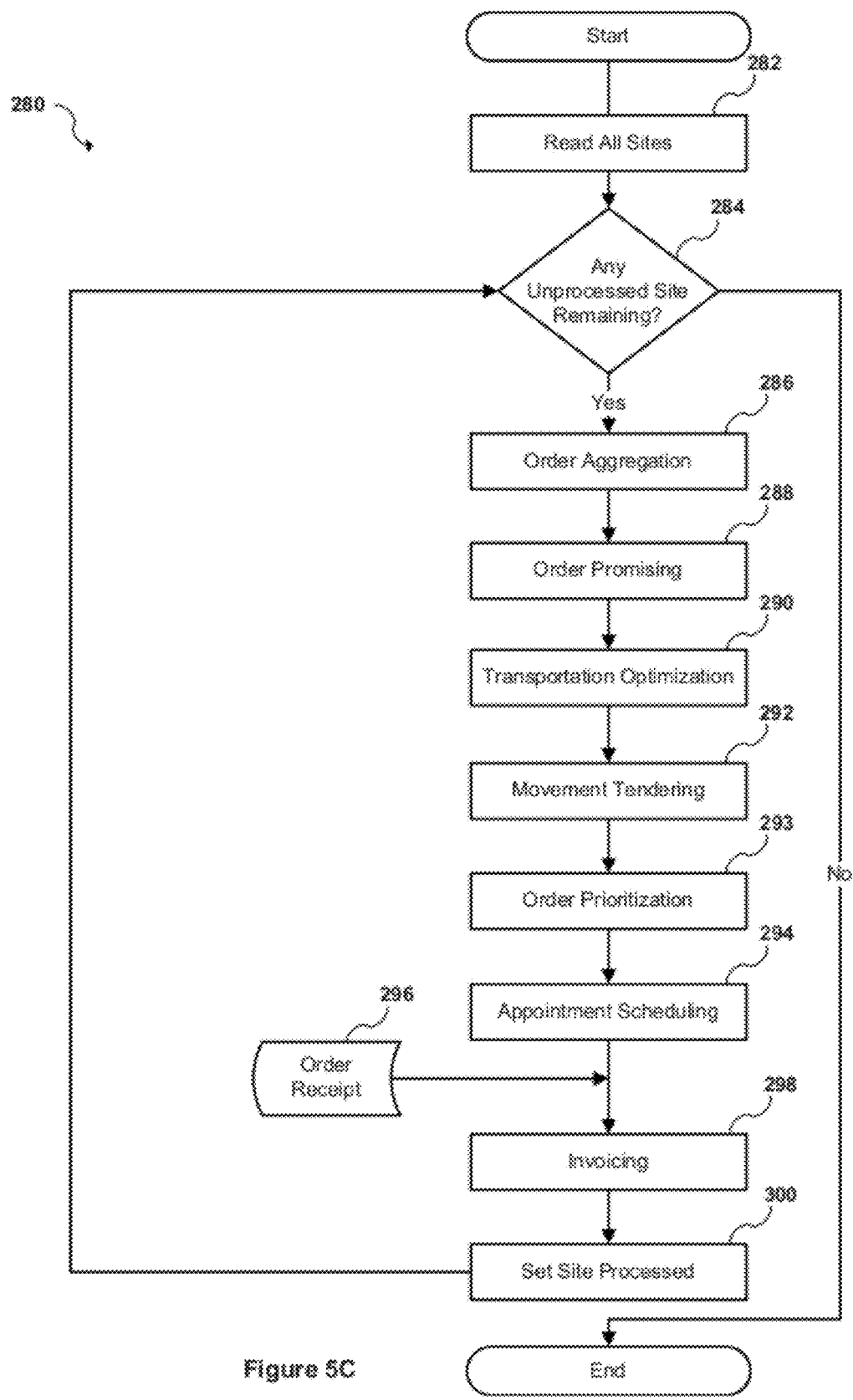

Referring to FIGS. 5A-5C, flow charts illustrating a method for implementing and managing a value chain network in accordance with an embodiment of the present invention are shown. FIG. 5A illustrates non-limiting long term planning processing over a value chain network. As shown in FIG. 5A, the items are read from the database at block 202. At logic block 204, a determination of whether there are any unprocessed items is performed. If all of the items have been processed, then processing ends. Otherwise, if any unprocessed items remain, then processing continues forecasting store sales at block 206. At block 208, store demand propagation occurs. Retail-DC demand propagation and CPG-DC demand propagation occur at blocks 210 and 212, respectively. Plant demand propagation and plant demand translation occurs at blocks 214 and 216, respectively. The item is then marked as processed at block 218 and processing continues at decision block 204 until all of the items by been processed.

Store Demand Planning

According to at least one embodiment, the present invention includes a demand planning engine that calculates the store sales forecast based on historical sales and other causal factors. The engine reads historical point of sale (POS) data, historical events (promotions and future planned events for a predetermined or configurable time period. For instance, the engine may read two or more years of historical point of sale (POS) data, historical events (promotions) and future planned events. The engine uses statistical methods to calculate a store sales forecast that includes, without limitation, a base forecast, seasonality and promotional lift. The store sales forecast drives the demand for the store replenishment engine.

Events include, without limitation, the following:

TABLE 1

EVENTS

| Name | Description |
|---|---|
| promotion events or advertising events | A promotion event is associated with a lowering of product price and advertisements of the same through mail or other medium. |
| marketing events | A marketing event is associated with the marketing of a new feature or a new product or a new application of the product. Sometimes this could include bonus packs such as buy one product and get a sample of another. |
| coupon events | Coupons are incentives to get the customer to the store to purchase the product. Marketing events are associated with coupons printed in newspapers, mailings or online. |
| temporary price | A temporary price reduction event is associated with a reduction events temporary reduction of price to give shopper incentive to purchase the product. In most cases, this type of event does not include much advertisements or campaigns to educate consumers about the price change. |
| local store events | A local store event is associated with a store running specials that are specific to that store. Typically, this happens when the store is overstocked on a type of product. For example, price mark downs on aging produce products. |
| payroll events | A payroll event is associated with the day(s) people get paychecks because sales tend to rise on these days. For example, the first of the month. |
| disaster events and weather related events | A disaster event or weather related event is associated with unanticipated events that can affect sales. For example, the area may be affected by a hurricane. |

Demand Propagation

According to at least one embodiment, the present invention includes a Demand Propagation engine that propagates the demand from one tier in supply chain to the next upstream tier. The demand is propagated thru the primary supply path and time shifted according to the order lead time from the primary supply tier. Any UnitOfMeasure conversions and Item name translations are also applied as needed.

Store Demand Propagation

Store Sales Forecast is propagated to Retail-DC as Store Order Forecast.

Retail-DC Demand Propagation

Store Order Forecast is propagated to CPG-DC as Retail-DC Purchase Order Forecast CPG-DC Demand Propagation Retail-DC Purchase Order Forecast is propagated to CPG Plant as Deployment Order Forecast.

Plant Demand Propagation

Raw Material Demand Forecast is propagated to Supplier DC as CPG Purchase Order Forecast Demand Translation According to at least one embodiment, the present invention includes a demand translation engine that reads production order forecast and bill of material. The engine generates raw material demand forecast by exploding the production order forecast for finished goods thru the bill of material (BOM) hierarchy.

FIG. 5B illustrates non-limiting supply replenishment processing over a value chain network. As shown in FIG. 5B, the items are read from the database at block 242. At logic block 244, a determination of whether there are any unprocessed items is performed. If all of the items have been processed, then processing ends. Otherwise, if any unprocessed items remain, then processing continues at block 246. At block 246, store continuous forecasting occurs. Store inventory planning and store replenishment occurs at blocks 248 and 250, respectively. Retail-DC inventory planning and retail-DC replenishment occur at blocks 252 and 254, respectively. Consumer package good manufacturer (CPG)-DC planning and CPG-DC replenishment occur at blocks 256 and 258, respectively. At block 260, plant production planning occurs. Plant demand translation occurs at block 262. Plant inventory planning and plant inventory replenishment occur at blocks 264 and 266, respectively. At block 268, order sourcing occurs. The item is then marked as processed at block 270 and processing continues at decision block 244 until all of the items by been processed.

Inventory Planning

According to at least one embodiment, the present invention includes an inventory planning engine that calculates the safety stock based on historical sales, historical forecast and historical supply. The engine reads over predetermined or configurable time period (e.g., one to two years) of historical sales data, historical forecast data and historical orders. The engine calculates the safety stock based on deviations in sales vs. forecast and uncertainty in supply. The safety stock is updated on the inventory model and used by the replenishment engine.

Store Inventory Planning

Store Safety Stock is calculated based on historical Store Sales Forecast, Store POS and Store Orders.

Retail-DC Inventory Planning

Retail-DC Safety Stock is calculated based on historical Store Order Forecast, Store Orders and Retail-DC Purchase Orders.

CPC-DC Inventory Planning

CPG-DC Safety Stock is calculated based on historical Retail-DC Purchase Order Forecast, Retail-DC Purchase Orders and CPG-DC Deployment Orders.

Plant Inventory Planning

Plant Safety Stock is calculated based on historical Raw Material Demand Forecast, Raw Material Consumption and CPG Purchase Order Forecast.

Replenishment

According to at least one embodiment, the present invention includes an advanced replenishment engine that supports multi-echelon planning across multiple business entities on a time phased configurable planning horizon.

Store Replenishment

According to at least one embodiment, the present invention includes a store replenishment engine that reads the store sales forecast, store on hand and store orders already placed. The engine calculates projected store on hand based on current store on hand consumed by store sales forecast and available store order supply. The engine then generates store order forecast to resolve projected safety stock violations aligned with the DC to store delivery schedule. The Store Order Forecast within the next delivery schedule is converted into Store Order.

Retail-DC Replenishment

According to at least one embodiment, the present invention includes a retail DC replenishment engine that reads aggregated store order forecast, retail DC on hand, retail DC safety stock and existing retail DC purchase order. The engine calculates projected retail DC on hand based on current on hand consumed by aggregated store order forecast and available retail DC purchase order supply. The engine then generates retail DC purchase order forecast to resolve projected safety stock violations aligned with the retail to DC receiving calendar and manufacturing DC shipping calendar.

CPC-DC Replenishment

According to at least one embodiment, the present invention includes a CPG-DC deployment engine that reads retail DC purchase order forecast, CPG-DC on hand and CPG-DC safety stock. The engine calculates projected CPG-DC on hand based current on hand consumed by retail DC purchase order forecast and available deployment order supply. The engine then generates deployment order forecast to resolve projected safety stock violations aligned with the CPG-DC receiving calendar and plant shipping calendar. Deployment order forecast within the frozen time period is converted to Deployment Order for execution.

Plant Replenishment

According to at least one embodiment, the present invention includes a Plant replenishment engine that reads raw material demand forecast, plant raw material on hand and plant safety stock. The engine calculates projected plant raw material on hand based on current on hand consumed by raw material demand forecast and available raw material purchase order supply. The engine the generates raw material purchase order forecast to resolve projected safety stock violation aligned with plant receiving calendar and vendor shipping calendar.

Production Planning

According to at least one embodiment, the present invention includes a production planning engine that reads deployment order forecast, current on hand and target days of supply. The engine calculates the projected days of supply based on current on hand consumed by deployment order forecast. The engine then generates production order forecast to resolve target days of supply violation constrained by production throughput capacity and aligned with the production calendar.

Order Sourcing

According to at least one embodiment, the present invention includes a sourcing engine that reads purchase order and procurement contracts. The engine calculates the price on the purchase order as per the pricing model setup in the available procurement contracts and awards the purchase order to the appropriate vendor based on configurable sourcing policy like cheapest vendor, oldest contract, and the like. The purchase order then becomes open for the selected vendor for collaboration.

FIG. 5C illustrates non-limiting order fulfillment processing over a value chain network. As shown in FIG. 5C, the sites are read from the database at block 282. At logic block 284, a determination of whether there are any unprocessed sites is performed. If all of the sites have been processed, then processing ends. Otherwise, if any unprocessed sites remain, then processing continues at block 286. Order aggregation and order promising occur at blocks 286 and 288, respectively. At block 290, transportation optimization occurs. Movement tendering occurs at block 292. Order prioritization occurs at block 293. At block 294, appointment scheduling occurs. An order receipt is generated at block 296. The order receipt triggers invoicing at block 298. The site is then marked as processed at block 300 and processing continues at decision block 284 until all of the sites by been processed.

Order Aggregation

According to at least one embodiment, the present invention includes an order aggregation engine that reads order forecast, current days of supply and equipment master data. The engine aggregates order forecasts grouped by overlapping ship-date and delivery-date time windows into full-truck purchase orders constrained by equipment capacity for the given transportation mode. The engine pulls-in order forecast from future to fill the equipment based if the projected days-of-supply is within the allowed maximum day-of-supply at the receiving inventory location.

Order Promising

According to at least one embodiment, the present invention includes an order promising engine that reads purchase order forecast, inventory on hand, product allocation and existing purchase orders. The engine calculates the projected available to promise (ATP) based on current on hand consumed by purchase order forecast. The engine then disaggregates ATP by customer channel based on production allocation committed to the customers and promises the purchase orders ranked by order priority.

Transportation Optimization

According to at least one embodiment, the present invention includes a transportation optimization engine that reads shipments and transportation contracts. The engine calculates the best optimal transportation route (movements) to lower freight cost based on transportation contracts constrained by shipping/receiving calendar and configurable transportation policy.

Movement Tendering

According to at least one embodiment, the present invention includes a tendering engine that generates movement tenders, broadcasts the tenders to the contracted carriers based on configurable tendering strategy and coordinates the tender acceptance process.

Order Prioritization

According to at least one embodiment, the present invention includes an order prioritization engine that reads orders, inventory on hand and demand forecast. The engine dynamically re-computes the order priority by ranking order line items based on projected lost sales potentially incurred if order is not received on the planned delivery date.

Appointment Scheduling

According to at least one embodiment, the present invention includes an appointment scheduling engine that reads dock door shipping/receiving calendar shipping/receiving capacity and shipments. The engine schedules pickup/delivery appointment for shipments based on shipping/receiving calendar, shipping/receiving/receiving capacity and ship/delivery dates on the shipment.

Invoicing

According to at least one embodiment, the present invention includes an invoicing engine reads inventory receipt, shipment, purchase order and procurement contract. The engine calculates the received quantity that is not yet invoiced by vendor and generates invoice based on agreed price and payment terms setup in the procurement contract. The invoice is automatically validated against shipment for shipped quantity and purchase order for ordered quantity.

Figure 5D:
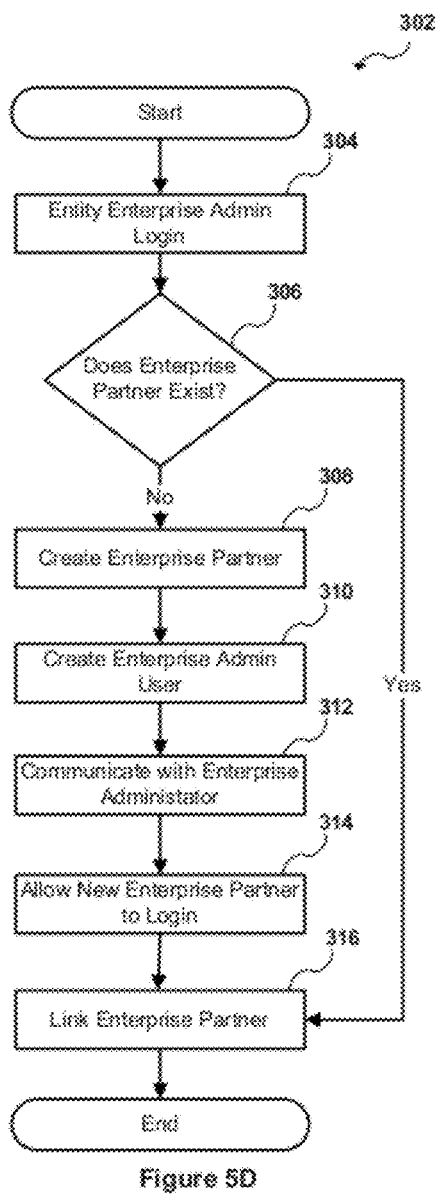
FIG. 5D is a flow chart illustrating a method for adding value chain partners to a value chain network in accordance with an embodiment of the present invention.
Figure 5E:
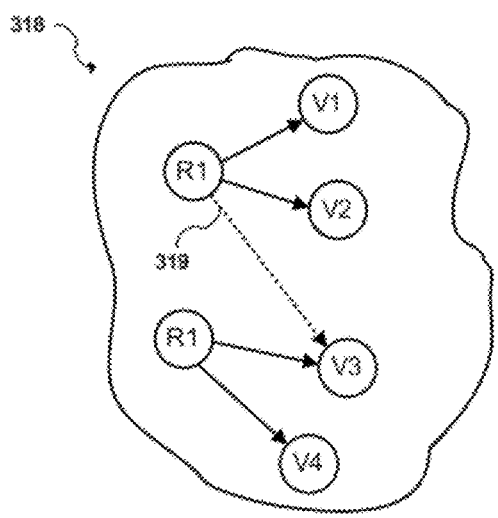
FIG. 5E illustrating an exemplary value chain partner being added to a value chain network in a supply chain network in accordance with an embodiment of the present invention.

According to at least one embodiment, companies and/or entities are connected within the value chain network as needed. For instance, a flow chart illustrating a method for adding value chain partners to a value chain network in accordance with an embodiment of the present invention is shown in FIG. 5D. According to this non-limiting example, an enterprise administrator logs-in either directly or indirectly with computers/servers 116, 118 and/or 120 or otherwise is in communication with such, and requests a partnership with a company and/or entity, A determination is made as to whether that enterprise partner company and/or entity currently exists in the value chain network at logic block 306. If the enterprise partner company and/or entity currently exist, then the enterprise partner company and/or entity are linked at block 316. For example, as shown in FIG. 5E, retail company R1 is linked to vendors V1 and V2, and retail company R2 is linked to vendors V3 and V4. Each of these companies exists in the value chain network. As shown, retail company R1 is linked to vendor V3.

Figure 7C:
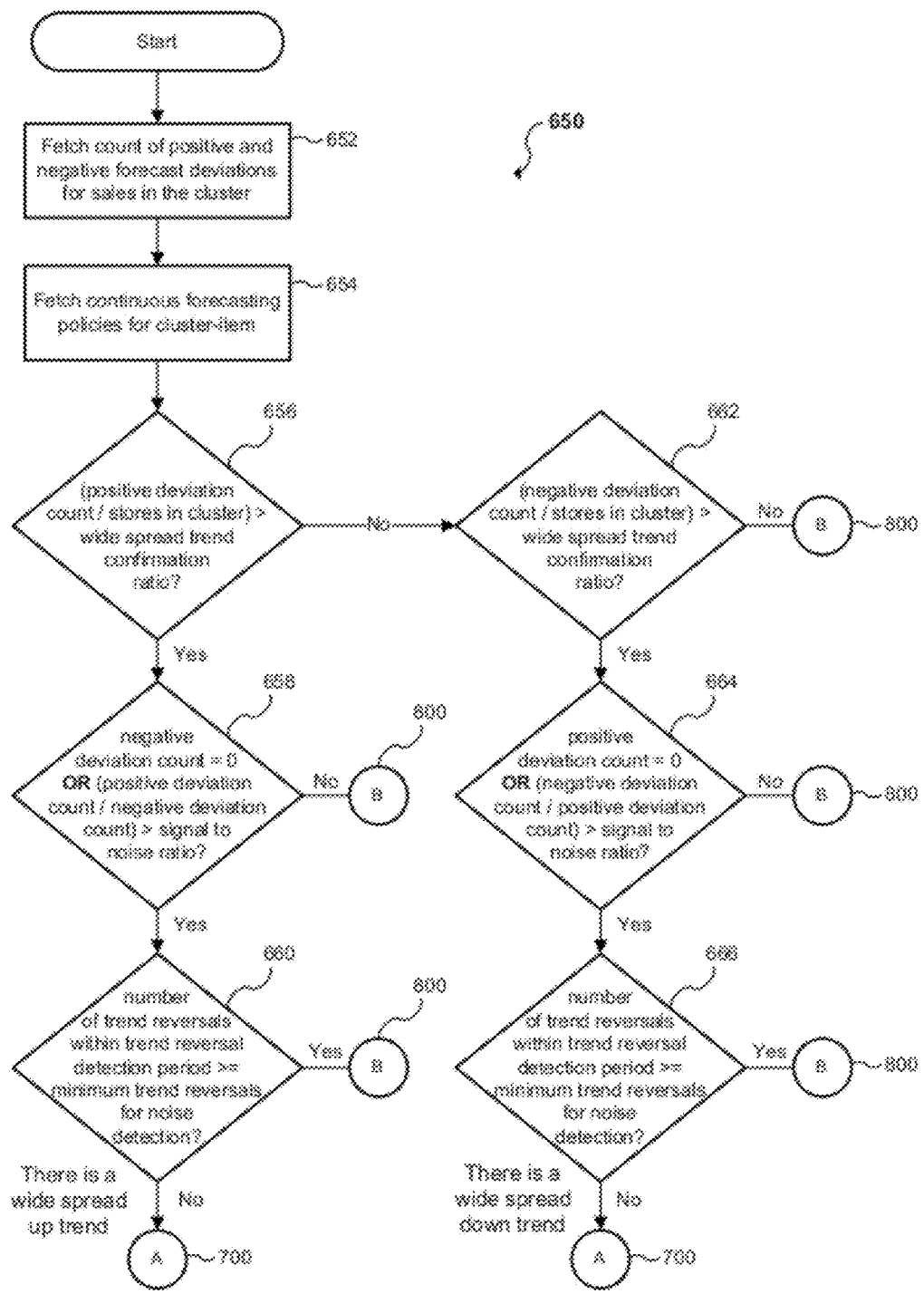
Figure 7D:
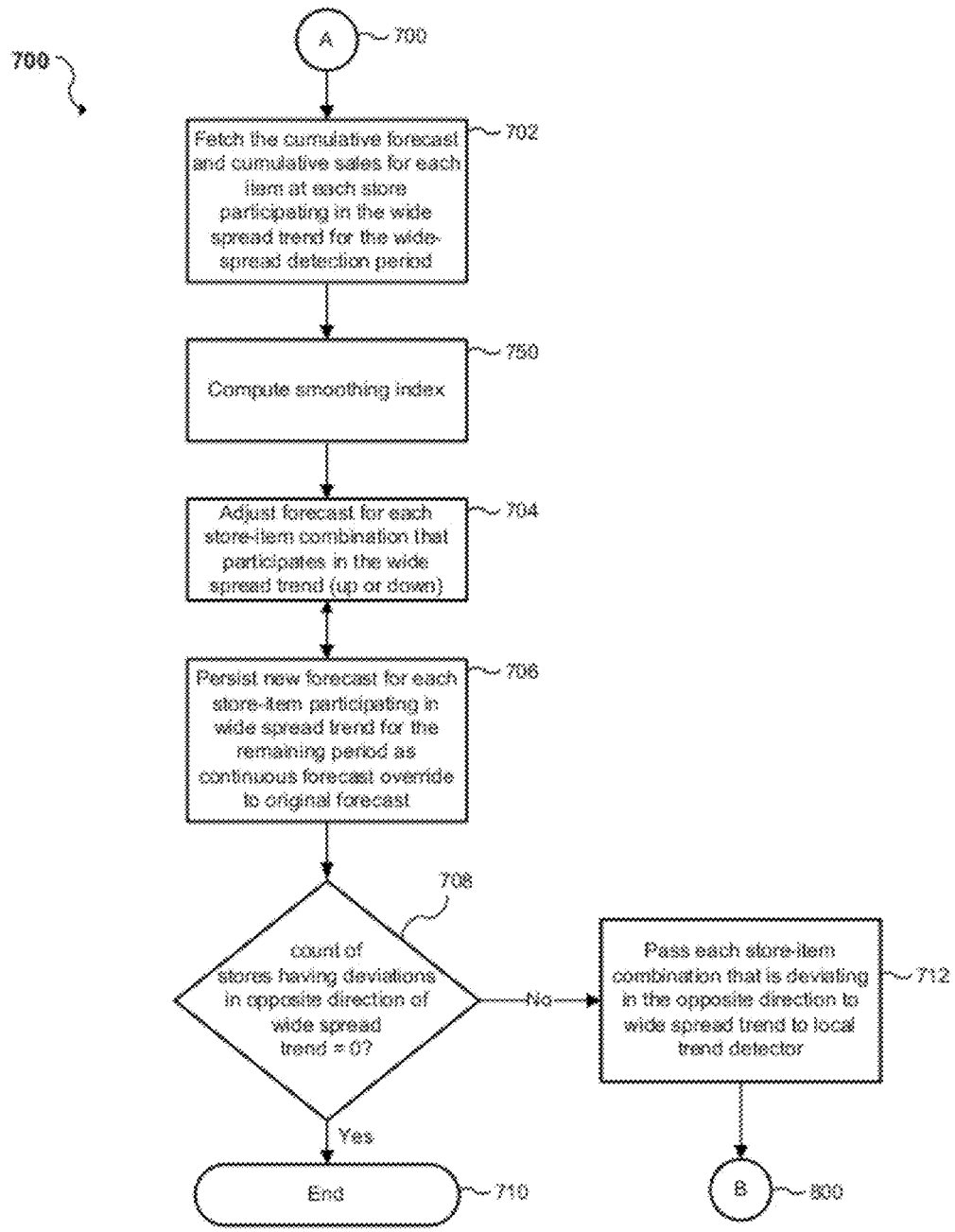
Figure 7E:
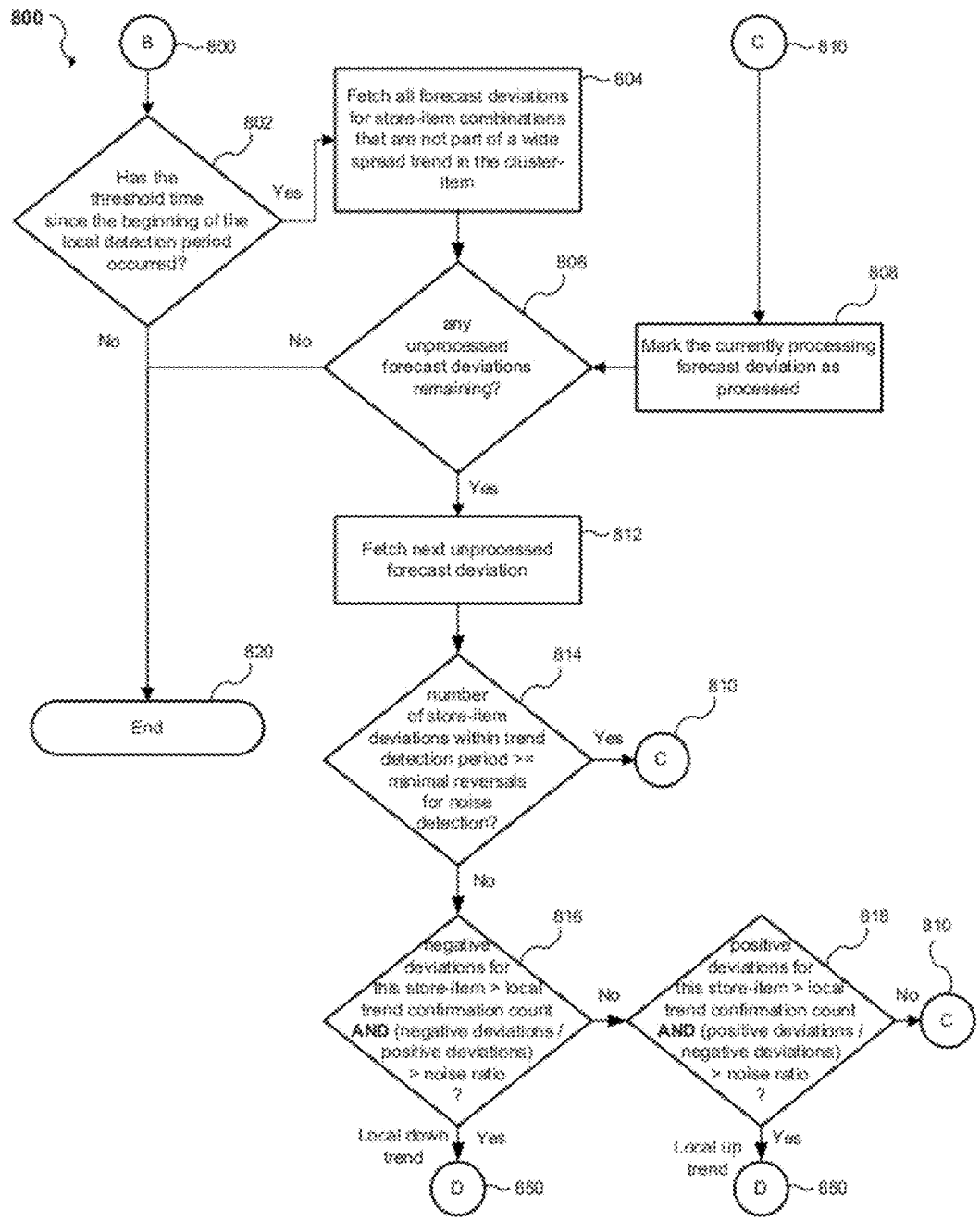

If the enterprise partner company and/or entity does not currently exist, then the enterprise partner company and/or entity is created at block 308. One possible implementation of creating the enterprise partner company and/or entity is shown in FIG. 7C. At block 310, an enterprise administrator user is created. The enterprise administrator for the new enterprise partner company and/or entity is sent a communication, such as email or the like, and allowed to log-in at blocks 312 and 314, respectively.

According to at least one embodiment, the single version of truth is accomplished by the master data and the transaction data being represented once (SVOT) and shared with other companies and/or entities. Each company and/or entity is restricted by its allowed permissibility which may be pre-defined and/or configurable. The master and transaction data models represent the single version of truth (SVOT) for value chain and manage the business process. All the planning and execution engines will read the same data models and write to the same data models thereby eliminating data redundancy and the need for synchronizing data across multiple disconnected systems.

TABLE 2

COMMONLY USED ABBREVIATIONS

| Model Name | Description |
| --- | --- |
| CPG | Consumer package good manufacturer. |
| DC | Distribution center. |
| SVOT | Single version of truth. |
| ASN | Assigned serial number. |
| POS | Point of sale. |
| BOM | Bill of materials. |
| P&E | Planning and execution. |
| ATP | Available to promise. |
| CFM | Continuous forecast management. |
| 3PL | Third-party logistics company. |

TABLE 3

MASTER DATA MODELS (SVOT)

| Model Name | Description |
| --- | --- |
| Enterprise | An entity representing the company as a whole across all geographies. |
| Organization | Organizational divisions within an enterprise |
| Item | A product sold by or purchased by an enterprise. |
| Site | A physical location like retail store, retail-DC (distribution center), CPG-DC and CPG manufacturing plant. |
| Site Lane | The transportation lanes that connects origin (ShipFrom) and destination (ShipTo) locations (Sites). |
| Inventory | Stocking locations where an item is stocked for fulfilling demand. |
| Inventory Lane | The valid supply locations (ShipFrom Site) for a given inventory location. |
| Shipping Calendar | The shipping work schedule in a DC. |
| Receiving Calendar | The receiving work schedule in a DC. |
| Recurring Delivery Schedule | The scheduled milk runs between retail-DC and stores. |
| Shipping Capacity | The number of trucks that can be shipped on a daily basis at a DC. |
| Receiving Capacity | The number of trucks that can be received on a daily basis at a DC. |
| Storage Capacity | The number of pallets that can be stored in a DC. |
| Equipment | The transportation equipment like truck, rail car, ocean container. |

TABLE 3-continued

MASTER DATA MODELS (SVOT)

| Model Name | Description |
| --- | --- |
| Product Allocation | The amount of product reserved for a customer. |
| Plant Production Calendar | The production schedule at a plant |
| Plant Production Capacity | The number of pallets that can be produced at a Plant on a daily basis. |
| Bill of Material | The hierarchy of components (raw material) that are required to produce the final product sold to end customer. |

TABLE 4

TRANSACTION DATA MODELS (SVOT)

| Model Name | Description |
| --- | --- |
| POS | The point of sale at the retail store |
| Store Sales Forecast | A future forecast of product sales at the retail stores. |
| Store Order | The orders placed by stores on the retail DC to replenish the stores |
| Store Order Forecast | A future forecast of store orders |
| Purchase Order | The orders placed by buyer on the seller for replenishing the buyer's DC. |
| Purchase Order Forecast | A future forecast of purchase orders. |
| Procurement Contract | A contract between buyer and seller for purchasing products. |
| Transportation Contract | A contract between the shipper and the logistics carrier for transporting products from origin to destination. |
| Deployment Order | The orders placed on plant by DC for transferring inventory from plant to DC |
| Deployment Order Forecast | Future forecast of Deployment Orders |
| Production Order | A work order executed at the plant for producing finished goods. |
| Production Order Forecast | A future forecast of Production Orders. |
| Demand Forecast | A forecast of demand for an item at a given location in time buckets. |
| Shipment | The group of products transported together from an origin location to a destination location on the same date. |
| Movement | The transportation route to execute a group of shipments. |
| Tender | The movement request to a logistics carrier. |
| Appointment | The reserved timeslot on a dock door within a DC for shipping/receiving a movement. |
| Invoice | The payment request from seller to buyer for the delivery of orders purchased by buyer. |

Embodiments of the invention provide a system and method for managing a value chain that uses the most current, up-to-date data that is related to the value chain. The present invention provides an event-driven value chain management system. A state change event is related to planned business events such as new transactions (e.g., a new sale or a purchase order arrived), or for temporal events (the time to 'freeze' forecasts has arrived), or exception events (a stock-out exception occurred).

Continuous Forecasting

According to at least one embodiment of the present invention, several hierarchies may be utilized in forecasting, including, without limitation, a product hierarchy, a geographic hierarchy, an account hierarchy and a calendar hierarchy.

The product hierarchy is a hierarchical grouping of products:

TABLE 5

PRODUCT HIERARCHY

| Order of Precedence | Name | Description |
| --- | --- | --- |
| 1 | department | Department where the product is stocked. For example, a Grocery is a department. |
| 2 | sub-department | Sub department is a grouping of products within a department. For example, a Bakery could be a sub-department under a Grocery. |
| 3 | commodity code | Commodity code represents a class or products. An example of a commodity code is Dairy Products. |
| 4 | Brand | A brand of products. |
| 5 | product or SKU or item | A specific product that is sold. |

The geographic hierarchy is a hierarchical grouping of geographical areas:

TABLE 6

GEOGRAPHIC HIERARCHY

| Order of Precedence | Name | Description |
| --- | --- | --- |
| 1 | Enterprise | An entity representing the company as a whole across all geographies. |
| 2 | DC | Distribution center. |
| 3 | Cluster | A cluster of stores. |
| 4 | Store | A distinct retail entity. |

The account hierarchy is a hierarchical grouping of distribution channels:

TABLE 7

ACCOUNT HIERARCHY

| Order of Precedence | Name | Description |
| --- | --- | --- |
| 1 | enterprise | In this context, the entity that owns the retailer company. |
| 2 | subsidiary | A sub-division or a business unit of a retailer company. |
| 3 | subsidiary sub-level | A further sub-division of the subsidiary typically by geography. |

During forecasting historical data is pulled and organized by a level in the calendar hierarchy (such as week), and forecasts are generated for a configurable horizon period in the same level (such as 13 weeks in future). The calendar hierarchy is a hierarchical grouping of time units:

TABLE 8

CALENDAR HIERARCHY

| Order of Precedence | Name | Description |
| --- | --- | --- |
| 1 | year | Year component of the date. For example, 2010. |
| 2 | quarter | The quarter to which a date belongs. Companies typically will define which weeks fall into which quarter. There are also standard calendars such as ISO calendars and Gregorian calendars that do the same. |

TABLE 8-continued

CALENDAR HIERARCHY

| Order of Precedence | Name | Description |
|---|---|---|
| 3 | month | Month to which a date belongs. Companies may choose a custom calendar. |
| 4 | week | Week to which a date belongs to. Companies may choose to have a custom start of week or use a standard calendar. For example, some companies will choose Sunday as the start of the week rather than Monday. |
| 5 | day | Day component of the date. |
| 6 | hour | Hour within the day where the date belongs to. |

The fields of these hierarchies may be combined and, when combined, refer to different levels used in forecasting by the present invention. For instance, a cluster-item combination refers to each item in the product hierarchy within each cluster in the geographic hierarchy. The present invention can generate forecasts at different levels. For example, forecasts can be generated at, without limitation, the cluster-item level or the SKU-store-day level.

It is often important to share the most current information between computer applications over a computer network. Information may be shared between computer applications using either (a) a single version of the truth, or (b) multiple versions of the truth. As used herein, a "single version of the truth" is an arrangement in which the same data in its most current/updated form is accessible by multiple computer applications and/or multiple parties. In order to maintain a single version of truth, any single data element is generally represented in a single location. Conversely, multiple versions of the truth are stored in multiple locations. However, in situations where there are multiple versions of the truth, each of the locations must be updateable simultaneously. Otherwise, by definition, there are at least temporary inconsistencies with respect to the representation of the data. In that case, the information may or may not be the most current. In practice, multiple versions of the truth with simultaneous updating is generally not feasible and a non-stale system cannot be built on such a representation. According to at least one embodiment of the present invention, a single version of the truth is utilized for at least a portion of the information relevant to sales forecasting.

The present invention may utilize or more computer applications. As used herein, a "computer application" is a computer executable software application of any type that executes processing instructions on a computer or embedded in a processor, and an "application" or "application project" are the files, objects, structures, database resources and other resources used in integrating a computer application into a software platform.

Forecasts are adjusted based on received information. According to at least one embodiment of the present invention, a product-store-day forecast is adjusted by analyzing forecasting anomalies across a duster as well as the patterns of anomalies at a store within a configurable period of time. Stores or other retail entities may be organized into a group, known as a "cluster." According to one embodiment of the present invention, a cluster is a group of stores (or other retail entities) having one or more common characteristic, such as, without limitation, stores within a geographic area. Stores that are grouped into a cluster commonly have a high correlation in sales volumes, patterns and products sold. Such correlation is often found in, without limitation, neighborhood stores, convenience stores, flagship stores, and the like.

It is understood, however, that clusters are not limited to these types of stores and that the above list is provided for exemplary purposes.

According to at least one embodiment of the present invention, statistically generated product-store-day sales forecasts and actual sales are analyzed in at least near real-time as the sales occur. According to other embodiments, this analysis occurs on a daily, weekly, bi-monthly, monthly or some other predefined or configured frequency. Based on this analysis, anomalies such as, without limitation, forecast deviations, overstocks, stock-outs, and the like may be detected. For each detected anomaly, each cluster having an anomaly is examined to see if the anomaly is localized to a specific store, a relatively small number of stores, or to a wide-spread trend. Retail sales trends typically appear, without limitation, within clusters, and may be a reaction to one or more events.

Retail sales trends may be, for example, a reaction to a particular marketing event or a weather related event in the area.

The present invention includes a classifier that classifies anomalies in forecast computations as either wide-spread trends, local trends, or no trend (i.e., noise). Anomalies are also referred to herein as alerts. A trend may either be an up-trend or a down-trend. If actual sales are greater than the anticipated forecast sales, then there may be an up-trend. Otherwise, if actual sales are less than the anticipated forecast sales, then there may be a down-trend.

According to at least one embodiment of the present invention, alerts, including, without limitation, buyer related alerts and store related alerts, are utilized in forecasting.

Buyer related alerts include, without limitation:

TABLE 9

BUYER RELATED ALERTS

| Name | Description |
|---|---|
| DC Stockout | Alerts if the distribution center is stocked out of a product - i.e., the BOH (balance on hand) at the distribution center <= 0. |
| DC Projected Stockout | Alerts if the distribution center is projected to stock out within a definable threshold of days. |
| DC Overstock | Alerts if the distribution center is overstocked or contains more than a definable threshold of inventory in days. |
| Sales Trends | Alerts products that are showing increase/decrease in sales by a definable threshold. |
| Forecast Deviation - DC level | Forecast deviation from previously computed forecast at the distribution center level. |
| Forecast vs Sales DC Level - Weekly | Alerts if the forecast deviates from Sales aggregated at the distribution center level weekly through a definable threshold. For example for all stores in the distribution center a product is forecasted to sell 100 cases but if they sell only 20 cases then an alert will be generated. |
| Forecast vs Sales DC Level - Daily | Alerts if the forecast deviates from sales aggregated at the distribution center level daily through a definable threshold. For example, for all stores in the distribution center a product is forecasted to sell 100 cases in a day but if they only sell only 20 cases then an alert will be generated. |
| Forecast Accuracy - Aggregate/DC Level | Alerts if the forecast accuracy is going down. |

Store related alerts, include, without limitation:

TABLE 10

STORE RELATED ALERTS

| Name | Description |
| --- | --- |
| Store Stock Outs | Alerts on the actual stock out (no product availability) at the store. |
| Store Projected Stock Outs | Alerts on the projected stockouts. |
| Store Overstocks | Alerts on excessive inventory. |
| Promotional Alert | Alerts of an upcoming promotion at the store. |
| Event Forecast Deviation | Alerts on forecast deviation during an event. |
| Phantom Inventory | Alerts on phantom inventory. This is inventory that appears to exist for the system but doesn't really exist. |
| Negative BOH | Alerts negative balance on hand. For example, a shelf contains negative units of a product. |
| ISO Special Order | Alerts on the creation of a special order. |
| Potential DC Scratch | Alerts of a potential distribution center scratch in which the distribution center possibly will not be able to fulfill an order. |
| DC Scratch | Alerts of an actual distribution center scratch in which the distribution center canceled or lowered the quantity of a store order. |
| Forecast Deviation - Store Level | Forecast deviation at the store level. Compares forecasts vs previous forecast at the store level. |
| Forecast vs. Sales Weekly Deviation at Store | Forecast vs Sales deviation at the store level - weekly bucket. |
| Forecast vs Sales Daily Deviation at Store | Daily deviation of forecast vs sales at the store level. |

According to at least one embodiment of the present invention, a decision tree classifier is utilized to classify trends as either wide-spread or local. The decision tree classifier includes advanced data analysis techniques (including construction of decision tree classifiers and nearest neighbor) that make use of the difference between advancer and decliner counts, minimum sales thresholds, the number of trend reversals in a period, and any trend persistence. These are used to detect and eliminate noise, and to discern a smoothing factor that is applied to lift or drop the forecast.

A smoothing factor is then calculated and applied to the forecast. In the event of a wide-spread trend, a smoothing factor is calculated as the ratio of the cumulative forecast to cumulative sales within the period of the anomaly in the cluster (or other geographic region) where the anomaly occurred. In the event of a local trend, a smoothing factor is calculated that effectively makes the forecast exponentially converge to the trend as the trend continues to occur. Optionally, a custom user-defined calculation for the smoothing factor may be plugged in by a user. The forecast is then recalculated based on the smoothing factor resulting in a more accurate forecast.

Forecasting may either be run continuously or configured to run at scheduled intervals. Each run monitors the latest anomalies.

According to at least one embodiment of the present invention, a middle-out forecast is generated at a. DC-product level that is further disaggregated at a store-item-day level using historical splits and patterns, where "DC" refers to a distribution center or warehouse. The forecast is referred to as a middle-out forecast because the forecast uses fields near the middle of the respective hierarchies. Such disaggregation may be utilized because a middle-out statistical forecast alone may not be sufficient to rapidly react to changes in sales trend. The function of rapidly reacting to on-going trends is handled at the bottom product-store-day level. The adjustments made to the bottom product-store-day level forecast are then propagated upwards to the distribution center and ultimately to the vendor through back propagation of demand.

The present invention includes a continuous forecasting engine that may be used to override forecasts. Overrides include, without limitation:

TABLE 11

OVERRIDES

| Order of Precedence | Name | Description |
| --- | --- | --- |
| 1 | Continuous Forecasting Override | A continuous forecasting override is an override the continuous forecasting engine places - i.e., a newly calculated forecast. |
| 2 | Store override | A store override is an override that the user at a store typically places on the forecasts - this happens when the user at the store has advance knowledge of an event that is likely to affect their store. |
| 3 | Replenishment Analyst override | A replenishment analyst override is an override that a supply chain analyst at the Division or DC typically will place. The vendor of the product will collaborate with the retailer supply chain analyst in the process of placing this override. The system allows for them to collaborate on this override. |
| 4 | Corporate override | A corporate override is an override that a person from corporate (typically Head Quarters) typically places. |

According to at least one embodiment, a store override is placed before the start of the week and is further adjusted by a continuous forecasting override. A replenishment analyst override is placed for a 2-6 week period and a corporate override is placed on a quarterly basis.

According to at least one embodiment of the present invention, a model, referred to as "CFScenario," contains the parameters related to a continuous forecasting engine run. The inputs to the model include, without limitation, the following:

retail alerts having an alert type equal to "Store Daily Forecast Vs Sales Deviation" from the start of the week to the current day;
events (promotions, temporary price-drops) associated with the products that have deviations.
store point of sales ("POS") beginning from the start of the current week to the day before the current day;
store weekly demand forecasts for the current week (distribution center level forecasts as well, overrides will get propagated bottom-up to distribution center level);
daily split ratios;
parameters (detailed below); and
special exclusion filters (detailed below).

Certain parameters may be specified at several levels bottom up or middle out or top down. For example, parameters may be specified for each item-store which take precedence over another specification that may happen at an item-DC. Typically, line grained level parameters override higher level overrides. Parameters that control continuous forecasting include, without limitation, the following:

WSMinSalesThreshold: The minimum threshold of sales to be considered for WS trend analysis (e.g., 4). If the sales for a product are less than the WSMinSalesThreshold then it is not considered for trend analysis.

WSMaxUpOverrideRatio: The upper limit of the override that will be placed initially when a trend is detected (e.g., 0.5). The CF engine will not override (i.e., create a new forecast) by an amount higher than the current forecast times this ratio. For example, if WSMaxUpOverrideRatio is set to 0.5 and current forecast is 100, then the maximum override will be 150 for the initial override. This ratio is used to control extreme reaction to trends when they are initially detected. However, if the sates continue to surge then the exponential convergence will occur and pick to trend. This factor only applies to the first time a wide spread override is placed.

WSMaxDownOverrideRatio: Sets the lower limit of the override, very similar to WSMaxDownOverrideRatio, but in the opposite direction.

MinLocalTrendDurationThreshold: The minimum duration for which a trend has to occur to be considered as a local trend.

LocalTrendMaxUpOverrideRatio: The upper limit on a local trend forecast override.

LocalTrendMaxDownOverrideRatio: The tower limit on the local trend forecast override.

Special exclusion filters are known supply chain system events that impact sates. Unlike user planned promotions or the like, special exclusion filters are execution events in the supply chain. Special exclusion filters include, without limitation, power outages, road closures, spillage, wastage and the like. Such events directly cause the inventory level to go down and trigger several system alerts such as DC projected stock out or DC stock out. When such a known system/supply chain alert (event) occurs, the continuous forecast engine does not process the forecast for the related objects that participate in the event. For example, if two products are stocked out at a distribution center due to a truck spill or accident. Because the products are stocked out at the distribution center overtime, the products will not be replenished at the store shelves and the stores will stockout. When the system looks at sales versus forecasts counts, a determination is made that sales are having a down trend incorrectly if there was no exclusion filter. In this example, a DC stockout alert is identified as an exclusion filter, such that when this occurs, the continuous forecasting engine will not touch the forecasts for the products that are stocked out at the DC till that condition goes away. Special exclusion filters include, without limitation, the following:

WSSignalNoiseRatio: Wide spread trend signal to noise ratio. This parameter helps to remove noise while wide spread trend detection.

WSTrendConfirmationRatio: The ratio of number of stores that need to participate in a trend to the total number of stores in cluster in order to be considered as a wide spread trend.

LocalSignalNoiseRatio: Ratio of number of alerts in the trend direction to those in the opposite direction.

LocalTrendConfirmationCount: The number of alerts at the local level to be considered as a local trend.

Daily forecasts are updated based on output from the model. If there is an event associated with a forecast deviation, then the daily forecasts for the period of time in which the end of the event occurred will be updated. Otherwise, the daily forecasts from the current day to the start of next week will be updated.

The continuous forecasting engine updates a continuous forecast override on the daily forecast. A daily store demand forecast override (one type of "continuous forecast override") having a higher precedence compared to a store or division override, may be created based on output from the model.

According to at least one embodiment of the present invention, at least two weeks (14 days) of daily forecasts are created and maintained in a database table, referred to as the "store_demand_forecast" table. It is to be understood, however, that the present invention is not limited to 14 days of daily forecasts, and that any number of daily forecasts may be created and maintained within the scope of the present invention. The creation and/or update of these daily forecasts may occur each time the continuous forecasting system is run, on a daily schedule, or at another user-defined frequency. When a daily forecast is updated, the corresponding weekly forecast is preferably recomputed. A standard replenishment ("SR") or an advanced replenishment ("AR") may also be updated based on the daily forecasts. A standard replenishment is the module that places orders from Store-DC based on forecasts. An advanced replenishment relates to multitier replenishment from store forecasts all the way to suppliers.

The continuous forecasting engine may be run at any time or on any pre-defined or user-defined scheduled. The forecasting engine could be configured to run, for example, daily after an alert engine for an appropriate alert type (e.g., a "Forecast vs Sales Daily Deviation at Store") completes its execution. For instance, the forecasting engine could be configured to run at 7:00 am immediately following an alert run at 7:00 am.

As used herein, a "period" is typically the time duration from the start of a continuous forecast engine run to the end of the current forecast period. The end of the period may also be defined by an event, such as, without limitation, an advertisement event, a temporary price reduction event, or a local event. If an event occurs, then the end of the period may be the end date of the event. For example, if a weekly forecast is run on Sunday (i.e. Sunday-Saturday), then the period the period would normally end on Saturday unless there is an event. As another example, if a forecast is run once every two weeks, then the period will be the time between the runs of the continuous forecasting engine.

For each item within each cluster (a cluster-item combination), the present invention analyzes each alert and determines where there is a wide-spread trend, a local trend or no trend. As used herein, "wide-spread trend detection period" refers to the duration of a wide-spread trend within a period. The wide-spread trend period begins at the start of the wide-spread trend and continues to the end of the wide-spread trend or the current time if the trend has not ended. As used herein, "local trend detection period" refers to the duration of a local trend within a period. The local trend detection period begins at the start of the local trend and continues to the end of the local trend or the current time if the trend has not ended.

Wide-Spread Trends

According to at least one embodiment, deviations are weighted.

EXAMPLE 1

Assume that there are: (a) 100 stores within a distribution center (DC) or cluster; (b) there are 50 alerts with a positive deviation from 22 distinct stores within the distribution center (DC) or cluster and that out of these 50 alerts, 10 are severe alerts and 40 are minor alerts (where severity is determined by the amount of sales deviation from forecast, in other words 10 occurrences are real big deviations and 40 are small deviations relatively); (c) there are 30 alerts with a negative deviation from 10 distinct stores within the distribution center (DC) or cluster; (d) WSTrendConfirmationRatio is equal to 0.22; and (e) SignalNoiseRatio is equal to 2.

This is a wide spread trend.

However, when the smoothing index is computed to update the forecast instead of purely taking the cumulative sales/ cumulative forecasts across all stores, there is a grouping by severity. In other words, the stores that are part of the 10 severe alerts should receive a higher forecast adjust compared to the stores that are part of the 40 minor deviations.

Smoothing index for a given store-item is therefore computed as cumulative sales/cumulative forecast only considering the stores that have deviations that are weighted the same.

A wide-spread trend typically spans a cluster or a distribution center geographic area. According to at least one embodiment of the present invention, a wide-spread trend has occurred if two conditions are satisfied. For a wide-spread up-trend, the first condition is true if the number of stores within a cluster or distribution center with a positive deviation since the beginning of the wide-spread trend detection period (e.g., a week) divided by the total number of stores in the cluster or distribution center is greater than a configurable trend confirmation ratio (known as the "WSTrendConfirmationRatio"). WSTrendConfirmationRatio is an estimate the wideness of the trend distribution. Deviations are identified by alerts having a "Store Daily Forecast Vs Sales Deviation" alert type. The second condition is true if the number of stores within the cluster or distribution center with a positive deviation since the beginning of the wide-spread trend detection period (e.g., a week) divided by the number of stores within the cluster or distribution center with a negative deviation since the beginning of the wide-spread trend detection period is greater than a configurable noise ratio (known as the "SignalNoiseRatio"). SignalNoiseRatio is used to reject cases where there is too much noise.

For a wide-spread down-trend, the first condition is true if the number of stores within a cluster or distribution center with a negative deviation since the beginning of the wide-spread trend detection period (e.g., a week) divided by the total number of stores in the cluster or distribution center is greater than the WSTrendConfirmationRatio. The second condition is true if the number of stores within the cluster or distribution center with a negative deviation since the beginning of the wide-spread trend detection period (e.g., a week) divided by the number of stores within the cluster or distribution center with a positive deviation since the beginning of the wide-spread trend detection period is greater than the SignalNoiseRatio.

EXAMPLE 2

The forecasting engine is run on Tuesday. It identifies all alerts having an alert type of "Store Daily Forecast Vs Sales Deviation" for Sunday, Monday, Tuesday, which have a positive deviation from the forecast, and all alerts which have negative deviation. Assume that there are: (a) 100 stores within the distribution center (DC) or cluster; (h) there are 50 alerts with a positive deviation from 22 distinct stores within the distribution center (DC) or cluster; (c) there are 45 alerts with a negative deviation from 15 distinct stores within the distribution center (DC) or cluster; (d) WSTrendConfirmationRatio is equal to 0.2; and (e) SignalNoiseRatio is equal to 2.

The first condition would be satisfied (22/100>0.2), but the second condition would not be satisfied (22/15<2). This would be considered noise or a no-trend situation.

EXAMPLE 3

The forecasting engine is run on Tuesday. It identifies all alerts having an alert type of "Store Daily Forecast Vs Sales Deviation" for Sunday, Monday, Tuesday, which have a positive deviation from the forecast, and all alerts which have negative deviation. Assume that there are: (a) 100 stores within the distribution center (DC) or cluster; (b) there are 50 alerts with a positive deviation from 22 distinct stores within the distribution center (DC) or cluster; (c) there are 30 alerts with a negative deviation from 10 distinct stores within the distribution center (DC) or cluster; (d) WSTrendConfirmationRatio is equal to 0.2; and (e) SignalNoiseRatio is equal to 2.

The first condition would be satisfied (22/100>0.2), and the second condition would also be satisfied (22/10>2). This would be considered a wide-spread up-trend.

Local Trends

A local trend is typically a trend within a store. According to at least one embodiment of the present invention, if only one item, or a small number of items, within a store indicate a forecast deviation, then this is likely to be noise. However, if the item, or small number of items, is consistently deviating within the store by a certain threshold number of days from the forecast within a configurable period (e.g., a week), then there is a local trend and the weekly forecast should be adjusted. This is known as an exponential convergence. An exponential convergence to a trend means that as the trend persists, the forecast will converge to it exponentially (i.e., convergence occurs slowly at first and then very rapidly). For example, if on day three, a local trend is detected, there may not be full confidence in the local trend, but if the local trend continues into the next day (day four), then confidence in the local trend that was detected in day three increases exponentially.

If the item in the store is consistently deviating by a predefined or configurable threshold number of days (known as the "localforecastTrendDetectionThreshold"), from the forecast (e.g., the item in the store consistently deviates for 3 or more days), then there is a local trend and the weekly forecast must be adjusted. If instead, within the period, the forecast trends above and below sales erratically (defined by "minTrendReversalsForNoiseDetection"), then there is no trend.

If the number of deviations in the same direction (either the positive deviations or the negative deviations) greater than or equal to LocalTrendConfirmationCount AND the number of deviations in the same direction divided by the number of alerts deviating in the opposite direction is greater than or equal to LocalSignalNoiseRatio, then this is local trend. Local trends are typically processed for those stores that don't participate in a wide spread trend, in other words, if a store is part of a wide spread trend then it is not a "local" trend and it is not considered for such processing. However, local trends for stores that trend in a wide-spread trend direction are processed as a wide-spread trend.

Local Trend Detection Pseudo-Code:

```
if day_of_week (starting from Monday = 0) <
MinLocalTrendDurationThreshold
    // exit because not enough time has elapsed from the
    start of the week to
    // process local trends.
else {
    // select all the stores under that the DC, and for each store also retrieve
    // all relevant local trend information.
    // for each store with suitable ratios, perform a store weekly forecasts
    adjustment.
    // exponentially converge the forecasts to the sales.
    override_ratio = cumulative_sales /
    cumulative_daily_forecast (for the item-store)
    new_overridden_forecast_qty = (current_forecast_qty) +
        (current_forecast_qty * override_ratio − current_forecast_qty) / 2
    // where "2" is a configurable parameter
}
```

Smoothing Index

A smoothing index is calculated and used to determine the increase or decrease of a forecast.

Adjusting Forecast Pseudo-Code (for a Wide-Spread Trend):

```
smoothing_index = average_cumulative_sales (from the start of the period to
the current day for all stores in the distribution center deviating in the same
direction) / average_cumulative_forecast (for all stores in the distribution
center deviating in the same direction (i.e., the main result-trend direction));
for (i=today; i < period end; i++) {
    projected_daily_forecast[i] = (smoothing_index) * daily_forecast[i];
}
```

The noise is reduced by looking at cumulative numbers across all stores while computing the forecast adjustment factor.

Adjusting Forecast Pseudo-Code (for a Local Trend):

```
// the trend is exponentially converged if it happens for several
days (where i is
// the index for the day in the period).
projected_daily_forecast[i] = (cumulative_daily_sales /
    cumulative_daily_forecast) * daily_forecast[i];
diff[i] = projected_daily_forecast[i] – daily_forecast[i];
projected_daily_forecast[i] = daily_forecast[i] + diff[i] / 2;
smoothing index: NF(store, item, period) = OF(store, item, period) +
    [OF(store, item, period) * (cumulative_sales (for store-item during period
    of local trend) / cumulative_forecast (for store-item during period of local
    trend) – OF(store, item, period)] / exponential_convergence_factor
```

NF is a function that outputs the new forecast. OF is a function that returns the original forecast of the supplied store, item, and time period.

Slow Movers

Slow movers have a lot of noise especially at a store level. Alerts that are generated for slow movers (less than minSalesPerWeekForNoise (e.g., 7 units)) will not be included unless the item has an event.

Slow Mover Pseudo-Code:

```
for each item-store daily forecast deviation alert {
    if (sales for item-store < minSalesPerWeekForNoise) {
        // exit out of loop
    }
    trendType = trendClassifier.getTrendType(alert, rules);
    if (trendType is wide-spread trend) {
        // update daily forecasts based on the wide-spread
        // trend calculation.
    } else if (trendType is local trend) {
        //update daily forecast based on the local trend calculation
    } else {
        log noise;    // may be useful to maintain a count somewhere to
                      // we can classify products with a lot of noise.
    }
}
```

According to at least one embodiment of the present invention, tasks are created to be processed by various engines, including, without limitation, a "scheduler and load balancing system," a "demand planner engine," an "alert generation engine" and a "continuous forecasting engine." According this embodiment, the "scheduler and load balancing system" creates engine tasks to be processed by various engines. Task granularity and data filters are configurable, for instance, in the meta data layer. The engines identified by a task that are ready for execution are invoked. The "demand planner engine" generates weekly forecasts at configurable levels using statistical techniques. If an external system generates this forecast it can be directly entered into a database. The "alert generation engine" looks at data anomalies and creates alerts. The forecast alerts generated will contain information about actual sales and predicted forecast and percentage deviation. Policies and thresholds are definable. For example, the extent of the deviation before an alert is generated is definable. The "continuous forecasting engine" classifies each alert in a cluster using alert classifiers. Alerts are grouped based on either local trends specific to the alert or a wide-spread trend which transcend local boundaries and spans across the cluster. Smoothed forecast adjustments are then placed where needed.

An "online transaction processing database system" holds all data related to the forecasting and execution such as historical point of sale, events (promotions), weekly forecasts, daily forecasts, alerts, item master and site master.

The present invention can generate forecasts at the SKU-store-day level by analyzing POS (point-of-sale) data and applying causal information at various levels. A statistical forecast generation engine supports all standard statistical techniques as well automatic best fit detection. The generated forecast has seasonal and causal components built into it. The statistical forecast is then augmented with local demand estimates and propagated to various levels along the distribution, product and calendar hierarchies.

Further, the continuous forecasting engine may be operated daily at the SKU-store-day level and the forecasts may be adjusted continuously based on trends within the store and the trends within a cluster.

Statistical forecasts can be generated at any level. Bottom-up forecasting starts forecasting at SKU-store levels and aggregates the forecasts upwards. Top-down forecasting starts at the highest level, such as, without limitation, the commodity code-national level, and disaggregates the forecasts using splits calculated by analyzing historical POS. Middle-out forecasting starts at intermediate levels in the hierarchy and propagated forecasts upwards and downwards. The present invention supports all of the three variants as well as allows multiple scenarios, each using a different forecasting level for comparison.

According to at least one embodiment of the present invention, for retail forecasting, the aggregated SKU-store-week forecast is calculated at the distribution center (or division) level. That forecast is and disaggregated down to the Store-SKU-Day level using calculated split ratios. This is a middle-out approach. This approach leads to a better quality for retail forecasting as it minimizes noise that may happen at individual stores. For example, a store might sell more products than anticipated on a given day due to a random event, such as a consumer buying a large number of products for a party or some other one time function. Conversely, another store might sell fewer products than anticipated due to a spill or wastage. When POS data is aggregated upwards to the distribution center (or division) such noises in the data will get smoothed out and the trend detection is more accurate. Noise reduction is particularly important with volatile products, slow movers and promoted products. This technique also leads to better back propagated vendor forecasts as the distribution center (or division) level forecasts are highly accurate.

Advertisement events and temporary price reduction events typically are applicable to an entire distribution center or division. The historical POS data contains markers to identify when such events previously occurred. Future advertisement events and temporary price reduction events are received by the present invention. The price drop ratios are calculated and events are categorized into buckets of price drops. During statistical forecasting, the price drop percentage is compared to similar drops in history to discern the effect of the event in the future. In the forecasting algorithm detection phase, the present invention identifies the appropriate algorithm for a product based on the sensitivity it has to events and seasonality. For example, the effect of an event on a given product could be additive in nature the increase is a fixed number of units). Another product could be highly reactive to events and the effect for that product could be multiplicative (i.e., the increase is a certain factor of the baseline). A trained demand planner can also optionally override the system and set the configuration for at the forecast level (SKU-DC for retail). Complex events can be configured to appropriately lift the forecast of all the associated products that are part of the event.

Stores may have local events that affect the store sales such as local festivals or construction. These causal factors can be received by the present invention, and during forecast generation phase for the individual store, these factors are taken into consideration. Stores may also enter demand change requests into future if they know that they will need extra product for example to cover a customer in-store order.

The generated forecast is available to distribution center replenishment analyst as well as a vendor VMI analyst or vendor CSR. All parties use a single version of the truth. Collaboration workflows allow for vendors and retailers to collaborate and establish a consensus forecast as well as promotions.

Event calendars allow for everybody from the store grocery manager to the vendor CSR to see the promotions, local events happening at a store or at a distribution center. Fine grained role based permissibility makes sure that only data that is authorized for a party is visible to them.

A split generation engine module within the present invention can be used to analyze historical POS data and infer wastage ratios based on sales patterns and markdowns. This wastage ratio will be fed to replenishment engine for predicting wastage and minimizing it. Markdown alerts can be generated by the present invention.

While introducing new products or replacing existing products with a different pack size or such, the demand planner is fed with data pertaining to one or more similar products that it needs to extrapolate off for the new product forecasting. Scaling factors are entered to scale the history of the similar product(s).

The continuous forecasting engine receives forecast vs. sales daily alerts as it occurs. Each alert that it received is categorized as a wide-spread trend, a local trend or noise. Wide-spread trends happen when several stores in a region start to show the same trend in forecast errors; for example an overselling promotion may happen at many stores in a distribution center. Local trends happen within a store or small set of stores, in these cases the forecast will exponentially converge to the trend with time.

Flowcharts Illustrating a Method for Continuous Forecasting

Referring to FIGS. 7A-7H, flow charts illustrating a method for continuous forecasting in accordance with an embodiment of the present invention are shown. As shown at block 602, items within a cluster (cluster-item combinations) are read. However, it is to be understood that reading and processing items within a cluster may be performed either collectively or individually within the scope of the present invention. For instance, according to one embodiment, all of the items within a cluster are read and buffered, and all of those items are then processed collectively. According to another embodiment, each item within a cluster is read and processed individually (or in a quantity smaller than all of the items within a cluster) in a loop.

At block 604, a determination is made as to whether all of the items within a cluster have been processed. If all of the items within a cluster have been processed, then processing continues at block 610. Otherwise, wide-spread trend detection occurs, as shown at block 650 and as further detailed in FIG. 7B.

At Hock 652, the number of positive deviations and the number of negative deviations from an existing sales forecast is determined and/or retrieved for all items in a cluster. Optionally, forecasting policies are retrieved for the cluster-item level, as shown at block 654. The forecasting policies include parameters used in forecasting, including, without limitation WSTrendConfirmationRatio, TrendReversalsForNoiseDetection, SignalNoiseRatio, localforecastTrendDetectionThreshold, minSalesPerWeekForNoise, LocalSignalNoiseRatio, minLocalTrendDurationThreshold, and LocalTrendConfirmationCount.

At block 604, a determination is made as to whether the number of stores within a cluster with a positive deviation since the beginning of the wide-spread trend detection period divided by the total number of stores in the cluster is greater than a configurable trend confirmation ratio.

$$\left(\frac{\text{nbr\_positive\_deviations}}{\text{nbr\_stores}}\right) > WSTrendConfirmationRatio$$

If the above equation is true, then processing continues at block 658. Otherwise, processing continues at block 662.

At block 658, a determination is made as to whether (a) the number of stores within a cluster with a negative deviation is equal to zero, or (h) the number of stores within the cluster with a positive deviation since the beginning of the wide-spread trend detection period divided by the number of stores within a cluster with a negative deviation since the beginning of the wide-spread trend detection period is greater than a configurable noise ratio.

$$\text{nbr\_negative\_deviations} = 0$$

OR $$\left(\frac{\text{nbr\_positive\_deviations}}{\text{nbr\_negative\_deviations}}\right) > SignalNoiseRatio$$

If the above equation is true, then processing continues at block 660. Otherwise, processing continues at block 800.

At block 660, a determination is made as to whether the number trend reversals since the beginning of the wide-spread trend detection period is greater than or equal to a configurable minimum number of trend reversals for noise detection.

nbr_trend_reversals>=minTrendReversalsForNoise Detection

If the above equation is true, then there is a wide-spread up trend and processing continues at block 800. Otherwise, processing continues at block 700.

At block 662, a determination is made as to whether the number of stores within a cluster with a negative deviation since the beginning of the wide-spread trend detection period divided by the total number of stores in the cluster is greater than a configurable trend confirmation ratio.

$$\left(\frac{\text{nbr\_negative\_deviations}}{\text{nbr\_stores}}\right) > WSTrendConfirmationRatio$$

If the above equation is true, then processing continues at block 664. Otherwise, processing continues at block 800.

At block 664, a determination is made as to whether (a) the number of stores within a cluster with a positive deviation is equal to zero, or (b) the number of stores within the cluster with a negative deviation since the beginning, of the wide-spread trend detection period divided by the number of stores within a cluster with a positive deviation since the beginning of the wide-spread trend detection period is greater than a configurable noise ratio.

$$\text{nbr\_positive\_deviations} = 0$$

OR $$\left(\frac{\text{nbr\_negative\_deviations}}{\text{nbr\_positive\_deviations}}\right) > SignalNoiseRatio$$

If the above equation is true, then processing continues at block 666. Otherwise, processing continues at block 800.

At block 666, a determination is made as to whether the number trend reversals since the beginning of the wide-spread trend detection period is greater than or equal to a configurable minimum number of trend reversals for noise detection.

nbr_trend_reversals>=minTrendReversalsForNoise
Detection

If the above equation is true, then there is a wide-spread down trend and processing continues at block 800. Otherwise, processing continues at block 700.

The forecast is adjusted for any wide-spread trend, as shown at block 700 and as further detailed in FIG. 7C. At block 702, the cumulative forecast and the cumulative sales for each item at each store participating in a wide-spread trend for the wide-spread trend detection period is determined and/or retrieved. The smoothing factor is computed, as shown at block 750. The smoothing index is equal to the cumulative sales for the wide-spread trend detection period of stores participating in trend divided by the cumulative forecast for the wide-spread trend detection period for stores participating in the trend. Another variation uses exponential convergence to the trend. In this case, the smoothing index is equal to one plus a numerator minus 1 divided by an exponential convergence factor, where the numerator is equal to the cumulative sales for the wide-spread trend detection period for the stores participating in the trend divided by the cumulative forecast for the wide-spread trend detection period for stores participating in the trend. Alternatively, the smoothing index computation factors the severity of the alerts and groups stores by alert severity.

Figure 7F:
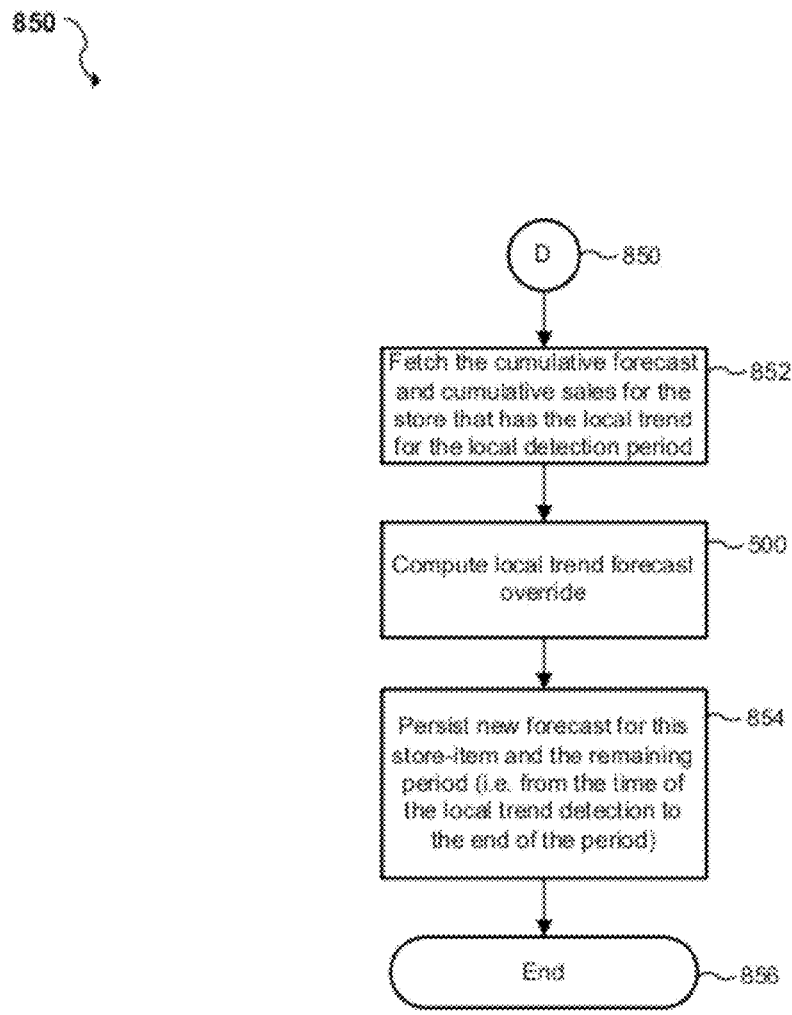

Local trends are detected, as shown at block 800 and as further detailed in FIG. 7F. At block 802, a determination is made as to whether a configurable threshold duration since the beginning of the period has occurred. If the threshold has not been met, then there is not enough information to perform reliable local trend detection at this time and processing continues at block 820. Otherwise, processing continues at block 804.

At block 804, the number of positive deviations and the number of negative deviations for store-item combinations that are not a part of a wide-spread trend in the cluster-item are determined and/or retrieved.

At block 806, a determination is made as to whether all of the unprocessed forecast deviations have been processed. If all of the unprocessed forecast deviations have been processed, then processing continues at block 812. Otherwise, processing continues at block 820. At block 812, the next unprocessed forecast deviation is retrieved.

At block 814, a determination is made as to whether the number trend reversals since the beginning of the local trend detection period is greater than or equal to a configurable minimum number of trend reversals for noise detection.

nbr_trend_reversals>=minTrendReversalsForNoise
Detection

If the number trend reversals since the beginning of the local trend detection period is greater than or equal to a configurable minimum number of trend reversals for noise detection, then processing continues at block 810. Otherwise, processing continues at block 816.

At block 816, a determination is made as to whether (a) the number of negative deviations for an item within one of the stores since the beginning of the local trend detection period is greater than a configurable local trend confirmation count, and (h) the number of negative deviations for the item within the store since the beginning of the local trend detection period divided by the number of positive deviations for the item within the store since the beginning of the local trend detection period is greater than a configurable noise ratio.

nbr_negative_deviations > LocalTrendConfirmationRatio

AND $$\left(\frac{\text{nbr\_negative\_deviations}}{\text{nbr\_positive\_deviations}}\right) > LocalSignalNoiseRatio$$

If the above equation is true, then processing continues at block 850. Otherwise, processing continues at block 818.

At block 818, a determination is made as to whether (a) the number of positive deviations for an item within one of the stores since the beginning of the local trend detection period is greater than a configurable local trend confirmation count, and (b) the number of positive deviations for the item within the store since the beginning of the local trend detection period divided by the number of negative deviations for the item within the store since the beginning of the local trend detection period is greater than a configurable noise ratio.

nbr_negative_deviations > LocalTrendConfirmationRatio

AND $$\left(\frac{\text{nbr\_negative\_deviations}}{\text{nbr\_positive\_deviations}}\right) > LocalSignalNoiseRatio$$

If the above equation is true, then processing continues at block 850. Otherwise, processing continues at block 810.

At block 810, processing continues to block 808 which marks the forecast deviation as processed.

The forecast is adjusted for any local trends, as shown at block 850 and as further detailed in FIG. 77F. At block 852, the cumulative forecast and cumulative sales for the store that the local trend for the local trend detection period are retrieved and/or determined. The local trend forecast override is computed as shown at block 500. At block 854, the forecast for the for the item within the store and the remaining portion of the period is stored in the database.

Alerts are regenerated and the processing state is set for the particular cluster-item combination, as shown at blocks 606 and 608. Processing repeats for the next item within the store until all of the items at that store have been processed (then continues until all items at all stores individually have been processed), as shown at blocks 604 and 610.

Figure 9A:
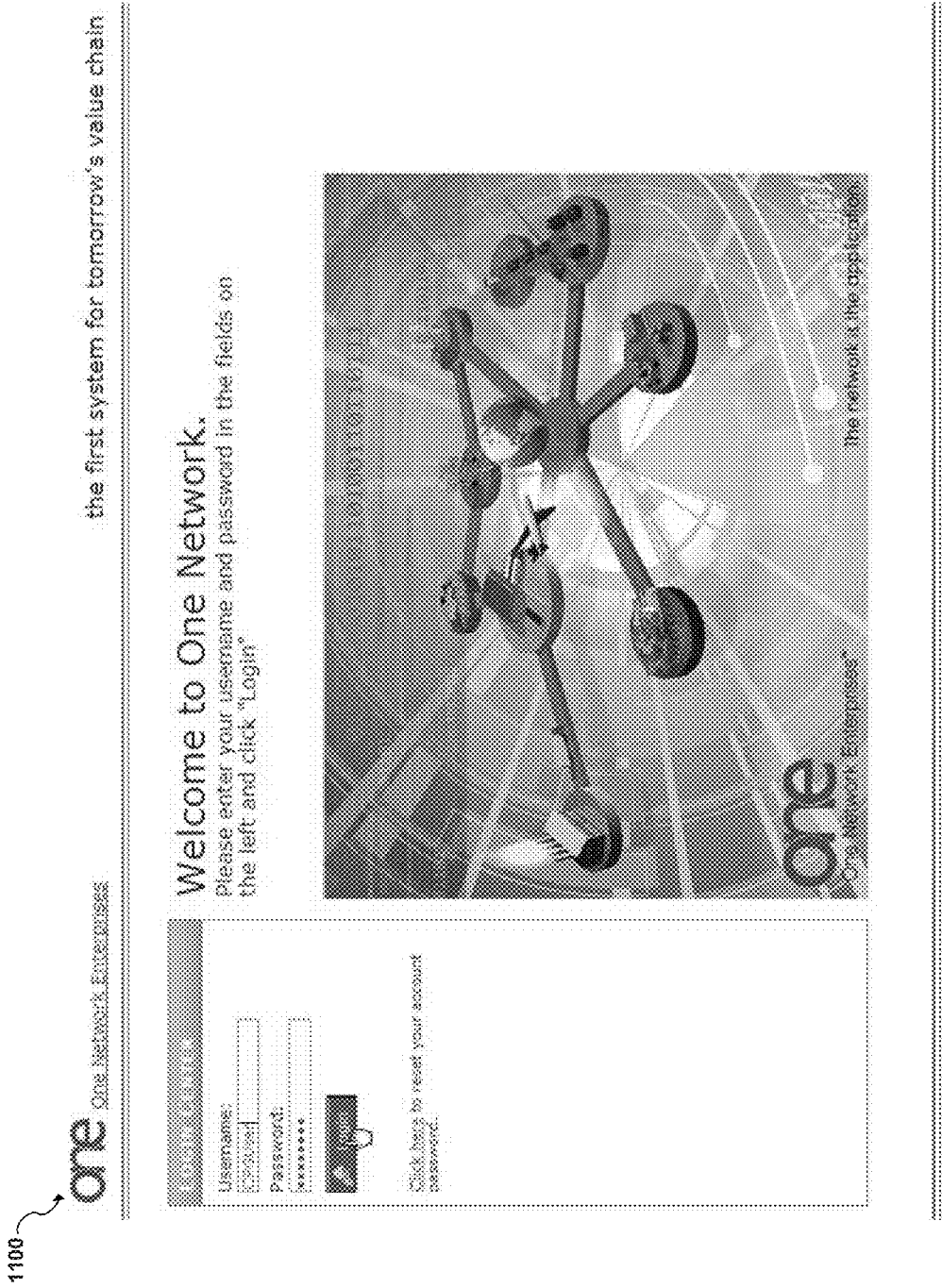
Figure 9D:
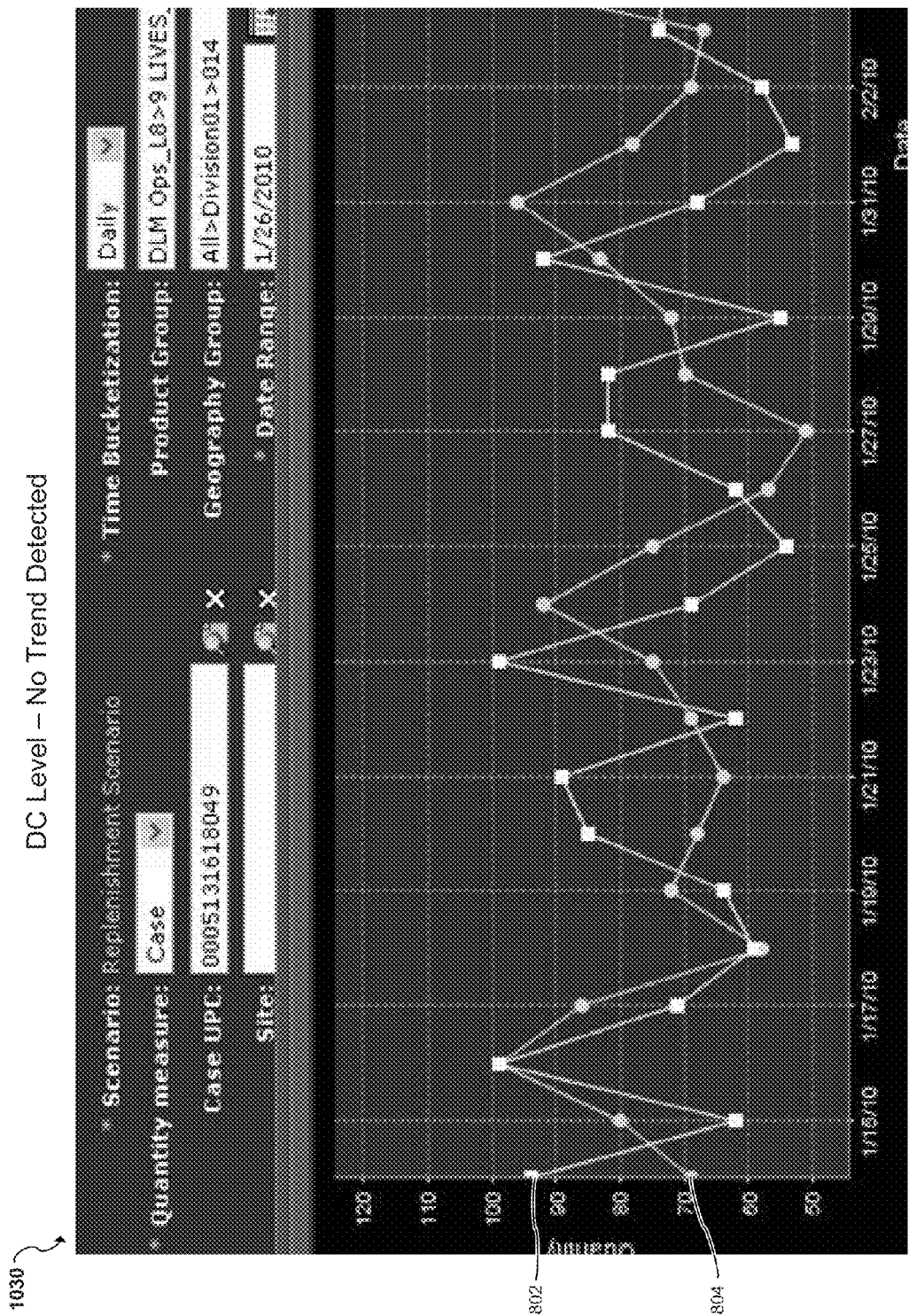
FIGS. 9D-9H illustrate exemplary user interfaces for continuous forecasting in accordance with an embodiment of the present invention.
Figure 9E:
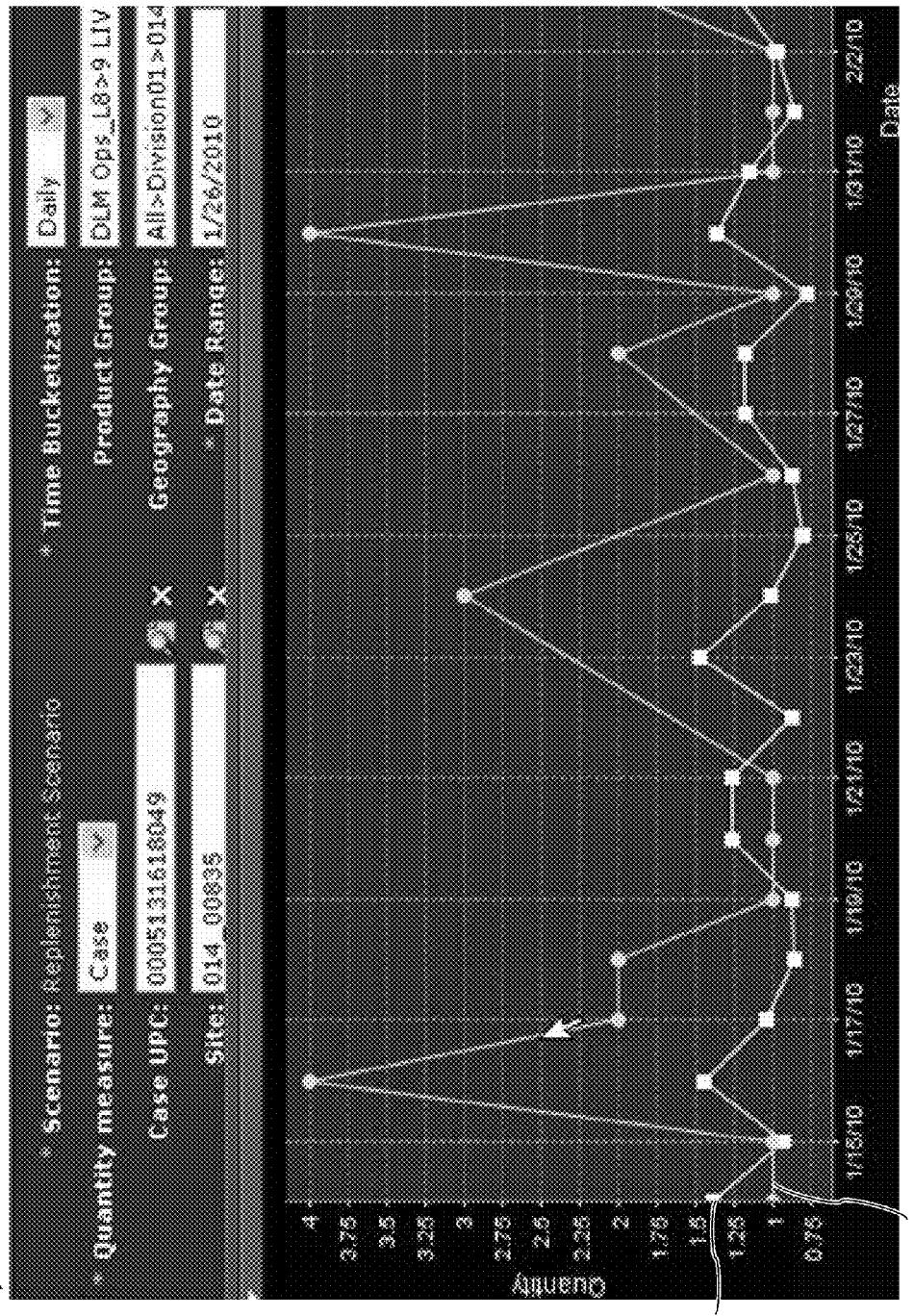
Figure 9F:
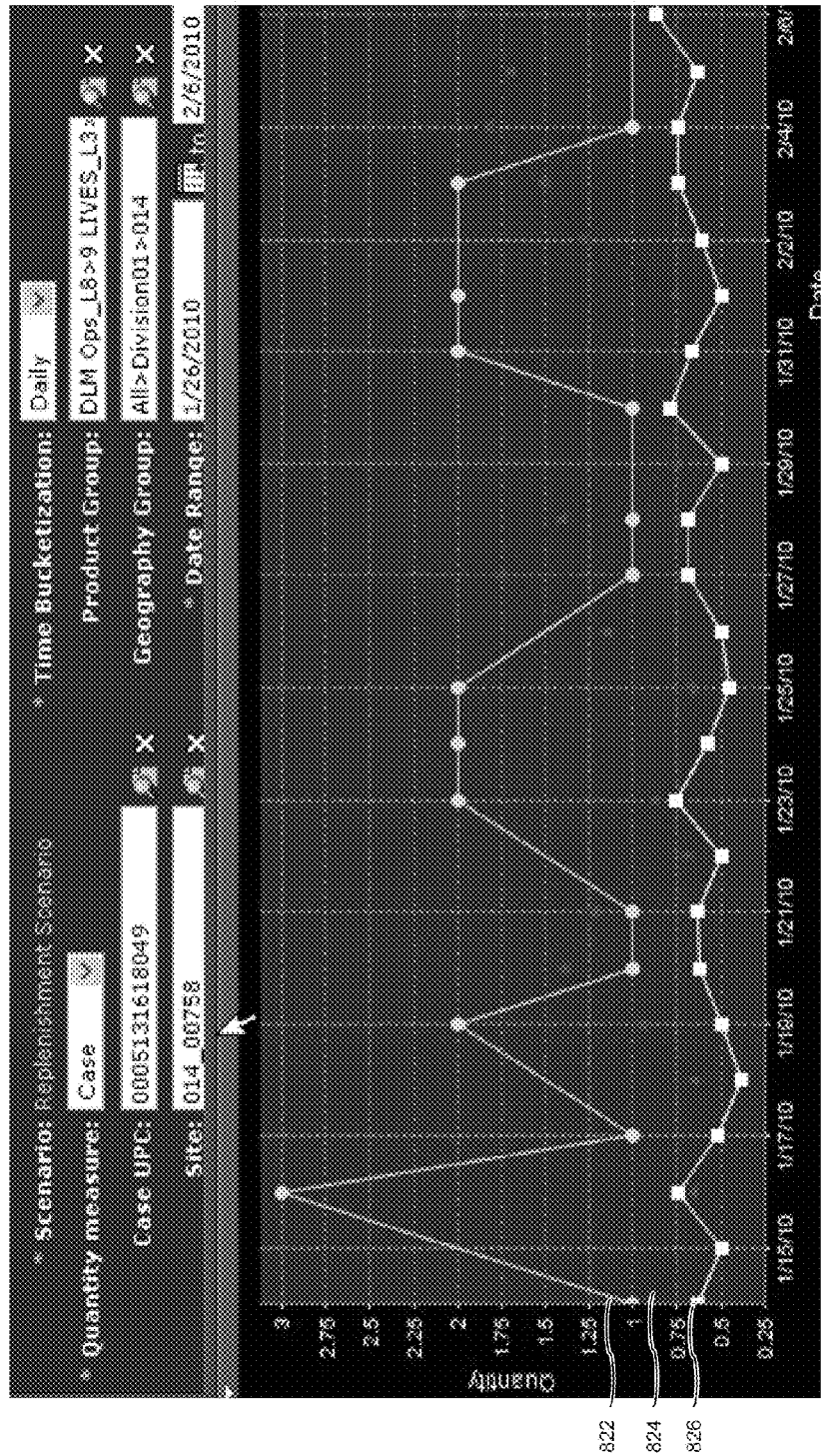
Figure 9G:
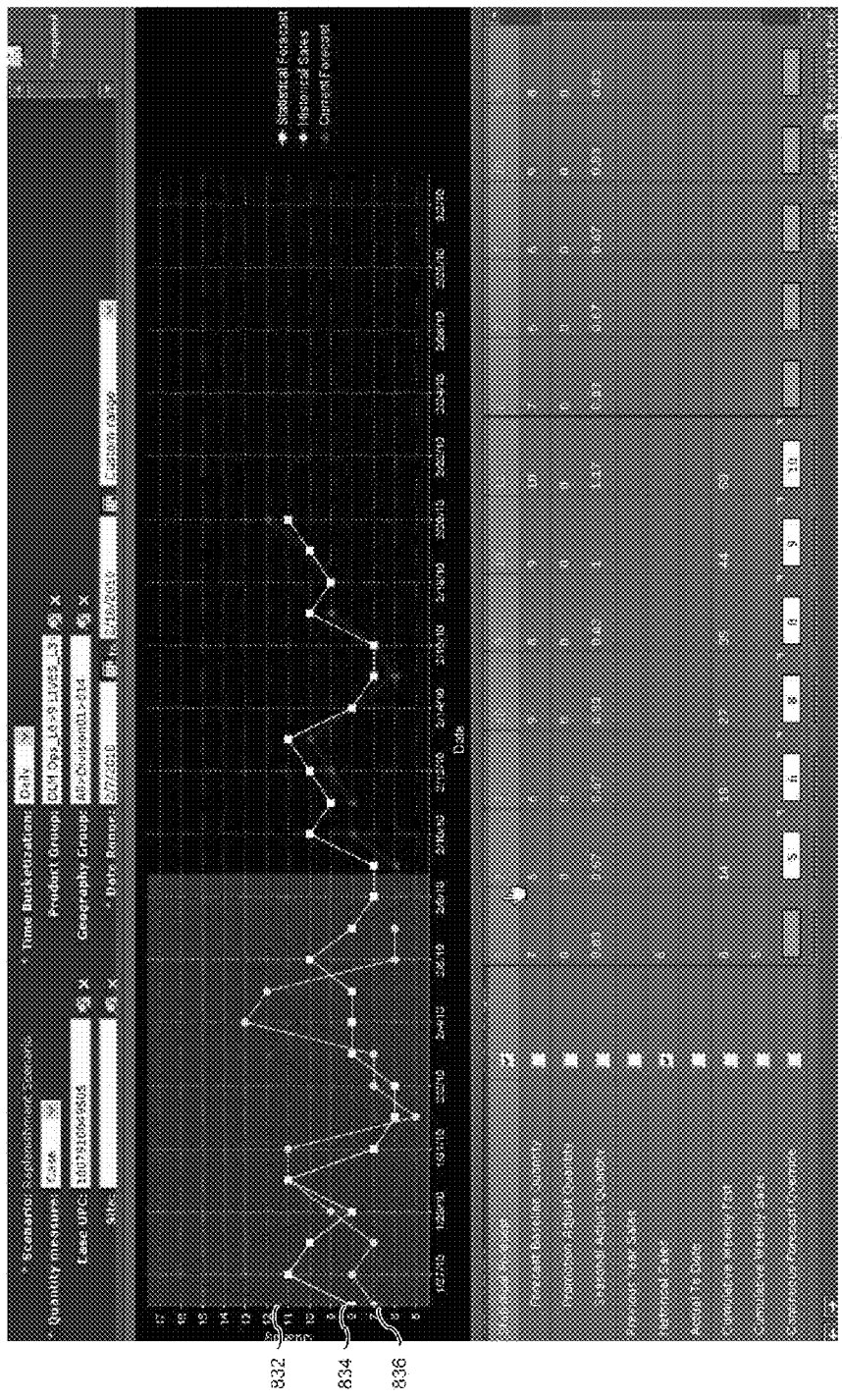
Figure 9H:
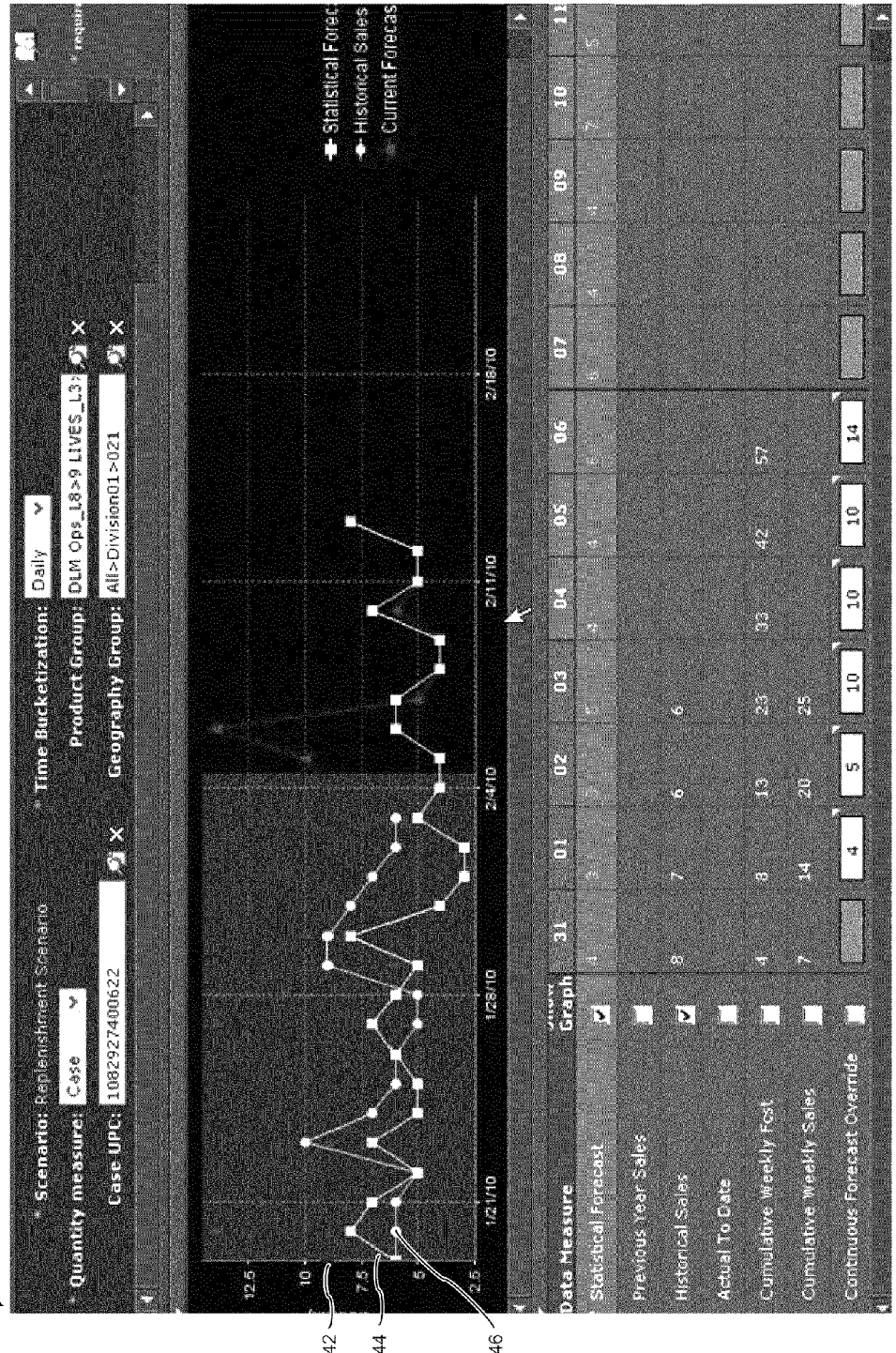

As shown in FIGS. 9D-9G, exemplary user interfaces for continuous forecasting in accordance with an embodiment of the present invention are shown. In particular, FIG. 9D is an exemplary user interface graphically indicating at a DC level that no trend is detected. As shown in this figure, line 802 represents the forecast without continuous forecasting and line 804 represents actual sales. FIG. 9E is an exemplary user interface graphically indicating a local down trend detection. As shown in this figure, line 812 represents the forecast without continuous forecasting and line 814 represents actual sales. FIG. 9F is an exemplary user interface graphically indicating a local up trend detection. As shown in this figure, line 822 represents the forecast without continuous forecasting, line 824 represents actual sales, and line 826 represents an adjusted forecast based on continuous forecasting. FIG. 9G is an exemplary user interface graphically indicating a wide-spread down trend detection. As shown in this figure, line 832 represents the forecast without continuous forecasting, line 834 represents actual sales, and line 836 represents an adjusted forecast based on continuous forecasting.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

The present invention thus includes a computer program which may be hosted on a storage medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A computer program product embodied on a non-transitory computer readable medium for implementing and managing a value chain network, wherein the computer program is implemented by one or more processors executing processor instructions, the computer program product comprising:
a first computer code for allowing a first and second company in a value chain network to access to a shared database on a service provider computer over a network, wherein a first plurality of fields in the shared database are uniquely associated with the first company, a second plurality of fields in the shared database are uniquely associated with the second company, and wherein the first company includes one or more clusters of retail stores;
a second computer code for linking the first company with one or more of the second plurality of fields, wherein the first company is linked and provided limited access to the one or more of the second plurality of fields without creating a copy of the one or more of the second plurality of fields;
a third computer code for linking the second company with one or more of the first plurality of fields, wherein the second company is linked and provided limited access to the one or more of the first plurality of fields without creating a copy of the one or more of the first plurality of fields;
a fourth computer code for periodically receiving sales information and events on the value network within at least one of the one or more clusters of retail stores, wherein the events include a demand event and a supply event; and
a fifth computer code for updating one or more of the first plurality fields that are linked to the second company upon receipt of at least one selected from the group consisting of the sales information, the demand event and the supply event, wherein the one or more updated first plurality of fields are immediately accessible to the first and second company.

2. The computer program product of claim 1, wherein the service provider computer is a cloud computer.

3. The computer program product of claim 1, further comprising:
a sixth computer code for allowing a third company in a value chain network to access to a shared database on a service provider computer over a network, wherein a third plurality of fields in the shared database are uniquely associated with the third company, and wherein the first company includes a first user accessing the service provider computer via a remote computer; and
a seventh computer code for linking the first company with one or more of the third plurality of fields upon a first request by the first user, wherein the first company is linked and provided limited access to the one or more of the third plurality of fields without creating a copy of the one or more of the third plurality of fields.

4. The computer program product of claim 3, further comprising an eighth computer code for unlinking the first company with the third plurality of fields that are linked to the first company upon a second request by the first user.

5. The computer program product of claim 1, further comprising a sixth computer code for creating a sales forecast for the first company over a configurable period of time, wherein the sales forecast includes anticipated sales for a plurality of items within at least one of the clusters of stores.

6. The computer program product of claim 5, wherein the sales information includes actual sales information and sales anomalies, the computer program product further comprising:
a seventh computer code for determining whether one or more trends are occurring or have occurred for the first company based on the sales information; and
an eighth computer code for adjusting the sales forecast for the first company based on the sales information.

7. The computer program product of claim 1, wherein the second computer is at least one selected from the group consisting of a manufacturer, a plant, a distribution company and a vendor.

8. A system for implementing and managing a value chain network, the system comprising:
a plurality of remote computers;
a central server;

a network interface in communication with the central server and the plurality of remote computers over a network, the network interface being configured to receive sales information and events on the value network, wherein the events include a demand event and a supply event;

a shared database in communication with the central server;

wherein the central server is configured to:

allow a first and second company in a value chain network to access to the shared database over the network, wherein a first plurality of fields in the shared database are uniquely associated with the first company, a second plurality of fields in the shared database are uniquely associated with the second company, and wherein the first company includes one or more clusters of retail stores;

link the first company with one or more of the second plurality of fields, wherein the first company is linked and provided limited access to the one or more of the second plurality of fields without creating a copy of the one or of the second plurality of fields;

link the second company with one or more of the first plurality of fields, wherein the second company is linked and provided limited access to the one or more of the first plurality of fields without creating a copy of the one or more of the first plurality of fields;

periodically receive the sales information and the events within at least one of the one or more clusters of retail stores; and update one or more of the first plurality of fields that are linked to the second company upon receipt of at least one selected from the group consisting of the sales information, the demand event and the supply event, wherein the one or more updated first plurality of fields are immediately accessible to the first and second company.

9. The system of claim 8, wherein the central server includes:

means for providing a third company in a value chain network to access to a shared database on a service provider computer over a network, wherein a third plurality of fields in the shared database are uniquely associated with the third company, and wherein the first company includes a first user accessing the service provider computer via a remote computer; and means for linking the first company with one or more of the third plurality of fields upon a first request by the first user, wherein the first company is linked and provided limited access to the one or more of the third plurality of fields without creating a copy of the one or more of the third plurality of fields.

10. A method for implementing and managing a value chain network, wherein the method is implemented by one or more processors executing processor instructions stored on a computer readable medium, the method comprising the processor implemented steps of:

providing a first and second company in a value chain network access to a shared database on a service provider computer over a network, wherein a first plurality of fields in the shared database are uniquely associated with the first company, a second plurality of fields in the shared database are uniquely associated with the second company, and wherein the first company includes one or more clusters of retail stores;

linking the first company with one or more of the second plurality of fields, wherein the first company is linked and provided limited access to the one or more of the second plurality of fields without creating a copy of the one or more of the second plurality of fields;

linking the second company with one or more of the first plurality of fields, wherein the second company is linked and provided limited access to the one or more of the first plurality of fields without creating a copy of the one or more of the first plurality of fields;

periodically receiving sales information and events on the value network within at least one of the one or more clusters of retail stores, wherein the events includes a demand event and a supply event; and updating one or more of the first plurality of fields that are linked to the second company upon receipt of at least one selected from the group consisting of the sales information, the demand event and the supply event, wherein the one or more updated first plurality of fields are immediately accessible to the first and second company.

11. A computer program product embodied on a non-transitory computer readable medium for implementing and managing a value chain network, wherein the computer program is implemented by one or more processors executing processor instructions, the computer program product comprising:

a first computer code for allowing a first and second company in a value chain network to access to a shared database on a service provider computer over a network, wherein a first plurality of fields in the shared database are uniquely associated with the first company and include first sales information, first inventory information and first supply information, wherein a second plurality of fields in the shared database are uniquely associated with the second company and include second sales information, second inventory information and second supply information, and wherein the first company includes one or more clusters of retail stores;

a second computer code for linking the first company with one or more of the second plurality of fields, wherein the first company is linked and provided limited access to the one or more of the second plurality of fields without creating a copy of the one or more of the second plurality fields;

a third computer code for linking the second company with one or more of the first plurality of fields, wherein the second company is linked and provided limited access to the one or more of the first plurality of fields without creating a copy of the one or more of the first plurality of fields;

a fourth computer code for receiving sales information, inventory information, supply information and events on the value network, wherein the received sales information includes information from at least one of the one or more clusters of retail stores, and the received events include one or more demand events and one or more supply events;

a fifth computer code for updating one or more of the first plurality of fields that are linked to the second company upon receipt of at least one selected from the group consisting of the received sales information, the received inventory information, the received supply information, the received one or more demand events and the received one or more supply events, wherein the one or more updated first plurality of fields are immediately accessible to the first and second company; and a sixth computer code for updating one or more of the second plurality of fields that are linked to the first company upon receipt of at least one selected from the group consisting of the received sales information, the received inventory information, the received supply information, the received one or more demand events and the received one or more supply events, wherein the one or more updated second plurality of fields are immediately accessible to the first and second company.

12. The computer program product of claim 11, further comprising a seventh computer code for updating the first inventory information and the second inventory information upon receipt of at least one selected from the group consisting of the received one or more demand events and the received one or more supply events.

13. The computer program product of claim 12, further comprising an eighth computer code for calculating a replenishment amount of the first inventory information based on the second inventory information.

14. The computer program product of claim 13, further comprising a ninth computer code for calculating a demand amount of the second inventory information based on the first sales information.

15. The computer program product of claim 11, wherein the service provider computer is a cloud computer.

16. The computer program product of claim 11, further comprising:
a seventh computer code for allowing a third company in a value chain network to access to a shared database on a service provider computer over a network, wherein a third plurality of fields in the shared database are uniquely associated with the third company, and wherein the first company includes a first user accessing the service provider computer via a remote computer; and an eighth computer code for linking the first company with one or more of the third plurality of fields upon a first request by the first user, wherein the first company is linked and provided limited access to the one or more of the third plurality of fields without creating a copy of the one or more of the third plurality of fields.

17. The computer program product of claim 16, further comprising a ninth computer code for unlinking the first company with the third plurality of fields that are linked to the first company upon a second request by the first user.

18. The computer program product of claim 11, further comprising a seventh computer code for creating a sales forecast for the first company over a configurable period of time, wherein the sales forecast includes anticipated sales for a plurality of items within at least one of the clusters of stores.

19. The computer program product of claim 18, wherein the first sales information includes actual sales information and sales anomalies, the computer program product further comprising:
an eighth computer code for determining whether one or more trends are occurring or have occurred for the first company based on the sales information; and
a ninth computer code for adjusting the sales forecast for the first company based on the first sales information.

20. The computer program product of claim 11, wherein the second computer is at least one selected from the group consisting of a manufacturer, a plant, a distribution company and a vendor.

* * * * *